(12) United States Patent
Blieske

(10) Patent No.: US 8,272,212 B2
(45) Date of Patent: Sep. 25, 2012

(54) SYSTEMS AND METHODS FOR OPTIMIZING THERMAL EFFICIENCEY OF A COMPRESSED AIR ENERGY STORAGE SYSTEM

(75) Inventor: Matthew Blieske, Francestown, NH (US)

(73) Assignee: General Compression, Inc., Newton, MA (US)

( * ) Notice: Subject to any disclaimer, the term of this patent is extended or adjusted under 35 U.S.C. 154(b) by 0 days.

(21) Appl. No.: 13/294,901

(22) Filed: Nov. 11, 2011

(65) Prior Publication Data

US 2012/0055145 A1 Mar. 8, 2012

Related U.S. Application Data

(63) Continuation of application No. 13/294,862, filed on Nov. 11, 2011.

(51) Int. Cl.
*F16D 31/02* (2006.01)
(52) U.S. Cl. ............... 60/408; 60/412; 60/456
(58) Field of Classification Search ........... 60/408, 60/412, 456
See application file for complete search history.

(56) References Cited

U.S. PATENT DOCUMENTS

| | | |
|---|---|---|
| 114,297 A | 5/1871 | Ivens et al. |
| 224,081 A | 2/1880 | Eckart |
| 233,432 A | 10/1880 | Pitchford |
| 320,482 A | 6/1885 | Leavitt |
| 874,140 A | 12/1907 | Valiquet |
| 943,000 A | 12/1909 | Busby |
| 1,045,961 A | 12/1912 | Ferranti |
| 1,147,204 A | 7/1915 | Anheuser |
| 1,230,028 A | 6/1917 | Rardon |
| 1,353,216 A | 9/1920 | Carlson |
| 1,369,596 A | 2/1921 | Yanacopoulos |
| 1,635,524 A | 7/1927 | Aikman |
| 1,681,280 A | 8/1928 | Bruckner |
| 1,918,789 A | 7/1933 | Ttisworth |

(Continued)

FOREIGN PATENT DOCUMENTS

GB 2013318 8/1979

(Continued)

OTHER PUBLICATIONS

Ahrens, F. W., "Preliminary Evaluation of the Use of Hydraulic Air Compressors in Water-Compensated Reservoir Compressed Air Storage Power Plants," NTIS, Prepared for CAES Technology Symposium 1978, May 15-17, 1978, Pacific Grove, CA, Argonne National Laboratory, Argonne, Illinois, 24 pages.

(Continued)

*Primary Examiner* — F. Daniel Lopez
(74) *Attorney, Agent, or Firm* — Goodwin Procter LLP

(57) ABSTRACT

Systems, methods and devices for optimizing thermal efficiency within a gas compression system are described herein. In some embodiments, a device can include a first hydraulic cylinder, a second hydraulic cylinder, and a hydraulic actuator. The first hydraulic cylinder has a first working piston disposed therein for reciprocating movement in the first hydraulic cylinder and which divides the first hydraulic cylinder into a first hydraulic chamber and a second hydraulic chamber. The second hydraulic cylinder has a second working piston disposed therein for reciprocating movement in the second hydraulic cylinder and which divides the second hydraulic cylinder into a third hydraulic chamber and a fourth hydraulic chamber. The hydraulic actuator can be coupled to the first or second working piston, and is operable to move the first and second working pistons in a first direction and a second direction such that volume in the hydraulic chambers are reduced accordingly.

21 Claims, 19 Drawing Sheets

U.S. PATENT DOCUMENTS

| | | |
|---|---|---|
| 1,947,304 A | 2/1934 | Morro |
| 2,025,142 A | 12/1935 | Zahm et al. |
| 2,042,991 A | 6/1936 | Harris, Jr. |
| 2,141,703 A | 12/1938 | Bays |
| 2,150,122 A | 3/1939 | Kollberg et al. |
| 2,280,100 A | 4/1942 | Singleton |
| 2,280,845 A | 4/1942 | Parker |
| 2,339,086 A | 8/1944 | Makaroff |
| 2,404,660 A | 7/1946 | Rouleau |
| 2,420,098 A | 5/1947 | Rouleau |
| 2,454,058 A | 11/1948 | Hays |
| 2,479,856 A | 8/1949 | Mitton |
| 2,539,862 A | 1/1951 | Rushing |
| 2,628,564 A | 2/1953 | Jacobs |
| 2,683,964 A | 7/1954 | Anxionnaz et al. |
| 2,706,077 A | 4/1955 | Searcy |
| 2,712,728 A | 7/1955 | Lewis et al. |
| 2,813,398 A | 11/1957 | Wilcox |
| 2,824,687 A | 2/1958 | Osterkamp |
| 2,829,501 A | 4/1958 | Walls |
| 2,880,759 A | 4/1959 | Wisman |
| 2,898,183 A | 8/1959 | Fauser |
| 3,014,639 A | 12/1961 | Boli |
| 3,041,842 A | 7/1962 | Heinecke |
| 3,232,524 A | 2/1966 | Rice et al. |
| 3,236,512 A | 2/1966 | Caslav et al. |
| 3,269,121 A | 8/1966 | Ludwig |
| 3,355,096 A | 11/1967 | Hornschuch |
| 3,523,192 A | 8/1970 | Lang |
| 3,530,681 A | 9/1970 | Dehne |
| 3,538,340 A | 11/1970 | Lang |
| 3,608,311 A | 9/1971 | Roesel, Jr. |
| 3,618,470 A | 11/1971 | Mueller et al. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | Rigollot |
| 3,792,643 A | 2/1974 | Scheafer |
| 3,793,848 A | 2/1974 | Eskeli |
| 3,796,044 A | 3/1974 | Schwarz |
| 3,801,793 A | 4/1974 | Goebel |
| 3,802,795 A | 4/1974 | Nyeste |
| 3,803,847 A | 4/1974 | McAlister |
| 3,806,733 A | 4/1974 | Haanen |
| 3,818,801 A | 6/1974 | Kime |
| 3,832,851 A | 9/1974 | Kiernan |
| 3,835,918 A | 9/1974 | Pilarczyk |
| 3,839,863 A | 10/1974 | Frazier |
| 3,847,182 A | 11/1974 | Greer |
| 3,854,301 A | 12/1974 | Cytryn |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,968,732 A | 7/1976 | Fitzgerald |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 4,008,006 A | 2/1977 | Bea |
| 4,009,587 A | 3/1977 | Robinson, Jr. et al. |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,053,395 A | 10/1977 | Switzgable |
| 4,055,950 A | 11/1977 | Grossman |
| 4,058,979 A | 11/1977 | Germain |
| 4,079,586 A | 3/1978 | Kincaid, Jr. |
| 4,079,591 A | 3/1978 | Derby |
| 4,089,744 A | 5/1978 | Cahn |
| 4,090,940 A | 5/1978 | Switzgable |
| 4,095,118 A | 6/1978 | Ratbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,343 A | 9/1978 | Hoffelns |
| 4,117,696 A | 10/1978 | Fawcett et al. |
| 4,118,637 A | 10/1978 | Tackett |
| 4,124,182 A | 11/1978 | Loeb |
| 4,124,805 A | 11/1978 | Jacoby |
| 4,126,000 A | 11/1978 | Funk |
| 4,136,432 A | 1/1979 | Melley, Jr. |
| 4,137,015 A | 1/1979 | Grossman |
| 4,142,368 A | 3/1979 | Mantegani |
| 4,143,522 A | 3/1979 | Hamrick |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,601 A | 6/1980 | Eberle |
| 4,206,608 A | 6/1980 | Bell |
| 4,209,982 A | 7/1980 | Pitts |
| 4,215,548 A | 8/1980 | Beremand |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,236,083 A | 11/1980 | Kenney |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,265,599 A | 5/1981 | Morton |
| 4,273,514 A | 6/1981 | Shore et al. |
| 4,274,010 A | 6/1981 | Lawson-Tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,329,842 A | 5/1982 | Hoskinson |
| 4,335,093 A | 6/1982 | Salomon |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,362,462 A | 12/1982 | Blotenberg |
| 4,363,703 A | 12/1982 | ElDifrawi |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |

| Patent | Date | Inventor |
|---|---|---|
| 4,372,332 A | 2/1983 | Mast |
| 4,375,387 A | 3/1983 | deFilippi et al. |
| 4,380,419 A | 4/1983 | Morton |
| 4,393,752 A | 7/1983 | Meier |
| 4,411,136 A | 10/1983 | Funk |
| 4,421,661 A | 12/1983 | Claar et al. |
| 4,426,846 A | 1/1984 | Bailey |
| 4,428,711 A | 1/1984 | Archer |
| 4,435,131 A | 3/1984 | Ruben |
| 4,466,244 A | 8/1984 | Wu |
| 4,478,556 A | 10/1984 | Gozzi |
| 4,537,558 A | 8/1985 | Tsunoda et al. |
| 4,585,039 A | 4/1986 | Hamilton |
| 4,593,202 A | 6/1986 | Dickinson |
| 4,603,551 A | 8/1986 | Wood |
| 4,610,369 A | 9/1986 | Mercier |
| 4,706,685 A | 11/1987 | Jones, Jr. et al. |
| 4,714,411 A | 12/1987 | Searle |
| 4,761,118 A | 8/1988 | Zanarini et al. |
| 4,765,225 A | 8/1988 | Birchard |
| 4,784,579 A | 11/1988 | Gazzera |
| 4,849,648 A | 7/1989 | Longardner |
| 4,959,958 A | 10/1990 | Nishikawa et al. |
| 5,099,648 A | 3/1992 | Angle |
| 5,138,936 A | 8/1992 | Kent |
| 5,142,870 A | 9/1992 | Angle |
| 5,161,865 A | 11/1992 | Higashimate et al. |
| 5,169,295 A | 12/1992 | Stogner et al. |
| 5,179,837 A | 1/1993 | Sieber |
| 5,184,936 A | 2/1993 | Nojima |
| 5,253,619 A | 10/1993 | Richeson et al. |
| 5,259,738 A | 11/1993 | Salter et al. |
| 5,322,418 A | 6/1994 | Comer |
| 5,387,089 A | 2/1995 | Stogner et al. |
| 5,394,695 A | 3/1995 | Sieber |
| 5,537,822 A | 7/1996 | Shnaid et al. |
| 5,564,912 A | 10/1996 | Peck et al. |
| 5,584,664 A | 12/1996 | Elliott et al. |
| 5,622,478 A | 4/1997 | Elliott et al. |
| 5,634,340 A | 6/1997 | Grennan |
| 5,674,053 A | 10/1997 | Paul et al. |
| 5,716,197 A | 2/1998 | Paul et al. |
| 5,769,610 A | 6/1998 | Paul et al. |
| 5,771,693 A | 6/1998 | Coney |
| 5,782,612 A | 7/1998 | Margardt |
| 5,807,083 A | 9/1998 | Tomoiu |
| 5,839,270 A | 11/1998 | Jirnov et al. |
| 5,863,186 A | 1/1999 | Green et al. |
| 5,993,170 A | 11/1999 | Stevens et al. |
| 6,026,349 A | 2/2000 | Heneman |
| 6,052,992 A | 4/2000 | Eroshenko |
| 6,113,357 A | 9/2000 | Dobbs |
| 6,145,311 A | 11/2000 | Cyphelly |
| 6,206,660 B1 | 3/2001 | Coney et al. |
| RE37,603 E | 3/2002 | Coney |
| 6,371,145 B1 | 4/2002 | Bardon |
| 6,371,733 B1 | 4/2002 | Renfro |
| 6,397,794 B1 | 6/2002 | Sanderson et al. |
| 6,446,587 B1 | 9/2002 | Sanderson et al. |
| 6,460,450 B1 | 10/2002 | Sanderson et al. |
| 6,499,288 B1 | 12/2002 | Knight |
| 6,558,134 B2 | 5/2003 | Serafin et al. |
| 6,568,169 B2 | 5/2003 | Conde et al. |
| 6,568,911 B1 | 5/2003 | Brightwell et al. |
| 6,638,024 B1 | 10/2003 | Hancock |
| 6,652,241 B1 | 11/2003 | Alder |
| 6,652,243 B2 | 11/2003 | Krasnov |
| 6,655,155 B2 | 12/2003 | Bishop |
| 6,695,591 B2 | 2/2004 | Grimmer et al. |
| 6,711,984 B2 | 3/2004 | Tagge et al. |
| 6,725,671 B2 | 4/2004 | Bishop |
| 6,733,253 B2 | 5/2004 | Vockroth |
| 6,817,185 B2 | 11/2004 | Coney et al. |
| 6,829,978 B2 | 12/2004 | Sanderson et al. |
| 6,854,377 B2 | 2/2005 | Sanderson et al. |
| 6,913,447 B2 | 7/2005 | Fox et al. |
| 6,915,765 B1 | 7/2005 | Sanderson et al. |
| 6,925,973 B2 | 8/2005 | Sanderson et al. |
| 6,957,632 B1 | 10/2005 | Carlson et al. |
| 6,959,546 B2 | 11/2005 | Corcoran |
| 6,994,104 B2 | 2/2006 | Bishop et al. |
| 6,997,685 B2 | 2/2006 | Lemmen |
| 7,001,158 B2 | 2/2006 | Dunn |
| 7,007,589 B1 | 3/2006 | Sanderson |
| 7,011,469 B2 | 3/2006 | Sanderson et al. |
| 7,021,602 B2 | 4/2006 | Davis et al. |
| RE39,249 E | 8/2006 | Link, Jr. |
| 7,210,496 B2 | 5/2007 | Suzuki |
| 7,219,682 B2 | 5/2007 | Agnew et al. |
| 7,257,952 B2 | 8/2007 | Bishop et al. |
| 7,308,361 B2 | 12/2007 | Enis et al. |
| 7,377,492 B2 | 5/2008 | Vrana et al. |
| 7,395,748 B2 | 7/2008 | Krimbacher |
| 7,488,159 B2 | 2/2009 | Bhatt et al. |
| 7,527,482 B2 | 5/2009 | Ursan et al. |
| 7,530,300 B2 | 5/2009 | Hornstein |
| 7,543,668 B1 | 6/2009 | Schechter |
| 7,604,064 B2 | 10/2009 | Irwin, Jr. |
| 7,610,955 B2 | 11/2009 | Irwin, Jr. |
| 7,640,736 B2 | 1/2010 | Arbel et al. |
| 7,656,055 B2 | 2/2010 | Torres et al. |
| 7,663,255 B2 | 2/2010 | Kim et al. |
| 7,696,632 B1 | 4/2010 | Fuller |
| 7,802,426 B2 | 9/2010 | Bollinger |
| 7,832,207 B2 | 11/2010 | McBride et al. |
| 7,874,155 B2 | 1/2011 | McBride et al. |
| 7,900,444 B1 | 3/2011 | McBride et al. |
| 2003/0180155 A1 | 9/2003 | Coney et al. |
| 2005/0180864 A1 | 8/2005 | Ursan et al. |
| 2006/0078445 A1 | 4/2006 | Carter, III et al. |
| 2006/0218908 A1 | 10/2006 | Abou-Raphael |
| 2006/0248886 A1 | 11/2006 | Ma |
| 2007/0187918 A1 | 8/2007 | Mizuno |
| 2008/0060862 A1 | 3/2008 | Schlele et al. |
| 2008/0163618 A1 | 7/2008 | Paul |
| 2009/0260361 A1 | 10/2009 | Prueitt |
| 2009/0282822 A1 | 11/2009 | McBride et al. |
| 2009/0301089 A1 | 12/2009 | Bollinger |
| 2010/0018196 A1 | 1/2010 | Li et al. |
| 2010/0089063 A1 | 4/2010 | McBride et al. |
| 2010/0139277 A1 | 6/2010 | McBride et al. |
| 2010/0205960 A1 | 8/2010 | McBride et al. |
| 2010/0229544 A1 | 9/2010 | Bollinger et al. |
| 2010/0307156 A1 | 12/2010 | Bollinger et al. |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0079010 A1 | 4/2011 | McBride et al. |
| 2011/0083438 A1 | 4/2011 | McBride et al. |
| 2011/0131966 A1 | 6/2011 | McBride et al. |
| 2011/0167813 A1 | 7/2011 | McBride et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |

FOREIGN PATENT DOCUMENTS

| | | |
|---|---|---|
| WO | WO 90/03516 | 4/1990 |
| WO | WO 93/06367 | 4/1993 |
| WO | WO 98/17492 | 4/1998 |
| WO | WO 2005/069847 | 8/2005 |
| WO | WO 2008/139267 | 11/2008 |
| WO | WO 2009/034548 | 3/2009 |

| | | |
|---|---|---|
| WO | WO 2010/135658 | 11/2010 |
| WO | WO 2011/079267 | 6/2011 |
| WO | WO 2011/079271 | 6/2011 |

OTHER PUBLICATIONS

Berghmans, J. A. et al., "Performance of a Hydraulic Air Compressor for Use in Compressed Air Energy Storage Power Systems," Smithsonian/NASA ADS Physics Abstract Service, Presented at Symp. on Fluids Eng. in Advanced Energy Conversion Systems, ASME Winter Ann. Meeting, San Francisco, Dec. 10-15.

Carbon Trust, "Hydraulic Transmission System for Large Wind Turbines," Jan. 2007, 1 page.

Erbe, R., "Water Works: Less Expensive Than Oil and Environmentally Friendly, Water-Based Hydraulics Deserve a Closer Look," Machine Design, Sep. 13, 2007, vol. 116, 5 pages.

Hydraulics & Pneumatics, Piston Pumps [online], [retrieved on Oct. 17, 2007]. Retrieved from the Internet: <URL: http://www.hydraulicspneumatics.com/200/FPE/pumps/article/true/6402>, 2007, Penton Media, Inc., 4 pages.

Hydraulics & Pneumatics, Wobble-Plate Piston Pump [online], [retrieved on Oct. 18, 2007]. Retrieved from the Internet: <URL: http://www.hydraulicspneumatics.com/200/issue/article/true/43640>, 2007, Penton Media, Inc., 13 pages.

Moore, J. J. et al., "Conceptual Design Study of Hydraulic Compression for Wind Turbine Driven Air Compression," Final Report, SwRI Project No. 18.18094.01.016, Jun. 6, 2008, Southwest Research institute, 50 pages.

Sanderson Engine Development, "Application of Sanderson Mechanism for Conversion Between Linear and Rotary Motion," [online], [retrieved on May 8, 2008]. Retrieved from the Internet: <URL: http://www.sandersonengine.com/html/projects.html>, 2 pages.

Simetric, "Mass, Weight, Density or Specific Gravity of Liquids," [online], [retrieved on Jan. 2, 2008]. Retrieved from the Internet: <URL: http://www.simetric.co.uk/si_liquids.htm>, 5 pages.

"Swash-plate Type Axial Piston Pumps for Open Circuits in General Industrial Machinery," Kawasaki K3VG, Kawasaki Motor Corp., USA, 2006, 24 pages.

Cyphelly et al., "Usage of Compressed Air Storage Systems," Program Elektricity, Final Report May 2004, Ordered by the Swiss Federal Office of Energy.

SYSTEMS AND METHODS FOR OPTIMIZING THERMAL EFFICIENCEY OF A COMPRESSED AIR ENERGY STORAGE SYSTEM

CROSS-REFERENCE TO RELATED APPLICATION

This application is a continuation of U.S. patent application Ser. No. 13/294,862, filed Nov. 11, 2011, entitled "Systems and Methods for Optimizing Thermal Efficiency of a Compressed Air Energy Storage System," and is related to U.S. patent application Ser. No. 13/294,675, entitled "Systems and Methods for Compressing and/or Expanding a Gas Utilizing a Bi-Directional Piston and Hydraulic Actuator," filed on Nov. 11, 2011, the disclosures of which are hereby incorporated herein by reference in their entirety.

BACKGROUND

The invention relates generally to systems, devices and methods for the compression and/or expansion of a gas, such as air, and particularly to a system, device and method for optimizing the energy efficiency of a compressed air energy storage system.

Traditionally, electric power plants have been sized to accommodate peak power demand. Moreover, electric power plant sizing must take into account their maximum power output, minimum power output, and a middle power output range within which they most efficiently convert fuel into electricity. Electric power plants are also constrained in terms of how quickly they can start-up and shut-down, and it is commonly infeasible to completely shut-down a power plant. The combination of power output constraints, and start-up and shut-down constraints, restricts a power plant's ability to optimally meet a fluctuating power demand. These restrictions may lead to increased green house gas emissions, increased overall fuel consumption, and/or to potentially higher operating costs, among other drawbacks. Augmenting a power plant with an energy storage system may create an ability to store power for later use, which may allow a power plant to fulfill fluctuating consumer demand in a fashion that minimizes these drawbacks.

An energy storage system may improve overall operating costs, reliability, and/or emissions profiles for electric power plants. Existing energy storage technologies, however, have drawbacks. By way of example, batteries, flywheels, capacitors and fuel cells may provide fast response times and may be helpful to compensate for temporary blackouts, but have limited energy storage capabilities and may be costly to implement. Installations of other larger capacity systems, such as pumped hydro systems, require particular geological formations that might not be available at all locations.

Intermittent electric power production sites, such as some wind farms, may have capacities that exceed transmission capabilities. Absent suitable energy storage systems, such intermittent power production sites may not be capable of operating at full capacity. The applicants have appreciated that intermittent production sites may benefit from a storage system that may be sized to store energy, when the production site is capable of producing energy at rates higher than may be transmitted. The energy that is stored may be released through the transmission lines when power produced by the intermittent site is lower than transmission line capacity.

Electric power consumption sites, such as buildings, towns, cities, commercial facilities, military facilities, may have consumption that periodically exceeds electricity transmission capabilities. Absent suitable energy storage systems, such power consumers may not be capable of operating at preferred levels. The applicants have appreciated that transmission constrained consumption sites may benefit from a storage system that may be sized to store energy, when the consumption site is consuming energy at rates lower than may be transmitted, and that the transmitted energy that is not immediately consumed may be stored. The energy that is stored may be released to the consumers when power consumption of the consumers is higher than the transmission line capacity. The energy may also be stored during off-peak time periods (e.g., at night) when electricity prices are generally less expensive and released during peak time periods (e.g., during the day) when electricity prices are generally more expensive.

Compressed air energy storage systems (CAES) are another known type of system in limited use for storing energy in the form of compressed air. CAES systems may be used to store energy, in the form of compressed air, when electricity demand is low, typically during the night, and then to release the energy when demand is high, typically during the day. Such systems include a compressor that operates, often at a constant speed, to compress air for storage. Turbines, separate from the compressor, are typically used to expand compressed air to produce electricity. Turbines, however, often require the compressed air to be provided at a relatively constant pressure, such as around 35 atmospheres. Additionally or alternatively, air at pressures higher than 35 atmospheres may need to be throttled prior to expansion in the turbine, causing losses that reduce the efficiency of the system, and/or reduce the energy density that a storage structure may accommodate. Additionally, to increase electrical energy produced per unit of air expanded through the turbine, compressed air in such systems is often pre-heated to elevated temperatures (e.g., 1000° C.) prior to expansion by burning fossil fuels that both increases the cost of energy from the system and produces emissions associated with the storage of energy.

Known CAES-type systems for storing energy as compressed air have a multi-stage compressor that may include intercoolers that cool air between stages of compression and/or after-coolers that cool air after compression. In such a system, however, the air may still achieve substantial temperatures during each stage of compression, prior to being cooled, which will introduce inefficiencies in the system. Thus, there is a need to provide for CAES type systems that have improved efficiencies.

A CAES system may be implemented using a hydraulic drive system comprised of hydraulic components including components such as hydraulic pumps used to drive working pistons. Therefore, there is also a need for systems and methods to obtain a high efficiency output of a compressed air energy storage system, or other systems used to compress and/or expand gas, including controls and operating modes that leverage bi-directional piston movement during operation of such a system.

SUMMARY OF THE INVENTION

Systems, methods and devices for optimizing energy efficiency within a device or system used to compress and/or expand a gas, such as air, are described herein. In some embodiments, a compressed gas-based energy storage system can include a first hydraulic cylinder, a second hydraulic cylinder, and a hydraulic actuator. The first hydraulic cylinder has a first working piston disposed therein for reciprocating movement in the first hydraulic cylinder and which divides the first hydraulic cylinder into a first hydraulic chamber and a second hydraulic chamber. The second hydraulic cylinder has a second working piston disposed therein for reciprocating movement in the second hydraulic cylinder and which divides the second hydraulic cylinder into a third hydraulic chamber and a fourth hydraulic chamber. A connecting rod is disposed between, and coupled to, the first working piston and the second working piston. The hydraulic actuator is coupled to at least one of the first working piston, the second working piston, or the connecting rod, and is operable to move the first and second working pistons in a first direction to reduce the volume of the first hydraulic chamber and the third hydraulic chamber, and to move the first and second working pistons in a second direction, opposite the first direction, to reduce the volume of the second hydraulic chamber and the fourth hydraulic chamber.

DETAILED DESCRIPTION

Figure 1:
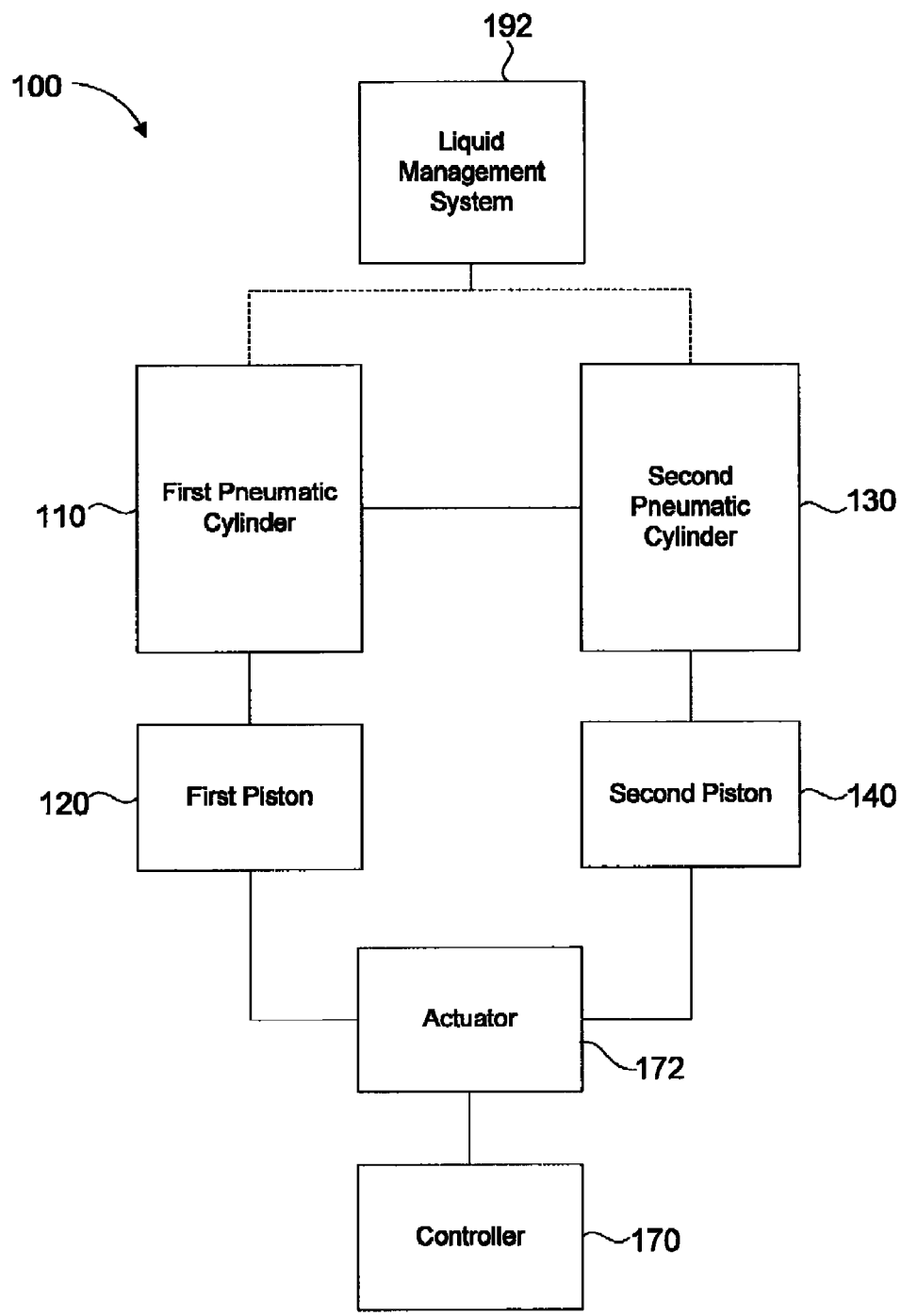
FIG. 1 is a schematic illustration of a compression and/or expansion system according to an embodiment.

Systems, devices and methods for optimizing and efficiency operating a gas compression and/or expansion system are disclosed herein. The gas compression and/or expansion systems can include one or more double-acting working pistons movably disposed within a cylinder to compress gas within a working chamber and configured to compress gas when moved in more than one direction. For example, the double-acting piston can be configured to compress gas both when moved in a first direction and when moved in a second direction opposite to the first direction. The gas compression and/or expansion systems can also include one or more double-acting working pistons movably disposed within a cylinder and configured to displace liquid within a working chamber when moved in more than one direction. For example, the double acting piston can be configured to discharge liquid from a first working chamber and draw liquid into a second working chamber when moved in a first direction, and discharge liquid from the second working chamber and draw liquid into the first working chamber when moved in a second direction, opposite the first direction. As used herein the term "piston" is not limited to pistons of circular cross-section, but can include pistons with a cross-section of a triangular, rectangular, or other multi-sided shape. The gas compression and/or expansion systems can be configured for two or more stages of gas compression and/or expansion.

In some embodiments, the double-acting working piston within a gas compression and/or expansion system can be driven by or drive one or more hydraulic actuators. The hydraulic loads applied to the working piston(s) can be varied during a given cycle of the system. For example, by applying hydraulic fluid pressure to different hydraulic pistons, and/or different surfaces of the piston(s) within the hydraulic actuator(s), the ratio of the net working surface area of the hydraulic actuator to the working surface area of the working piston acting on the gas and/or liquid in the working chamber can be varied, and therefore the ratio of the hydraulic fluid pressure to the gas and/or fluid pressure in the working chamber can be varied during a given cycle or stroke of the system. In addition, the number of working pistons/working chambers and hydraulic actuator can be varied as well as the number of piston area ratio changes within a given cycle.

In some embodiments, an actuator can include one or more pump systems, such as for example, one or more hydraulic pumps that can be use to move one or more fluids within the actuators. U.S. Provisional App. No. 61/216,942, to Ingersoll, et al., filed May 22, 2009, entitled "Compressor and/or Expander Device," and U.S. patent application Ser. Nos. 12/785,086, 12/785,093 and 12/785,100, each filed May 21, 2010 and entitled "Compressor and/or Expander Device" (collectively referred to herein as the "the Compressor and/or Expander Device applications"), the disclosures of which are hereby incorporated herein by reference, in their entireties, describe various energy compression and/or expansion systems in which the systems and methods described herein can be employed.

The hydraulic actuator can be coupleable to a hydraulic pump, which can have efficient operating ranges that can vary as a function of, for example, flow rate and pressure, among other parameters. Systems and methods of operating the hydraulic pumps/motors to allow them to function at an optimal efficiency throughout the stroke or cycle of the gas compression and/or expansion system are described in U.S. patent application Ser. No. 12/977,724 to Ingersoll, et al., filed Dec. 23, 2010, entitled "Systems and Methods for Optimizing Efficiency of a Hydraulically Actuated System," ("the '724 application") the disclosure of which is incorporated herein by reference in its entirety.

In some embodiments, the devices and systems described herein can be configured for use only as a compressor. For example, in some embodiments, a compressor device described herein can be used as a compressor in a natural gas pipeline, a natural gas storage compressor, or any other industrial application that requires compression of a gas. In another example, a compressor device described herein can be used for compressing carbon dioxide. For example, carbon dioxide can be compressed in a process for use in enhanced oil recovery or for use in carbon sequestration. In another example, a compressor device described herein can be used for compressing air. For example, compressed air can be used in numerous applications which may include cleaning applications, motive applications, ventilation applications, air separation applications, cooling applications, amongst others.

In some embodiments, the devices and systems described herein can be configured for use only as an expansion device. For example, an expansion device as described herein can be used to generate electricity. In some embodiments, an expansion device as described herein can be used in a natural gas transmission and distribution system. For example, at the intersection of a high pressure (e.g., 500 psi) transmission system and a low pressure (e.g., 50 psi) distribution system, energy can be released where the pressure is stepped down from the high pressure to a low pressure. An expansion device as described herein can use the pressure drop to generate electricity. In other embodiments, an expansion device as described herein can be used in other gas systems to harness the energy from high to low pressure regulation.

FIG. 1 schematically illustrates a compression and/or expansion device (also referred to herein as "compression/expansion device") according to an embodiment. A compression/expansion device 100 can include one or more pneumatic cylinders 110, 130, one or more pistons 120, 140, at least one actuator 172, a controller 170, and a liquid management system 192. The compression/expansion device 100 can be used, for example, in a CAES system.

The piston 120 (referred to herein as "first piston") is configured to be at least partially and movably disposed in the first pneumatic cylinder 110. The first piston 120 divides the first pneumatic cylinder 110 into, and defines therewith, a first pneumatic chamber and a second pneumatic chamber (not shown in FIG. 1). The first piston 120 can also be coupled to the actuator 172 via a piston rod (not shown in FIG. 1). The actuator 172 can be, for example, an electric motor or a hydraulically driven actuator such as, for example, the hydraulic actuators described in the '724 application, incorporated by reference above. The actuator 172 can be used to move the first piston 120 back and forth within the first pneumatic cylinder 110. As the first piston 120 moves back and forth within the first pneumatic cylinder 110, a volume of the first pneumatic chamber and a volume of the second pneumatic chamber will each change. For example, the first piston 120 can be moved between a first position in which the first pneumatic chamber has a volume greater than a volume of the second pneumatic chamber, and a second position in which the second pneumatic chamber has a volume greater than a volume of the first pneumatic chamber.

The piston 140 (referred to herein as "second piston") is configured to be at least partially disposed in the second pneumatic cylinder 130. The second piston divides the second pneumatic cylinder into, and defines therewith, a third pneumatic chamber and a fourth pneumatic chamber (not shown in FIG. 1). The second piston 140 can also be coupled to the actuator 172 via a piston rod (not shown in FIG. 1). The actuator 172 can be used to move the second piston 140 back and forth within the second pneumatic cylinder 130. As the second piston 140 moves back and forth within the second pneumatic cylinder 130, a volume of the third pneumatic chamber and a volume of the fourth pneumatic chamber will each change. For example, the second piston 140 can be moved between a first position in which the third pneumatic chamber has a volume greater than a volume of the fourth pneumatic chamber, and a second position in which the fourth pneumatic chamber has a volume greater than a volume of the third pneumatic chamber.

Each piston 120, 140 can be moved within its respective pneumatic cylinder 110, 130 to compress and/or expand a gas, such as air, within the cylinder. In some embodiments, the compression/expansion device 100 can be configured to be double-acting, in that at least one of the pistons 120, 140 can be actuated in two directions. In other words, the pistons 120, 140 can be actuated to compress and/or expand gas (e.g., air) in two directions. For example, in some embodiments, as the first piston 120 is moved in a first direction, a first volume of gas having a first pressure disposed in the first pneumatic chamber of the first pneumatic cylinder 110 can be compressed by one side of the first piston 120 to a second pressure greater than the first pressure, and a second volume of gas having a third pressure can enter the second pneumatic chamber on the other side of the first piston 120. When the first piston 120 is moved in a second direction opposite the first direction, the second volume of gas within the second pneumatic chamber can be compressed by the first piston 120 to a fourth pressure greater than the third pressure, and simultaneously a third volume of gas can enter the first pneumatic chamber. The second piston 140 can be similarly operable with respect to the third and fourth pneumatic chambers of the second pneumatic cylinder 130.

As such, movement of the first and second pistons 120, 140 (e.g., by the actuator 172) within each of the first and second pneumatic cylinders 110, 130, respectively, can change the volume of the first and second pneumatic chambers and the third and fourth pneumatic chambers, respectively (e.g., by decreasing the volume to compress the gas, by increasing the volume as the gas expands). The controller 170 is configured to control distribution of an input of hydraulic power, which can then be used to drive the actuator 172, such as when the compression/expansion device 100 is operating to compress gas (i.e., a compression mode). The controller 170 can also be configured to control distribution of hydraulic power to a pump/motor (not shown in FIG. 1), where the hydraulic power can be converted into mechanical power, such as when the compression/expansion device 100 is operating to expand a gas (i.e., an expansion mode).

In use, the compression/expansion device 100 operates in the compression mode to compress gas during at least a first stage of compression, in which the gas is compressed to a first pressure greater than an initial pressure, and a second stage of compression, in which the gas is compressed to a second pressure greater than the first pressure. Similarly, the compression/expansion device 100 can operate in the expansion mode to expand gas during at least a first stage of expansion, in which the gas is permitted to expand to a first pressure lower than the pressure of the gas in storage, and a second stage of expansion, in which the gas is permitted to expand to a second pressure lower than the first pressure.

Each of the first pneumatic cylinder 110 and second pneumatic cylinder 130 can include one or more inlet/outlet conduits (not shown in FIG. 1) in fluid communication with their respective pneumatic chambers. The pneumatic chambers can contain at various time periods during a compression and/or expansion cycle, a quantity of gas (e.g., air) that can be communicated to and from the pneumatic chambers via the inlet/outlet conduits. The compression/expansion device 100 can also include multiple valves (not shown in FIG. 1) coupled to the inlet/outlet conduits and/or to the pneumatic cylinders 110, 130. The valves can be configured to operatively open and close the fluid communication to and from the pneumatic chambers. Examples of use of such valves are described in more detail in the Compressor and/or Expander Device applications incorporated by reference above.

The liquid management system 192 is configured to control a temperature of gas as it is compressed and/or expanded within the compression/expansion device 100 by selectively introducing a liquid into and/or removing a liquid from the pneumatic cylinders. The liquid can directly or indirectly receive heat energy from, or release heat energy to, gas in the pneumatic cylinders. For example, the liquid management system 192 can be configured to receive heat energy from, and thereby lower the temperature of, the gas when the compression/expansion device 100 is operating in the compression mode. In another example, the liquid management system 192 can be configured to release heat energy to, and thereby increase the temperature of, the gas when the compression/expansion device 100 is operating in the expansion mode. In some embodiments, the liquid management system 192 is configured to control the temperature of gas using a heavy gas (or other suitable substance) in addition to using liquid. In other embodiments, however, the liquid management system 192 uses heavy gas (or another suitable substance) in lieu of using liquid.

The liquid management system 192 is configured to be coupled to at least one of the first pneumatic cylinder 110 and the second pneumatic cylinder 130. The liquid management system 192 can include one or more fluid inlet/outlet conduits (not shown in FIG. 1) in fluid communication with one or more of the inlet/outlet conduits (not shown in FIG. 1) of the first pneumatic cylinder 110 and/or second pneumatic cylinder 130. The liquid management system 192 can also include multiple valves (not shown in FIG. 1) coupled to the inlet/outlet conduits and/or to one or more chambers (not shown in FIG. 1) of the liquid management system 192. The valves can be configured to operatively open and close the fluid communication to and from the liquid management system. Examples of use of such valves are described in more detail in the Compressor and/or Expander Device applications incorporated by reference above.

In some embodiments, the liquid management system can include a lock pump or other device that facilitates movement of liquid into and/or out of the pneumatic cylinders 110, 130 during operation of the compression/expansion device 100. Examples of lock pumps are illustrated and described with respect to FIGS. 4A-4D. Examples of devices and methods for optimizing heat transfer within a compression and/or expansion device are described in more detail in U.S. patent application Ser. No. 12/977,679 to Ingersoll, et al., filed Dec. 23, 2010, entitled "Methods and Devices for Optimizing Heat Transfer Within a Compression and/or Expansion Device" ("the '679 application"), incorporated herein by reference in its entirety.

Figure 2:
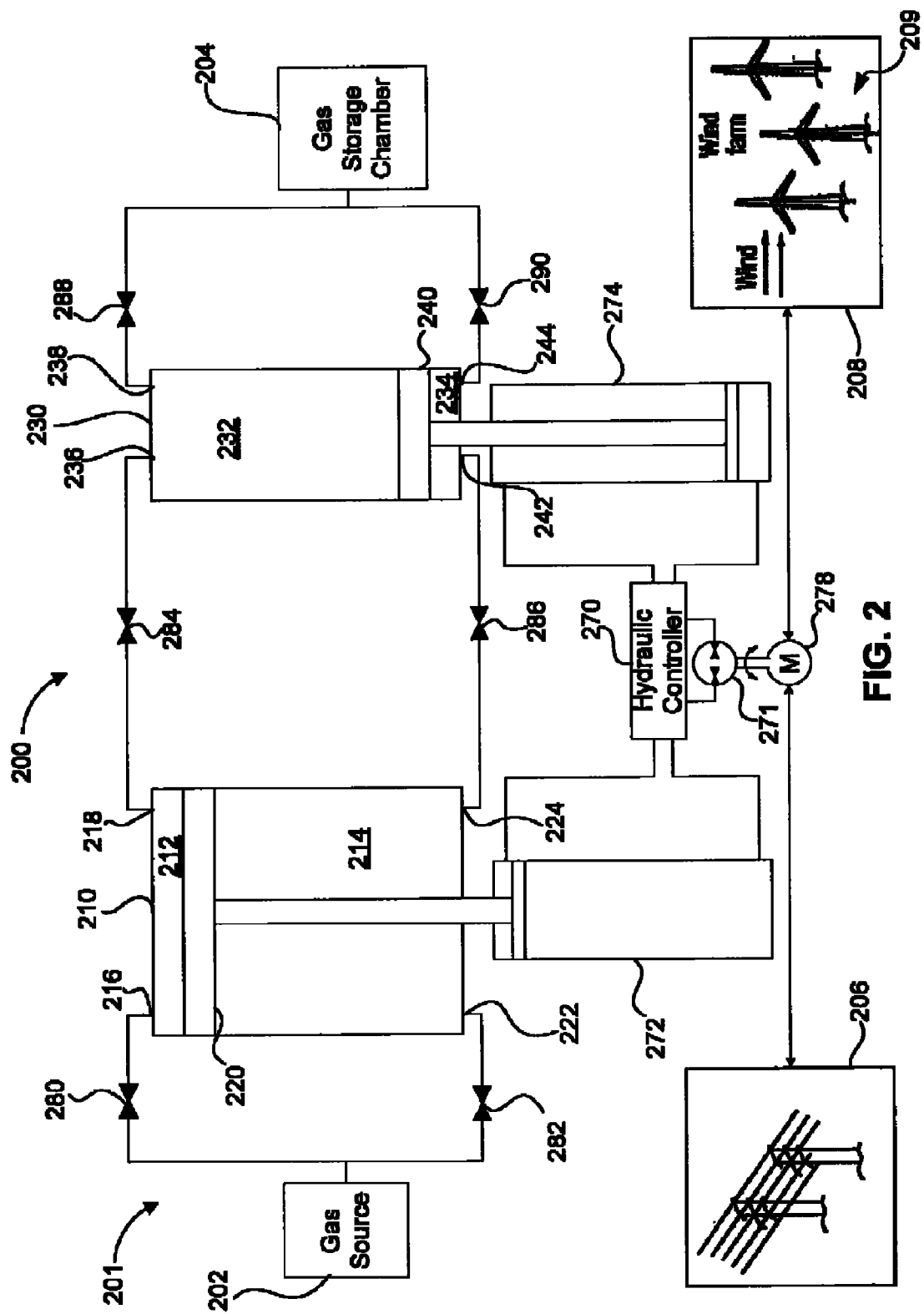
FIG. 2 is a schematic illustration of a compressed gas-based energy storage and recovery system, according to an embodiment.

FIG. 2 is a schematic illustration of an embodiment of an energy storage and recovery system 200 in which a compression/expansion device 201 may be used to both store energy and release energy that has previously been stored. Generally, as shown in FIG. 2, a source of electrical power, in this case a wind farm 208 including a plurality of wind turbines 209, may be used to harvest and convert wind energy to electric energy for delivery to a motor/generator 278. It is to be appreciated that the system 200 may be used with electric sources other than wind farms, such as, for example, with an electric power grid 206 or solar power sources (not shown). The motor/generator 278 converts the input electrical power from the wind turbines or other sources into mechanical power. That mechanical power can then be converted by a hydraulic pump/motor 271 into a hydraulic power. In turn, a hydraulic controller 270 controls distribution of the hydraulic power to drive one or more hydraulic actuators 272, 274 connected to the compression/expansion device 201.

Energy can be stored within the system 200 in the form of compressed gas, which can be expanded at a later time period to release the energy previously stored. To store energy generated by the wind farm 208, the hydraulic actuators 272, 274 can change the volume of respective pneumatic chambers 212, 214, 232, 234, as described in more detail herein. The reduction in volume compresses a gas contained therein. During this process, heat can be removed from the gas. During compression, the gas is delivered to a downstream stage of the compression/expansion device 201 and eventually, at an elevated pressure, to a compressed gas storage chamber 204. At a subsequent time, for example, when there is a relatively high demand for power on the power grid 206, and/or when energy prices are high, compressed gas may be communicated from the storage chamber 204 and expanded through the compression/expansion device 201. Expansion of the compressed gas drives the hydraulic actuators 272, 274, which, in turn, displace fluid to generate hydraulic power. The hydraulic controller 270 directs the hydraulic power to the pump/motor 271, which converts the hydraulic power to mechanical power. In turn, the motor/generator 278 converts the mechanical power to electrical power for delivery to the power grid 206. During this process, heat can be added to the gas.

The compression/expansion device 201, as illustrated in FIG. 2, includes a first pneumatic cylinder 210, a second pneumatic cylinder 230, the first actuator 272 operatively coupled to the first pneumatic cylinder via a first working piston 220, the second actuator 274 operatively coupled to the second pneumatic cylinder via a second working piston 240, and the hydraulic controller 270 operatively coupled to the first and second actuators 272, 274.

The first pneumatic cylinder 210 is configured for a first stage of gas compression. The first pneumatic cylinder 210 has the first working piston 220 disposed therein for reciprocating movement in the first pneumatic cylinder. The first working piston 220 divides the first pneumatic cylinder 210 into, and thereby defines, a first pneumatic chamber 212 and a second pneumatic chamber 214. The first pneumatic cylinder 210 is fluidically coupleable to the gas source. The first pneumatic chamber 212 includes a first fluid port 216 and a second fluid port 218. The second pneumatic chamber 214 includes a first fluid port 222 and a second fluid port 224. The first fluid port 216 of the first pneumatic chamber 212 and the first fluid port 222 of the second pneumatic chamber 214 are each fluidically coupleable to a source of gas 202. The gas source 202 can be, for example, atmospheric air or a pre-compressor.

The second pneumatic cylinder 230 is configured for a second stage of gas compression. The second pneumatic cylinder 230 has the second working piston 240 disposed therein for reciprocating movement in the second pneumatic cylinder. The second working piston 240 divides the second pneumatic cylinder 230 into, and thereby defines, a third pneumatic chamber 232 and a fourth pneumatic chamber 234. The third and fourth pneumatic chambers 232, 234 of the second pneumatic cylinder 230 have a collective volume less than a collective volume of the first and second pneumatic chambers 212, 214 of the first pneumatic cylinder 210. Additionally, a maximum volume of each of the third and fourth pneumatic chambers 232, 234 is less than a maximum volume of each of the first and second pneumatic chambers 212, 214.

The third pneumatic chamber 232 includes a first fluid port 236 and a second fluid port 238. The fourth pneumatic chamber 234 includes a first fluid port 242 and a second fluid port 244. The second pneumatic cylinder 230 is configured to be fluidically coupleable to the first pneumatic cylinder 210. Specifically, the first fluid port 236 of the third pneumatic chamber 232 is configured to be fluidically coupleable to the second fluid port 218 of the first pneumatic chamber 212. In this manner, gas can be communicated from the first pneumatic chamber 212 via the fluid ports 218, 236 into the third pneumatic chamber 232. Additionally, the first fluid port 242 of the fourth pneumatic chamber 234 is configured to be fluidically coupleable to the second fluid port 224 of the second pneumatic chamber 214. In this manner, gas can be communicated from the second pneumatic chamber 214 via the fluid ports 224, 242 into the fourth pneumatic chamber 234.

The second pneumatic cylinder 230 is configured to be fluidically coupleable to the compressed gas storage chamber 204. Specifically, the second fluid port 238 of the third pneumatic chamber 232 is fluidically coupleable to the gas storage chamber, and the second fluid port 244 of the fourth pneumatic chamber 234 is fluidically coupleable to the compressed gas storage chamber 204.

As noted above, each of the first working piston 220 and the second working piston 240 are configured for reciprocating movement in the first pneumatic cylinder 210 and the second pneumatic cylinder 230, respectively. The first working piston 220 is coupled to the first hydraulic actuator 272, and the second working piston 220 is coupled to the second hydraulic actuator 274. The first hydraulic actuator 272 and the second hydraulic actuator 274 are each fluidically coupleable to the hydraulic controller 270.

The hydraulic controller is operable in a compression mode in which gas is discharged from the second pneumatic cylinder 230 to the compressed gas storage chamber at a higher pressure than it enters the first pneumatic cylinder 210 from the gas source 202. In the compression mode, the hydraulic controller 270 is configured to produce a hydraulic actuator force via the first hydraulic actuator 272 on the first working piston 220. Such hydraulic actuator force is sufficient to move the first working piston 220 in a first direction such that gas contained in the first pneumatic chamber 212 is discharged from the first pneumatic chamber into the third pneumatic chamber 232. The hydraulic actuator force is also sufficient to move the first working piston 220 in a second direction, opposite the first direction, such that gas contained in the second pneumatic chamber 214 is discharged from the second pneumatic chamber into the fourth pneumatic chamber 234. In the compression mode, the hydraulic controller 270 is also configured to produce a hydraulic actuator force via the second hydraulic actuator 274 on the second working piston 240. Such hydraulic actuator force is sufficient to move the second working piston 240 in a first direction such that gas contained in the third pneumatic chamber 232 is discharged from the third pneumatic chamber into the compressed gas storage chamber 204. The hydraulic actuator force is also sufficient to move the second working piston 220 in a second direction, opposite the first direction, such that gas contained in the fourth pneumatic chamber 234 is discharged from the fourth pneumatic chamber into the compressed gas storage chamber 204.

The hydraulic controller is also operable in an expansion mode in which gas is discharged from the first pneumatic cylinder 210 to the gas source at a lower pressure than it enters the second pneumatic cylinder 230 from the compressed gas storage chamber 204. In the expansion mode, gas can be transferred from the storage chamber 204 into the second pneumatic cylinder 230, and, when gas expands in at least one of the third pneumatic chamber 232 and the fourth pneumatic chamber 234 of the second pneumatic cylinder 230, the gas exerts a force on the second working piston 240, thereby moving the second working piston in one of the first direction and the second direction. When the second working piston 240 is moved by the expanding gas, the second working piston is configured to produce a hydraulic actuator force via the second hydraulic actuator 274, i.e. to do work on the second hydraulic actuator 274. The hydraulic controller 270 controls distribution of the work done on the hydraulic actuator to the pump/motor 271, where the work can be converted into mechanical power, which can then be converted into electrical power by the motor/generator 278.

Similarly, in the expansion mode, gas can be transferred from the first stage of expansion in the second pneumatic cylinder 230 into the first pneumatic cylinder 210 for a second stage of expansion. When gas expands in at least one of the first pneumatic chamber 212 or the second pneumatic chamber 214 of the first pneumatic cylinder 210, the gas exerts a force on the first working piston 220, thereby moving the first working piston in one of the first direction or the second direction. When the first working piston 220 is moved by the expanding gas, the first working piston 220 is configured to produce a hydraulic actuator force via the first hydraulic actuator 272, i.e. to do work on the first hydraulic actuator 272. The hydraulic controller 270 controls distribution of the work done on the hydraulic actuator to the pump/motor 271, where the work can be converted into mechanical power, which can then be converted into electrical power by the motor/generator 278.

The compression/expansion device 201 can include one or more valves to control the flow of gas between the gas source 202 and the compressed gas storage chamber 204. For example, a first valve 280 can be configured to selectively permit the gas to flow between the gas source 202 and the first pneumatic chamber 212. Similarly, a second valve 282 can be configured to selectively permit the gas to flow between the gas source 202 and the second pneumatic chamber 214. A third valve 284 and a fourth valve 286 can be configured to selectively permit the flow of gas between the first pneumatic chamber 212 and the third pneumatic chamber 232 and between the second pneumatic chamber 214 and the fourth pneumatic chamber 234, respectively. A fifth valve 288 is configured to selectively control the flow of gas between the third pneumatic chamber 232 and the compressed gas storage chamber 204. Similarly, a sixth valve 290 is configured to selectively control the flow of gas between the fourth pneumatic chamber 234 and the compressed gas storage chamber 204.

In use, the energy storage and recovery system 200, and the compression/expansion system 201 particularly, is configured to operate in the compression mode to compress gas for storage. As noted above, wind energy can be harvested by the wind turbines 209 of the wind farm 208 and converted by the wind turbines into electric power for delivery to the motor/generator 278. The motor/generator 278 inputs the electrical power into the pump/motor 271 where it is converted into hydraulic power. The hydraulic controller 270 controls distribution, such as using appropriate software and/or a system of valves, of the hydraulic power to actuate each of the first hydraulic actuator 272 and the second hydraulic actuator 274. Upon actuation, the first hydraulic actuator 272 moves the first working piston 220 within the first pneumatic cylinder 210 in the first direction. As the first working piston 220 is moved in the first direction, gas contained in the first pneumatic chamber 212 is discharged from the first pneumatic chamber via its second fluid port 218 into the third pneumatic chamber 232 via its first fluid port 236. Upon actuation, the second hydraulic actuator 274 moves the second working piston 240 within the second pneumatic cylinder 230 in the second direction. As the second working piston 240 is moved in the second direction, gas contained in the fourth pneumatic chamber 234 is discharged from the fourth pneumatic chamber via its second fluid port 244 to the compressed gas storage chamber 204.

Upon further actuation of the first hydraulic actuator 272, the first hydraulic actuator 272 moves the first working piston 220 within the first pneumatic cylinder 210 in the second direction. As the first working piston 220 is moved in the second direction, gas contained in the second pneumatic chamber 214 is discharged from the second pneumatic chamber via its second fluid port 224 into the fourth pneumatic chamber 234 via its first fluid port 242. Upon further actuation of the second hydraulic actuator 274, the second hydraulic actuator moves the second working piston 240 within the second pneumatic cylinder 230 in the first direction. As the second working piston 240 is moved in the first direction, gas contained in the third pneumatic chamber 232 is discharged from the third pneumatic chamber via its second fluid port 238 to the compressed gas storage chamber 204. In this manner, the second working piston 240 can be characterized as moving out of phase with the first working piston 220. In some embodiments, movement of the first working piston 240 in the first direction is substantially concurrent with movement of the second working piston 220 in the second direction, and vice versa. The compressed gas is then stored in the compressed gas storage chamber 204.

In use, the energy storage and recovery system 200, and the compression/expansion system 201 particularly, are also configured to operate in the expansion mode to expand compressed gas (e.g., to generate electrical energy). In the expansion mode, compressed gas is permitted to flow from the compressed gas storage chamber 204 into the fourth pneumatic chamber 234 of the second pneumatic cylinder 230. As the gas expands in the fourth pneumatic chamber 234, the gas exerts a force on the second working piston 240 to move the second working piston in the first direction, thereby increasing the volume of the fourth pneumatic chamber 234 and decreasing the volume of the third pneumatic chamber 232. Movement of the second working piston 240 in the first direction causes the second hydraulic actuator 274 to displace a first volume of hydraulic fluid. When the second working piston 240 is moved in the first direction, gas contained in the third pneumatic chamber 232 is displaced to the first pneumatic chamber 212. In the first pneumatic chamber 212, the displaced gas expands and exerts a force on the first working piston 220 to move the first working piston in the second direction, thereby increasing the volume of the first pneumatic chamber 212 and decreasing the volume of the second pneumatic chamber 214. Movement of the first working piston 220 in the first direction causes the first hydraulic actuator 272 to displace a second volume of hydraulic fluid. When the first working piston 220 is moved in the second direction, gas contained in the second pneumatic chamber 214 is displaced from the second pneumatic chamber to the gas source 202.

In the expansion mode, gas is also permitted to flow from the compressed gas storage chamber 204 into the third pneumatic chamber 232 of the second pneumatic cylinder 230. As the gas expands in the third pneumatic chamber 232, the gas exerts a force on the second working piston 240 to move the second working piston in the second direction, thereby increasing the volume of the third pneumatic chamber 232 and decreasing the volume of the fourth pneumatic chamber 234. Movement of the second working piston 240 in the second direction causes the second hydraulic actuator 274 to displace a third volume of hydraulic fluid. When the second working piston 240 is moved in the second direction, gas contained in the fourth pneumatic chamber 234 is displaced to the second pneumatic chamber 214. In the second pneumatic chamber 214, the displaced gas expands and exerts a force on the first working piston 220 to move the first working piston in the first direction, thereby increasing the volume of the second pneumatic chamber and decreasing the volume of the first pneumatic chamber 212. Movement of the first working piston 220 in the second direction causes the first hydraulic actuator 272 to displace a fourth volume of hydraulic fluid. When the first working piston 220 is moved in the first direction, gas contained in the first pneumatic chamber 212 is displaced from the first pneumatic chamber to the gas source 202.

The displacement of each of the first and third volumes of fluid by the second actuator 274 and of the second and fourth volumes of fluid by the first actuator 272 generates hydraulic power which the hydraulic controller 270 directs to the pump/motor 271, where the hydraulic power is converted to mechanical power. The motor/generator 278 is configured to convert the mechanical power to electrical power, which can be delivered to the electric power grid 206 for consumption.

Figure 3:
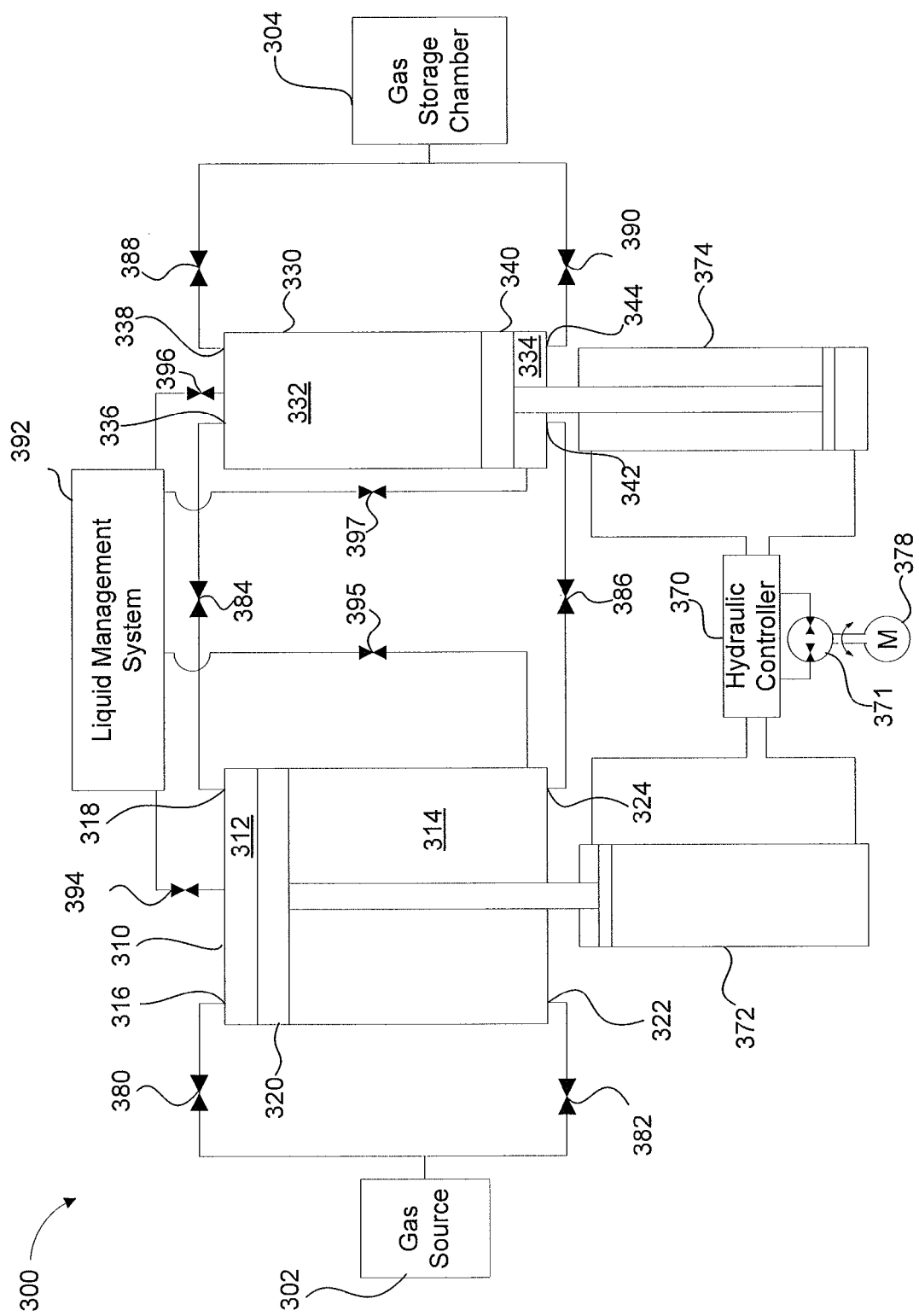
FIG. 3 is a schematic illustration of a compressed gas-based energy storage and recovery system, according to an embodiment.

A compression/expansion device 300 according to an embodiment is illustrated in FIG. 3. The device 300 includes a first pneumatic cylinder 310 divided into a first pneumatic chamber 312 and a second pneumatic chamber 314 by a first working piston 320. The first working piston 320 is coupled to a first hydraulic actuator 372, which is fluidically coupleable to a hydraulic controller 370. The hydraulic controller 370 is configured to control distribution of a hydraulic force or power from a pump/motor 371 to the first hydraulic actuator 372 and a second hydraulic actuator 374, described below. The pump/motor 371 is configured to convert mechanical power received from a motor/generator 378 into hydraulic power, and to convert hydraulic power into mechanical power to be transferred to the motor/generator. The motor/generator 378 is configured to convert mechanical power into electrical power, and to convert electrical power into mechanical power.

The first and second pneumatic chambers 312, 314 of the first pneumatic cylinder 310 are fluidically coupleable to a gas source 302. Gas from the gas source can be introduced into the first pneumatic chamber 312 via a first fluid port 316 of the first pneumatic chamber and into the second pneumatic chamber 314 via a first fluid port 322 of the second pneumatic chamber. Flow of gas between the gas source 302 and the first and second pneumatic chambers 312, 314 can be selectively controlled with valves 380, 382, respectively.

The device 300 includes a second pneumatic cylinder 330 divided into a third pneumatic chamber 332 and a fourth pneumatic chamber 334 by a second working piston 340. The second working piston 340 is coupled to the second hydraulic actuator 374, which is fluidically coupleable to the hydraulic controller 370. The third and fourth pneumatic chambers 332, 334 of the second pneumatic cylinder 330 have a collective volume less than a collective volume of the first and second pneumatic chambers 312, 314 of the first pneumatic cylinder 310. Additionally, a maximum volume of each of the third and fourth pneumatic chambers 332, 334 is less than a maximum volume of each of the first and second pneumatic chambers 312, 314.

The first pneumatic chamber 312 is fluidically coupleable to the third pneumatic chamber 332. Specifically, gas can be permitted to flow out of a second fluid port 318 of the first pneumatic chamber 312 and into the third pneumatic chamber 332 via a first fluid port 336 of the third pneumatic chamber. Gas can also be permitted to flow out of a second fluid port 324 of the second pneumatic chamber 314 and into the fourth pneumatic chamber 334 via a first fluid port 342 of the fourth pneumatic chamber. Flow of gas between the first and third pneumatic chambers 312, 332 can be selectively controlled with valve 384, and flow of gas between the second and fourth pneumatic chambers 314, 334 can be selectively controlled with valve 386.

The third and fourth pneumatic chambers 332, 334 are fluidically coupleable to a compressed gas storage chamber 304. Specifically, gas can flow between the third pneumatic chamber 332 via a second fluid port 338 of the third pneumatic chamber and the compressed gas storage chamber 34, and between the fourth pneumatic chamber 334 via a second fluid port 344 of the fourth pneumatic chamber and the compressed gas storage chamber 304. Flow of gas between the third and fourth pneumatic chambers 332, 334 and the compressed gas storage chamber 304 can be selectively controlled with valves 388, 390, respectively.

The device 300 can be similar in many respects to the compression/expansion devices described herein (e.g., compression/expansion device 100, compression/expansion device 201) and includes components similar in many respects to similarly identified components of such devices. Additionally, the device 300 is similar in operation to compress and/or expand a gas, as described above with respect to devices 100, 201. The device 300 also includes a liquid management system 392. The liquid management system 392 is fluidically coupleable with the first and second pneumatic chambers 312, 314 of the first pneumatic cylinder 310 and with the third and fourth pneumatic chamber 332, 334 of the second pneumatic cylinder 330. As such, the liquid management system 392 is configured to transfer a heat transfer fluid (e.g., a liquid or a heavy gas) to and/or from each pneumatic chamber 312, 314, 332, 334.

Flow of the heat transfer fluid (e.g., water) between the liquid management system 392 and the first and second pneumatic chambers 312, 314 can be selectively controlled by valves 394, 395, respectively. Flow of the heat transfer fluid between the liquid management system 392 and the third and fourth pneumatic chambers 332, 334 can be selectively controlled by valves 396, 397, respectively. In this manner, the liquid management system 392 is configured to change or otherwise control a temperature of gas as it is compressed and/or expanded within the compression/expansion device 300. For example, the liquid management system 392 can be configured to lower the temperature of the gas, such as when the compression/expansion device 300 is operating in the compression mode, for example, by transferring heat transfer fluid into at least one of the pneumatic chambers 312, 314, 332, 334 such that the heat transfer fluid can cool or otherwise draw heat away from gas contained within the respective pneumatic chamber.

In another example, the liquid management system 392 can be configured to increase the temperature of the gas, such as when the compression/expansion device 300 is operating in the expansion mode, for example, by transferring heat transfer fluid into at least one of the pneumatic chambers 312, 314, 332, 334 such that the heat transfer fluid can increase the heat of gas contained within the respective pneumatic chamber. Examples of devices and methods for optimizing heat transfer within a compression and/or expansion device are described in more detail in the '679 application incorporated by reference above.

Figure 4A:
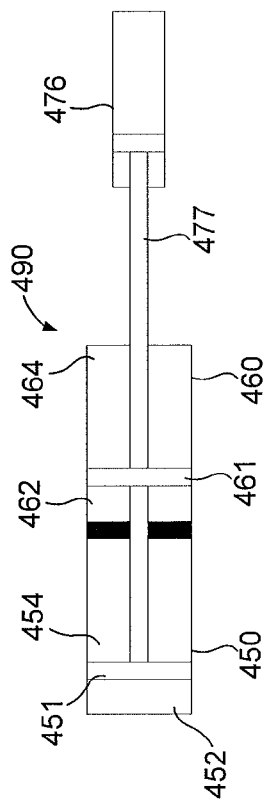
FIGS. 4A-4D are schematic illustrations of a lock pump used in a compressed gas-based energy storage and recovery system shown in a first, second and third configuration, respectively, according to an embodiment.
Figure 4B:
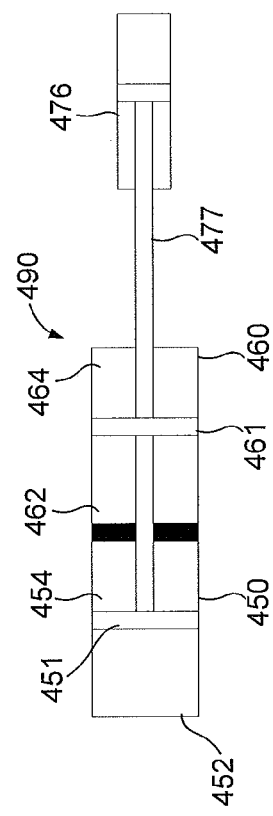
Figure 4C:
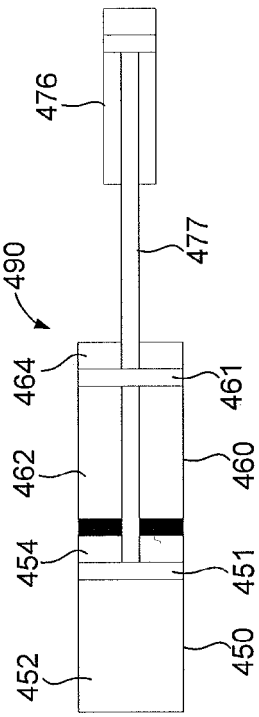

In some embodiments, the liquid management system 392 is configured to transfer heat transfer fluid to and/or from the pneumatic chambers 312, 314, 332, 334 using a lock pump (not shown in FIG. 3). For example, FIGS. 4A-4C illustrate a lock pump 490 that can be part of a liquid management system for transferring heat energy to and/or from a compression/expansion device. The lock pump 490 is shown in FIGS. 4A-4C in a first, second and third configuration, respectively. The lock pump 490 includes a first hydraulic cylinder 450, a second hydraulic cylinder 460, a first working piston 451, a second working piston 461, a piston rod 477, and an actuator 476.

The first and second hydraulic cylinders 450, 460 are each configured to contain fluid capable of absorbing and/or releasing heat, such as water, carbon dioxide, calcium chloride, brine, glycol and/or the like. Such fluid is also referred to herein as "heat transfer fluid." The first hydraulic cylinder 450 can be fluidically isolated from the second hydraulic cylinder 460 such that any heat transfer fluid contained within the first hydraulic cylinder 450 is prevented from flowing into the second hydraulic cylinder 460 and vice versa. The first hydraulic cylinder 450 can also be thermally isolated from the second hydraulic cylinder 460 so that each cylinder 450, 460 can contain and/or maintain fluid at a specific temperature irrespective of the temperature of fluid in the other cylinder. For example, the first hydraulic cylinder 450 can maintain fluid at 10 degrees Celsius and the second hydraulic cylinder 460 can maintain fluid at 60 degrees Celsius without affecting the temperature of the cooler fluid in the first hydraulic cylinder 450. The first hydraulic cylinder 450 can be separated (or isolated) from the second hydraulic cylinder 460 by a divider (not identified in FIGS. 4A-4C) such as, for example, a wall or other like barrier. In this example, the first hydraulic cylinder 450 and the second hydraulic cylinder 460 can be formed from a single cylindrical structure where the divider creates the boundaries of the cylinders 450, 460. In some embodiments, the first hydraulic cylinder 450 and the second hydraulic cylinder 460 can be separately formed structures that can be coupled together or, alternatively, spaced apart from each other. Although the first and second hydraulic cylinders 450, 460 are illustrated as being substantially the same size and shape, in other embodiments, the size and/or shape of each hydraulic cylinder 450, 460 can differ. For example, in some embodiments, the volume of the first hydraulic cylinder 450 can be greater than the volume of the second hydraulic cylinder 460.

The first working piston 451 is configured to be at least partially and movably disposed in the first hydraulic cylinder 450. The first working piston 451 divides the first hydraulic cylinder 450 into, and defines therewith, a first hydraulic chamber 452 and a second hydraulic chamber 454. The first working piston 451 is coupled to the actuator 476 via the piston rod 477. The actuator 476 can be, for example, an electric motor or a hydraulically driven actuator such as, for example, the hydraulic actuators described in the '724 application, incorporated by reference above. The actuator 476 can be used to move the first working piston 451 back and forth within the first hydraulic cylinder 450.

The second working piston 461 is configured to be at least partially disposed in the second hydraulic cylinder 460. The second working piston 461 divides the second hydraulic cylinder 460 into, and defines therewith, a third hydraulic chamber 462 and a fourth hydraulic chamber 462. The second working piston 461 is coupled to the actuator 476 via the piston rod 477. As such, the second working piston 461 is operatively coupled to, and moveable with, the first working piston 451. The actuator 476, therefore, can be used to move the second working piston 461 back and forth within the second hydraulic cylinder 460 at the same time the first working piston 451 is moved back and forth within the first hydraulic chamber 450. In other words, the first and second working pistons 451, 461 operate or move "in phase" with each other. This in-phase movement is illustrated and described below with respect to FIGS. 4A-4C. In other embodiments, the actuator 476 can be configured to move the first and second working pistons 451, 461 back and forth within their respective cylinders at different times such that the respective movement of the first and second working pistons 451, 461 is "out of phase."

As shown in FIG. 4A, the first working piston 451 and the second working piston 461 are in a first (or starting) position at or towards the end of their respective hydraulic cylinders 450, 460. The first working piston 451 is disposed within the first hydraulic cylinder 450 such that the volume of the first hydraulic chamber 452 is less than the volume of the second hydraulic chamber 454. In some embodiments, the first working piston 451 is disposed within the first hydraulic cylinder

450 such that the volume of the first hydraulic chamber 452 is at or near zero. In other embodiments, the first hydraulic chamber 452 can have a different minimum volume.

The second working piston 461 is disposed within the second hydraulic cylinder 460 such that the volume of the third hydraulic chamber 462 is less than the volume of the fourth hydraulic chamber 464. In some embodiments, the second working piston 461 is disposed within the second hydraulic cylinder 460 such that the volume of the third hydraulic chamber 462 is at or near zero. In other embodiments, the third hydraulic chamber 462 can have a different minimum volume.

As shown in FIG. 4A, the volume of the first hydraulic chamber 452 is substantially equal to the volume of the third hydraulic chamber 462, and the volume of the second hydraulic chamber 454 is substantially equal to the volume of the fourth hydraulic chamber 464. In some embodiments, the volume of two or more of these chambers 452, 454, 462, 464 are not equal (or substantially equal) and can vary depending on the structure of the lock pump 490 and/or the specific needs of the system. For example, in some embodiments, the second working piston 461 is coupled to the piston rod 477 and the second working piston 461 is disposed within the second hydraulic cylinder 460 such that the volume of the third hydraulic chamber 462 is greater than the volume of the first hydraulic chamber 452. In some embodiments, the size of the first hydraulic cylinder 450 differs from the size of the second hydraulic cylinder 460 such that the volumes of their respective chambers differ. In some instances, however, despite the size differences between the hydraulic cylinders 450, 460, the volume of the first hydraulic chamber 452 can still be substantially equal to the volume of the third hydraulic cylinder 462 due to the placement of the pistons 451, 461 within their respective hydraulic cylinders 450, 460.

In FIG. 4B, the first working piston 451 and the second working piston 461 are shown in a second, intermediate, position between the first position and third position. The first working piston 451 is disposed within the first hydraulic cylinder 450 such that the volume of the first and second hydraulic chambers 452, 454 are substantially equal, and the second working piston 461 is disposed within the first hydraulic cylinder 460 such that the volume of the third and fourth hydraulic chambers 462, 464 are also substantially equal. In some embodiments, however, the first and second hydraulic chambers 452, 454 can have different volumes, and/or the third and fourth hydraulic chambers 462, 464 can have different volumes.

The first and second working pistons 451, 461 are moved from the first position to the second position by the actuator 476. Specifically, the actuator 476 moves the first working piston 451 in a first direction towards an opposing end of the first hydraulic cylinder 450 while simultaneously moving the second working piston 461 in the first direction towards an opposing end of the second hydraulic cylinder 460. Since the first working piston 451 is operatively coupled to the second working piston 461 via the piston rod 477, the actuator 476 need only apply a force to one of the pistons 451, 461 to move the set of pistons 451, 461. In other words, moving the first working piston 451 in the first direction results in the second working piston 461 moving in the first direction. The distance that the first working piston 451 moves within the first hydraulic cylinder 450 is substantially equal to the distance that the second working piston 461 moves within the second hydraulic cylinder 460.

Movement of the pistons 451, 461 from the first position to the second position results in the volume of the first and third hydraulic chambers 452, 462 increasing and the volume of the second and fourth hydraulic chambers 454, 464 decreasing. Therefore, in the second position, the first and third hydraulic chambers 452, 462 are capable of containing more fluid than previously allowed in the first position, and the second and fourth hydraulic chambers 454, 464 are not capable of containing as much fluid as previously allowed in the first position. During operation of the lock pump 490 and as the pistons 451, 461 transition from the first position to the second position, additional fluid can be drawn into the first and third hydraulic chambers 452, 462 from an external source such as a pond, pool or tank, and fluid within the second and fourth hydraulic chambers 454, 464 can be discharged or expelled from the second and fourth hydraulic chambers 454, 464 to, for example, the compressor/expander device. As will be discussed in more detail herein, it is possible that fluid entering the hydraulic chambers 452, 462 can produce sufficient hydraulic force to move the pistons 451, 461. In this manner, the pistons 451, 461 can be moved by both the actuator 476 and hydraulic force.

In FIG. 4C, the first working piston 451 and the second working piston 461 are shown in a third (or final) position at or towards the opposing end of their respective hydraulic cylinders 450, 460. Movement of the first working piston 451 from its first position to its third position completes a first stroke of the first working piston 451. Likewise, the distance the second working piston 461 moves from its first position to its third position completes a first stroke of the second working piston 461. Since the first and second working pistons 451, 461 are operatively moveable together, these first strokes can be collectively referred to herein as a first stroke of the lock pump 490.

As shown in FIG. 4C, the first working piston 451 is disposed within the first hydraulic cylinder 450 such that the volume of the first hydraulic chamber 452 is greater than the volume of the second hydraulic chamber 454. In some embodiments, the first working piston 451 is disposed within the first hydraulic cylinder 450 such that the volume of the second hydraulic chamber 454 is at or near zero. In other embodiments, the second hydraulic chamber 454 can have a different minimum volume.

The second working piston 461 is disposed within the second hydraulic cylinder 460 such that the volume of the third hydraulic chamber 462 is greater than the volume of the fourth hydraulic chamber 464. In some embodiments, the second working piston 461 is disposed within the second hydraulic cylinder 460 such that the volume of the fourth hydraulic chamber 464 is at or near zero. In other embodiments, the fourth hydraulic chamber 464 can have a different minimum volume.

In FIG. 4C, the first working piston 451 is disposed within the first hydraulic cylinder 450 such that the volume of the first and second hydraulic chambers 452, 454 are substantially equal, and the second working piston 461 is disposed within the first hydraulic cylinder 460 such that the volume of the third and fourth hydraulic chambers 462, 464 are also substantially equal. In some embodiments, however, the first and second hydraulic chambers 452, 454 can have different volumes, and/or the third and fourth hydraulic chambers 462, 464 can have different volumes.

The first and second working pistons 451, 461 are moved from the second position to the third position by the actuator 476. Specifically, the actuator 476 continues moving the first working piston 451 in the first direction towards the opposing end of the first hydraulic cylinder 450 while simultaneously moving the second working piston 461 in the first direction towards the opposing end of the second hydraulic cylinder 460. Movement of the pistons 451, 461 from the second position to the third position results in the volume of the first and third hydraulic chambers 452, 462 increasing further and the volume of the second and fourth hydraulic chambers 454, 464 decreasing further. In the third position, the first and third hydraulic chambers 452, 462 are capable of containing more fluid than previously allowed in the first and second positions. In other words, the first and third hydraulic chambers 452, 462 are at their maximum volume in the third position and can therefore contain a maximum amount of fluid. To account for this increase in volume, additional fluid can be drawn into the first and/or third hydraulic chambers 452, 462. In contrast, when the second and fourth hydraulic chambers 454, 464 are in the third position, they are not capable of containing as much fluid as in the first and second positions. In other words, the second and fourth hydraulic chambers 454, 464 are at their minimum volume in the third position and, therefore, can only contain a minimum amount of fluid. To account for this decrease in volume, fluid can be discharged or expelled from the second and fourth hydraulic chambers 454, 464.

Although the lock pump 490 is illustrated and described as having a single actuator 476 for moving the first and second working pistons 451, 461, in other embodiments, the lock pump 490 can include two actuators. For example, the first actuator and the second actuator can be operatively coupled to the first and second working pistons 451, 461, respectively, via piston rods. In this manner, the first actuator can, for example, exert a force on the first working piston 451 to move the first and second working pistons 451, 461 in the first direction, and the second actuator can, for example, exert a force on the second working piston 461 to move the first and second working pistons 451, 461 in a second (or opposite) direction. In other embodiments, a first actuator (e.g., actuator 476) can be operatively coupled to the first working piston 451 via a first piston rod (e.g., piston rod 477) and a second actuator can be separately and operatively coupled to the second working piston 461 via a second piston rod. In this manner, movement of the first working piston 451 can be independent from movement of the second working piston 461. In this manner, the timing and/or distance to complete a stoke for the first working piston 451 can be different from the timing and/or distance required for the second working piston 461 to complete a stroke. The respective movement of the pistons 451, 461 can therefore be "out of phase."

Figure 4D:
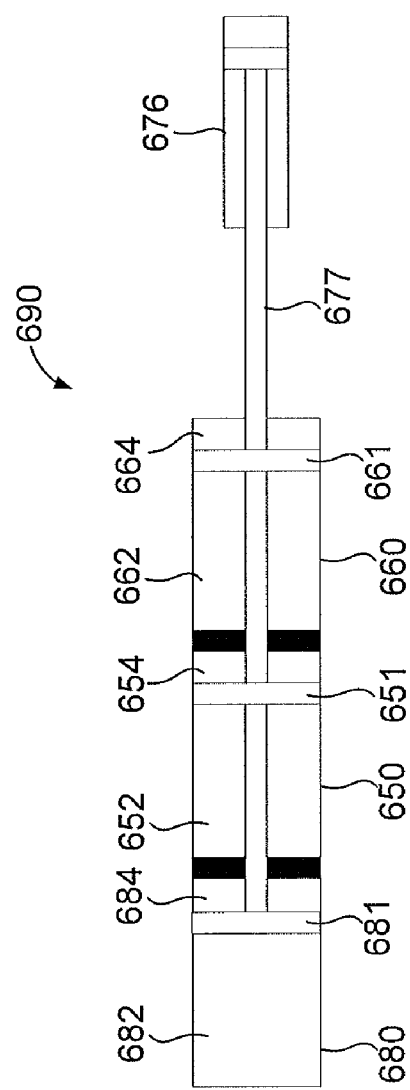

Although the lock pump 490 is illustrated and described as having two hydraulic cylinders 450, 460, in other embodiments, the lock pump 490 can any include any number of hydraulic cylinders. The lock pump 490 can include, for example, one hydraulic cylinder or more than two hydraulic cylinders. FIG. 4D is a schematic illustration of a lock pump 690 having three hydraulic cylinders 680, 650, 660. The lock pump 690 also includes three working pistons 681, 651, 661, a piston rod 677, and an actuator 676. In some embodiments, however, the lock pump 690 does not include the actuator 676. The first and second hydraulic cylinders 650, 660 and their respective chambers 652, 654, 662, 664 and pistons 651, 661 operate similar to the hydraulic cylinders 450, 460 and chambers 452, 454, 462, 464 and pistons 451, 461 shown in FIGS. 4A-4C and, therefore, are not described in detail herein. The actuator 676 operates similar to the actuator 476 shown in FIGS. 4A-4C and, therefore, is also not described in detail herein.

The third hydraulic cylinder 680 is configured to contain heat transfer fluid. In some embodiments, the third hydraulic cylinder 680 can contain a different type of heat transfer fluid from the first and/or second hydraulic cylinders 650, 660. For example, the third hydraulic cylinder 680 can contain a heavy gas, such as carbon dioxide, while the first and second hydraulic cylinders 650, 660 contain a liquid, such as water. The third hydraulic cylinder 680 can be fluidically isolated from the first hydraulic cylinder 650 and, in some embodiments, the third hydraulic cylinder 680 can also be thermally isolated from the first hydraulic cylinder 650. The third hydraulic cylinder 680 can be separated (or isolated) from the first hydraulic cylinder 650 by a divider (not identified in FIG. 4D) such as, for example, a wall or other like barrier. The hydraulic cylinders 680, 650, 660 can be formed from a single cylindrical structure where dividers create the boundaries of the cylinders 680, 650, 660. In some embodiments, the first, second, and/or third hydraulic cylinders 680, 650, 660 can be separately formed structures that can be coupled together or, alternatively, spaced apart from each other. For example, the first and second hydraulic cylinders 650, 660 can be formed from a single structure and the third hydraulic cylinder 680 is a separately formed structure that is coupled to the first hydraulic cylinder 650. The first, second, and third hydraulic cylinders 680, 650, 660 can have any suitable shape and/or size relative to each other.

The third working piston 681 operates similar to the first and second working pistons 651, 661. More specifically, the third working piston 681 is configured to be at least partially and movably disposed in the third hydraulic cylinder 680, thereby dividing the third hydraulic cylinder 680 into a fifth hydraulic chamber 682 and a sixth hydraulic chamber 684. The third working piston 681 is coupled to the actuator 676 via the piston rod 677. In this manner, the all three working pistons 681, 651, 661 are operatively coupled together and move simultaneously within their respective cylinders 680, 650, 660 in the same manner described above with respect to pistons 451, 461. In some embodiments, less than all the pistons 681, 651, 661 operate in phase with each other. In some embodiments, one or more of the pistons 681, 651, 661 operate out of phase with another piston.

The third working piston 681 is configured to move within the third hydraulic cylinder 680 between various positions. For example, the third working piston 681 is illustrated in FIG. 4D in the same position as the pistons 451, 461 shown in FIG. 4C—i.e., in a third (or final) position. The third working piston 681 can move from this position back to the second position and the first position in the same manner as the pistons 451, 461 shown in FIGS. 4A and 4B. Moving the third working piston 681 between these positions results in a change of the volume of the fifth and sixth hydraulic chambers 682, 684. In some embodiments, the third working piston 681 moves or is otherwise disposed within the third hydraulic cylinder 680 such that the volume of the fifth hydraulic chamber 682 is substantially equal to the volume of the first and third hydraulic chambers 652, 662. In other embodiments, the third working piston 681 moves or is otherwise disposed within the third hydraulic cylinder 680 such that the volume of the fifth hydraulic chamber 682 is different from the first and/or third hydraulic chambers 652, 662.

Referring to FIGS. 5A-5G, a compression/expansion device 500 according to an embodiment is configured for inclusion in a system for storing energy and for releasing energy that has previously been stored. Specifically, the compression/expansion device 500 is configured to compress gas for storage and to expand gas that has previously been compressed. As will be discussed in more detail herein, the device 500 is coupled to a liquid management system 592 that transfers fluid to and from the device 500 during the compression and expansion processes to optimize the thermal efficiency of the device 500. The liquid management system 592 can be similar in many respects to the liquid management systems described herein (e.g., liquid management system 192, and liquid management system 392) and includes components similar in many respects to similarly identified components of such systems (e.g., lock pump 490). The device 500 can be similar in many respects to the compression/expansion devices described herein (e.g., compression/expansion device 100, compression/expansion device 201, compression/expansion device 300) and includes components similar in many respects to similarly identified components of such devices. Details regarding the structure and operation of the device 500 are also described in a related application having Ser. No. 13/294,675, entitled "Systems and Methods for Compressing and/or Expanding a Gas Utilizing a Bi-Directional Piston and Hydraulic Actuator," which is incorporated by reference herein in its entirety.

The device 500 includes a first pneumatic cylinder 510 divided into a first pneumatic chamber 512 and a second pneumatic chamber 514 by a first working pneumatic piston 520. The first working pneumatic piston 520 is coupled to a first hydraulic actuator 572, which is fluidically coupleable to a hydraulic controller 570. The first and second pneumatic chambers 512, 514 of the first pneumatic cylinder 510 are fluidically coupleable to a gas source 502. Gas from the gas source can be introduced into the first pneumatic chamber 512 via a first fluid port 516 of the first pneumatic chamber 512 and into the second pneumatic chamber 514 via a first fluid port 522 of the second pneumatic chamber 514. Flow of gas between the gas source 502 and the first and second pneumatic chambers 512, 514 can be selectively controlled with valves 580, 582, respectively.

The first and second pneumatic chambers 512, 514 of the first pneumatic cylinder 510 are each fluidically coupleable to the liquid management system 592, and more particularly, to a lock pump 590 of the liquid management system 592. As will be described in more detail herein, fluid from the lock pump 590 can be introduced into the first pneumatic chamber 512 via a second fluid port 511 of the first pneumatic chamber 512 and into the second pneumatic chamber 514 via a second fluid port 515 of the second pneumatic chamber 514. Flow of fluid between the lock pump 590 and the first and second pneumatic chambers 512, 514 can be selectively controlled with valves 594, 595, respectively.

The device 500 includes a second pneumatic cylinder 530 divided into a third pneumatic chamber 532 and a fourth pneumatic chamber 534 by a second working pneumatic piston 540. The second working pneumatic piston 540 is coupled to a second hydraulic actuator 574, which is fluidically coupleable to the hydraulic controller 570. The third and fourth pneumatic chambers 532, 534 of the second pneumatic cylinder 530 have a collective volume less than a collective volume of the first and second pneumatic chambers 512, 514 of the first pneumatic cylinder 510. Additionally, a maximum volume of each of the third and fourth pneumatic chambers 532, 534 is less than a maximum volume of each of the first and second pneumatic chambers 512, 514.

The first pneumatic chamber 512 is fluidically couplable to the third pneumatic chamber 532. Specifically, fluids can be permitted to flow between a third fluid port 518 of the first pneumatic chamber 512 and a first fluid port 536 of the third pneumatic chamber 532. Fluids can also be permitted to flow between a third fluid port 524 of the second pneumatic chamber 514 and a first fluid port 542 of the fourth pneumatic chamber 534. Flow of fluid between the first and third pneumatic chambers 512, 532 can be selectively controlled with valve 584, and flow of fluid between the second and fourth pneumatic chambers 514, 534 can be selectively controlled with valve 586.

The third and fourth pneumatic chambers 532, 534 are each fluidically coupleable to the lock pump 590 of the liquid management system 592. As will be described in more detail herein, fluid from the lock pump 590 can be introduced into the third pneumatic chamber 532 via a second fluid port 531 of the third pneumatic chamber 532 and into the fourth pneumatic chamber 534 via a second fluid port 535 of the fourth pneumatic chamber 534. Flow of fluid between the lock pump 590 and the third and fourth pneumatic chambers 532, 534 can be selectively controlled with valves 596, 597, respectively.

The third and fourth pneumatic chambers 532, 534 are also each fluidically coupleable to a compressed gas storage chamber 504. Specifically, gas can flow between the third pneumatic chamber 532 via a third fluid port 538 of the third pneumatic chamber 532 and the compressed gas storage chamber 504, and between the fourth pneumatic chamber 534 via a third fluid port 545 of the fourth pneumatic chamber 534 and the compressed gas storage chamber 504. Flow of gas between the third and fourth pneumatic chambers 532, 534 and the compressed gas storage chamber 504 can be selectively controlled with valves 588, 590, respectively.

The liquid management system 592 includes the lock pump 590 and a liquid storage structure 575. The lock pump 590 includes a first hydraulic cylinder 550 divided into a first hydraulic chamber 552 and a second hydraulic chamber 554 by a first working hydraulic piston 551. The first working hydraulic piston 551 is coupled to a third hydraulic actuator 576, which is fluidically coupleable to the hydraulic controller 570. The first and second hydraulic chambers 552, 554 of the first hydraulic cylinder 550 are each fluidically coupleable to the liquid storage structure 575. The liquid storage structure 575 can be one or more suitable fluid reservoirs suitable for storing heat transfer fluid, such as, for example, a pond, a pool, a tank, an underground storage vessel, an aboveground storage vessel and/or the like. Fluid (i.e., heat transfer fluid) from the liquid storage structure 575 can be introduced into the first hydraulic chamber 552 via a first fluid port 543 of the first hydraulic chamber 552 and into the second hydraulic chamber 554 via a first fluid port 547 of the second hydraulic chamber 554. Flow of fluid between the liquid storage structure 575 and the first and second hydraulic chambers 552, 554 can be selectively controlled with valves 591, 593, respectively.

The first hydraulic chamber 552 of the first hydraulic cylinder 550 is fluidically coupleable to the first pneumatic chamber 512 of the first pneumatic cylinder 510, and the second hydraulic chamber 554 of the first hydraulic cylinder 550 is fluidically coupleable to the second pneumatic chamber 514 of the first pneumatic cylinder 510. Specifically, fluid can be permitted to flow between a second fluid port 513 of the first hydraulic chamber 552 and the second fluid port 511 of the first pneumatic chamber 512. Fluids can be permitted to flow between a second fluid port 517 of the second hydraulic chamber 554 and the second fluid port 515 of the second pneumatic chamber 514. Flow of fluid between the first hydraulic chamber 552 and the first pneumatic chamber 512 can be selectively controlled with valve 594, and flow of fluid between the second hydraulic chamber 554 and the second pneumatic chamber 514 can be selectively controlled with valve 595.

The lock pump 590 includes a second hydraulic cylinder 560 divided into a third hydraulic chamber 562 and a fourth hydraulic chamber 564 by a second working hydraulic piston 561. The second working hydraulic piston 561 is coupled to the third hydraulic actuator 576. As such, the second working hydraulic piston 561 is operatively coupled to, and moveable with, the first working piston 551. The third and fourth hydraulic chambers 562, 564 of the second hydraulic cylinder 560 are also each fluidically coupleable to the liquid storage structure 575. Fluid from the liquid storage structure 575 can be introduced into the third hydraulic chamber 562 via a first fluid port 527 of the third hydraulic chamber 562 and into the fourth hydraulic chamber 564 via a first fluid port 523 of the fourth hydraulic chamber 564. Flow of fluid between the liquid storage structure 575 and the third and fourth hydraulic chambers 562, 564 can be selectively controlled with valves 598, 599, respectively.

The third hydraulic chamber 562 of the second hydraulic cylinder 560 is fluidically coupleable to the fourth pneumatic chamber 534 of the second pneumatic cylinder 530, and the fourth hydraulic chamber 564 of the second hydraulic cylinder 560 is fluidically coupleable to the third pneumatic chamber 534 of the second pneumatic cylinder 530. Specifically, fluid can be permitted to flow between a second fluid port 537 of the third hydraulic chamber 562 and the second fluid port 535 of the fourth pneumatic chamber 534. Fluids can be permitted to flow between a second fluid port 533 of the fourth hydraulic chamber 564 and the second fluid port 531 of the third pneumatic chamber 532. Flow of fluid between the third hydraulic chamber 562 and the fourth pneumatic chamber 534 can be selectively controlled with valve 597, and flow of fluid between the fourth hydraulic chamber 564 and the third pneumatic chamber 532 can be selectively controlled with valve 596.

Figure 5A:
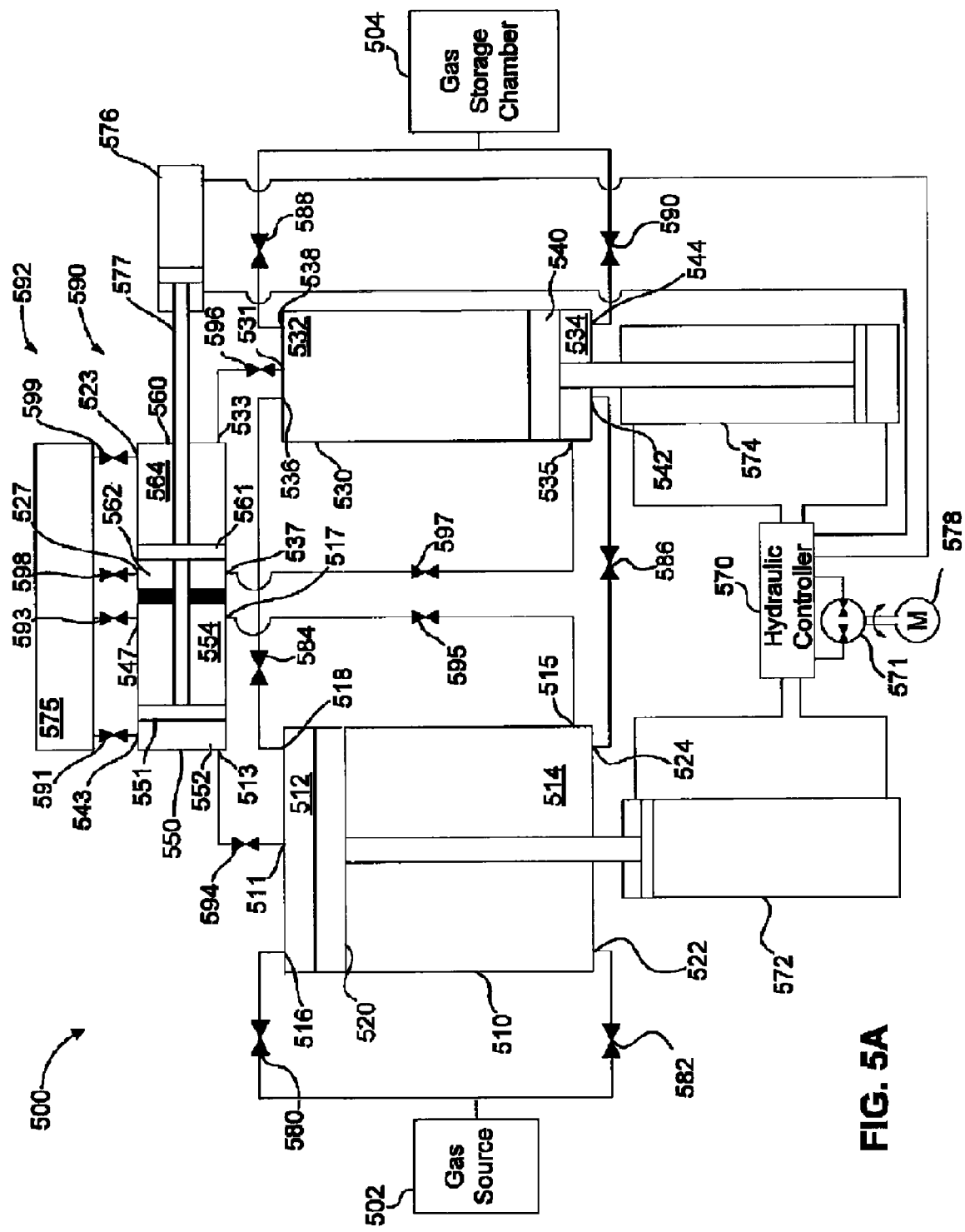
FIGS. 5A-5G are schematic illustrations of a compressed gas-based energy storage and recovery system shown in a first, second, third, fourth, fifth, sixth and seventh configuration, respectively, illustrating a compression cycle according to an embodiment.

Referring to FIGS. 5A-5G, the compression/expansion device 500 is illustrated in first, second, third, fourth, fifth, sixth, and seventh configurations, respectively, of a compression mode or cycle. As shown in FIG. 5A, in the first configuration, each valve 580, 582, 584, 586, 588, 590, 591, 593, 594, 595, 596, 597, 598, 599 is closed. The first working pneumatic piston 520 is in a first (or starting) position at or towards an end of the first pneumatic cylinder 510 such that the volume of the first pneumatic chamber 512 is less than the volume of the second pneumatic chamber 514. In some embodiments, when the first working pneumatic piston 520 is in its first position, the first working piston is disposed within the first pneumatic cylinder 510 such that the volume of the first pneumatic chamber 512 is at or near zero. In other embodiments, the first pneumatic chamber 512 can have a different minimum volume. In some embodiments, a first mass of gas at a first pressure is contained in the second pneumatic chamber 514.

The second working pneumatic piston 540 is in a first (or starting) position at or towards an end of the second pneumatic cylinder 530 such that the volume of the third pneumatic chamber 532 is greater than the volume of the fourth pneumatic chamber 534. In some embodiments, when the second working pneumatic piston 540 is in its first position, the second working pneumatic piston 540 is disposed within the second pneumatic cylinder 530 such that the volume of the fourth pneumatic chamber 534 is at or near zero. In other embodiments, the fourth pneumatic chamber 534 is configured to have a different minimum volume. A second mass of gas at a second pressure is contained in the third pneumatic chamber 534.

The first and second working hydraulic pistons 551, 561 are in a first (or starting) position at or towards an end of their respective hydraulic cylinders 550, 560 such that the volume of the second and fourth hydraulic chambers 554, 564 are greater than the volume of the first and third hydraulic chambers 552, 562. In some embodiments, when the first working hydraulic piston 551 is in its first position, the hydraulic piston 551 is disposed within the first hydraulic cylinder 550 such that the volume of the first hydraulic chamber 552 is at or near zero. In some such embodiments, the second working hydraulic piston 561 is also in its first position and disposed within the second hydraulic cylinder 560 such that the volume of the third hydraulic chamber 562 is at or near zero. In other embodiments, the first hydraulic chamber 552 and/or the third hydraulic chamber 562 are configured to have different minimum volumes. In some embodiments, the hydraulic chambers contain heat transfer fluid, such as water.

Figure 5B:
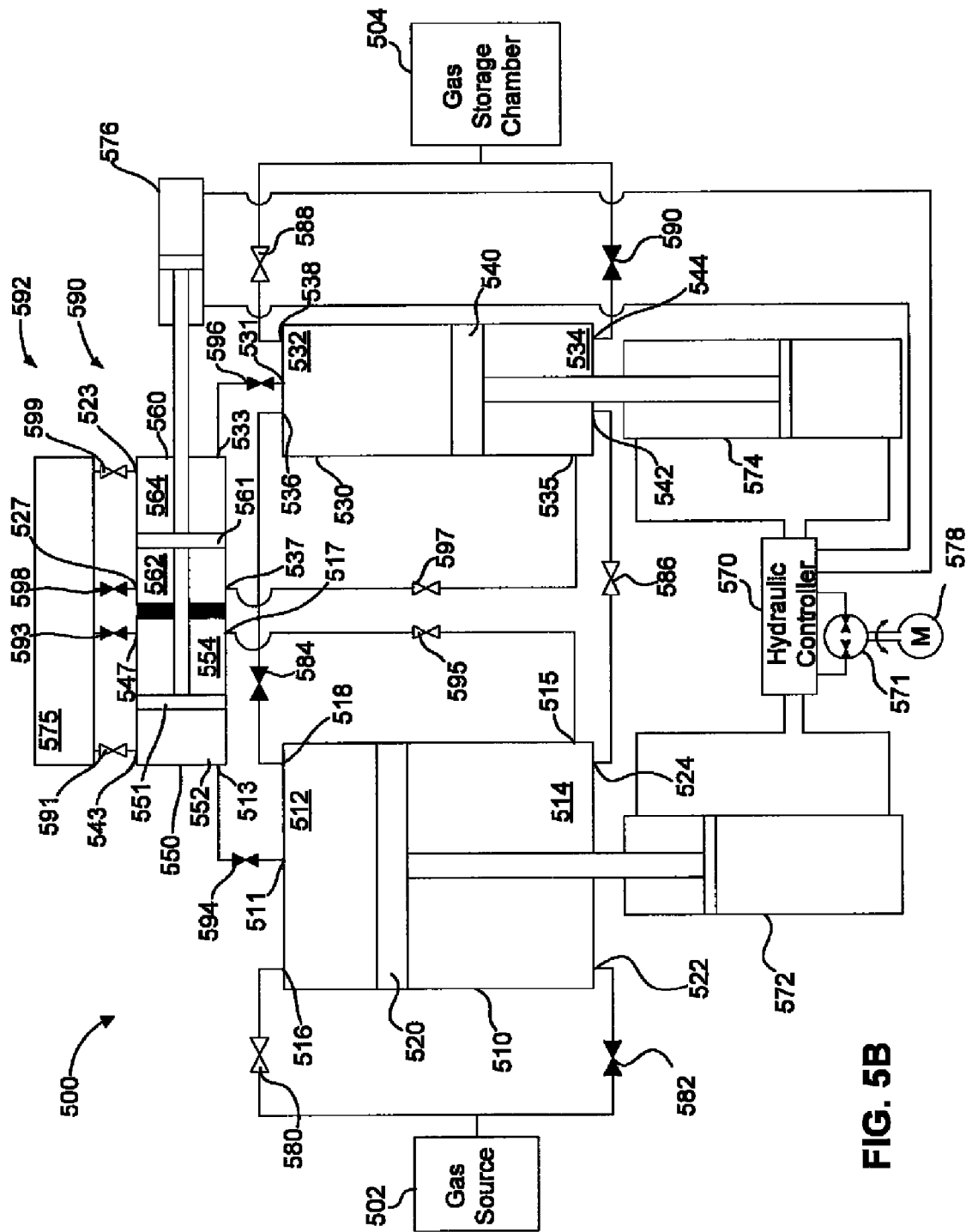

Turning now to FIG. 5B, the valves 580, 586, 588, 591, 595, 597, 599 are opened. At valve 591, the liquid storage structure 575 is fluidically coupled to the first hydraulic chamber 552 such that a first volume of liquid can flow from the liquid storage structure 575 into the first hydraulic chamber 552 via the first fluid port 543. The first working hydraulic piston 551 is moved by the third hydraulic actuator 576 in a first direction towards an opposing end of the first hydraulic cylinder 550, thereby increasing the volume of the first hydraulic chamber 552 and reducing the volume of the second hydraulic chamber 554.

As shown in FIG. 5B, the first working hydraulic piston 551 is in a second position (i.e., a first intermediate position) between its first position and its final, fourth position at or towards the end of the opposing end of the first hydraulic cylinder 550. Movement of the first working hydraulic piston 551 the distance from its first position to its fourth position completes a first stroke of the first working hydraulic piston 551. While moving in the first direction from its first position to its second position, the first working hydraulic piston 551 operates to draw a first volume of liquid from the liquid storage structure 575 into the first hydraulic chamber 552, and discharge a second volume of liquid from the second hydraulic chamber 554 into the second pneumatic chamber 514 of the first pneumatic cylinder 510. In other words, movement of the first working hydraulic piston 551 in the first direction pulls liquid from the liquid storage structure 575 into the first hydraulic chamber 552, and pushes (or forces) liquid out of the second hydraulic chamber 554 and into the second pneumatic chamber 514. The displacement of liquid into and out of the first and second hydraulic chambers 552, 554 can be due, in part, to pressure variances produced by the movement of the first working hydraulic piston 551 in the first direction.

At valve 580, the gas source 502 is fluidically coupled to the first pneumatic chamber 512 such that a third mass of gas at a third pressure can flow from the gas source 502 into the first pneumatic chamber 512 via the first fluid port 516. The first working pneumatic piston 520 is moved by the first hydraulic actuator 572 in a second direction towards an opposing end of the first pneumatic cylinder 510, thereby increasing the volume of the first pneumatic chamber 512 and reducing the volume of the second pneumatic chamber 514.

In FIG. 5B, the first working pneumatic piston 520 is shown in a second position (i.e., a first intermediate position) between its first position and its final, fourth position at or towards the opposing end of the first pneumatic cylinder 510. Movement of the first working piston 520 the distance from its first position to its fourth position completes a first stroke of the first working pneumatic piston 520. Movement of the first working pneumatic piston 520 in the second direction can occur substantially simultaneously with movement of the first working hydraulic piston 551 in the first direction. While moving in the second direction from its first position to its second position, the first working pneumatic piston 520 operates to compress the first mass of gas contained in the second pneumatic chamber 514, such that the first mass of gas is discharged from the second pneumatic chamber 514 to the fourth pneumatic chamber 534 at a fourth pressure higher than the first pressure. The valve 586 between the second pneumatic chamber 514 and the fourth pneumatic chamber 534 is opened when the first working pneumatic piston 520 is moved in its second direction to permit the first mass of gas to be discharged from the second pneumatic chamber 514 to the fourth pneumatic chamber 534 as it is being compressed.

In some embodiments, the second volume of liquid is introduced into the second pneumatic chamber 514 at the same time the first working pneumatic piston 520 is compressing the first mass of gas. The second volume of liquid is preferably a relatively cool or cold liquid that, upon contact with the first mass of gas, cools or lowers the temperature of the first mass of gas. Specifically, when the liquid enters the second pneumatic chamber 514 and contacts the first mass of gas, the heat energy produced during compression of the gas is transferred directly to the liquid. At least a portion of the warmed liquid is then allowed to flow from the second pneumatic chamber 514 to the fourth pneumatic chamber 534 along with the first mass of gas. In some embodiments, the heat energy is transferred to an intermediate structure disposed in the second pneumatic chamber 514. The intermediate structure can be, for example, a heat transfer element as described in the '679 application, incorporated by reference above. In such embodiments, the heat energy is further transferred from the intermediate structure to the liquid.

The second working pneumatic piston 540 is moved by the second hydraulic actuator 574 in a third direction, opposite the second direction, towards an opposing end (or top) of the second pneumatic cylinder 530, thereby increasing the volume of the fourth pneumatic chamber 534 and reducing the volume of the third pneumatic chamber 532. Movement of the second working pneumatic piston 540 in the third direction can occur substantially simultaneously with movement of the first working pneumatic piston 520 in the second direction. The valve 586 between the second pneumatic chamber 514 and the fourth pneumatic chamber 534 can be open while the first hydraulic actuator 572 moves the first working pneumatic piston 520 in the second direction and while the second hydraulic actuator 574 moves the second working pneumatic piston 540 in the third direction. In this manner, the total volume of the second pneumatic chamber 530 and the fourth pneumatic chamber 534 is reduced due, in part, to the difference in size between the first pneumatic cylinder 510 and the second cylinder 530.

In FIG. 5B, the second working pneumatic piston 540 is shown in a second position (i.e., a first intermediate position) between its first position and a final, fourth position at or towards an opposing end of the second pneumatic cylinder 530. Movement of the second working pneumatic piston 540 the distance from its first position to its fourth position completes a first stroke of the second working piston 540.

While moving in the third direction, the second working pneumatic piston 540 operates to compress the second mass of gas contained in the third pneumatic chamber 532, such that the second mass of gas is discharged from the third pneumatic chamber 532 to the compressed gas storage chamber 504 at a fifth pressure higher than the second pressure. As discussed above, compression of the second mass of gas results in heat energy being produced. The valve 588 between the third pneumatic chamber 532 and the compressed gas storage chamber 504 is opened when the second working pneumatic piston 540 is moving in the third direction to permit the second mass of gas to be discharged from the third pneumatic chamber 532 to the compressed gas storage chamber 504 as it is being compressed. In some embodiments, the third pneumatic chamber 532 contains liquid that can absorb the heat energy produced by the second mass of gas during compression so that the second mass of gas is cooled before being discharged from the third pneumatic chamber 532 to the compressed gas storage chamber 504.

As shown in FIG. 5B, the second working hydraulic piston 561 is in a second position (i.e., a first intermediate position) between its first position and its final, fourth position at or towards the end of the opposing end of the second hydraulic cylinder 560. Movement of the second working hydraulic piston 561 the distance from its first position to its fourth position completes a first stroke of the second working hydraulic piston 561. As discussed above, the second working hydraulic piston 561 is operatively coupled to the first working hydraulic piston 551 such that the first and second working hydraulic pistons 551, 561 move in phase, concurrently with each other. The first and second working hydraulic pistons 551, 561 move in the same direction and simultaneously complete strokes. The third hydraulic actuator 576 need only exert a force on one of the pistons 551, 561 to initiate movement of both of the pistons 551, 561 in a certain direction.

While moving in the first direction from its first position to its second position, the second working hydraulic piston 561 operates to receive a third volume of liquid from the fourth pneumatic chamber 534 into the third hydraulic chamber 562, and discharge a fourth volume of liquid from the fourth hydraulic chamber 564 into the liquid storage structure 575. In other words, movement of the second working hydraulic piston 561 in the first direction allows liquid from the fourth pneumatic chamber 534 to be received into the third hydraulic chamber 562, and pushes (or forces) liquid out of the fourth hydraulic chamber 564 and into the liquid storage structure 575. The displacement of liquid into and out of the third and fourth hydraulic chambers 562, 564 can be due, in part, to pressure differences produced by the movement of the second working hydraulic piston 561 in the first direction. For example, the pressure in the third hydraulic chamber 562 can be greater than the pressure in the fourth pneumatic chamber 534 when the second working hydraulic piston 561 is moved in the first direction, thus displacing the fourth volume of liquid into the liquid storage structure 575. In some embodiments, the lock pump 590 can be located below the pneumatic cylinders #, # such that the third volume of liquid is drawn to the third hydraulic chamber 562 by gravitational forces. In some embodiments, the third volume of liquid includes a portion of the second volume of liquid. In other words, some of the second volume of liquid remains within the fourth pneumatic chamber 534 after the second working hydraulic piston 561 is moved in the first direction. In other embodiments, however, all of the liquid contained within the fourth pneumatic chamber 534 can be transferred to the third hydraulic chamber 562.

Figure 5C:
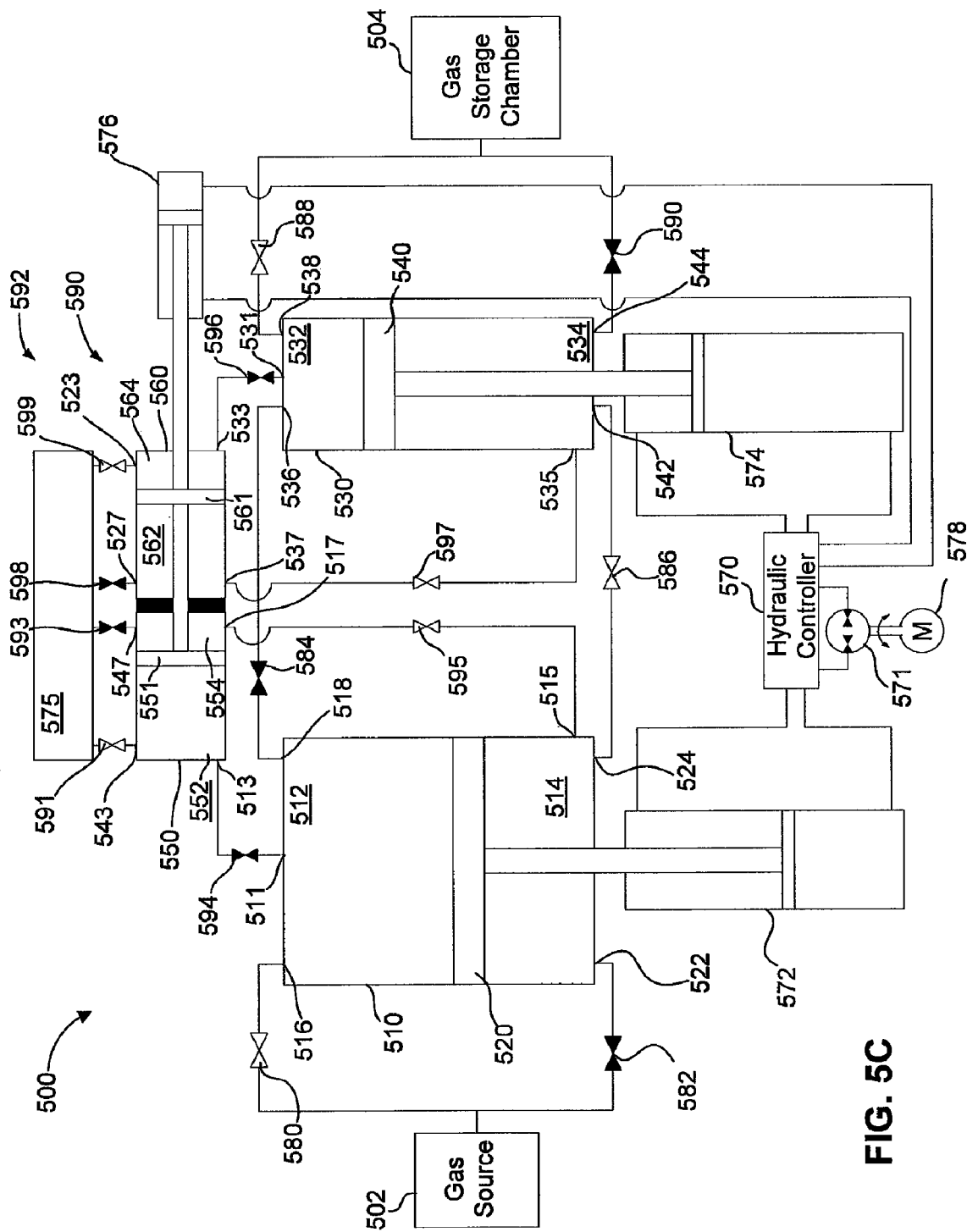

As shown in FIG. 5C, the valves 580, 586, 588, 591, 595, 597, 599 remain open as the pneumatic pistons 520, 540 and the hydraulic pistons 551, 561 continue moving in their respective directions. The first working pneumatic piston 520 is shown in FIG. 5C in a third position (i.e., a second intermediate position), closer to the opposing end of the first pneumatic cylinder 510 than it previously was in the second position (i.e., the first intermediate position). Gas and/or fluid continues to flow into and/or out of the first pneumatic cylinder in the same manner described above with respect to FIG. 5B. The second working pneumatic piston 540 is also shown in FIG. 5C in a third position (i.e., a second intermediate position), closer to the opposing end of the second pneumatic cylinder 530 than it previously was in the second position (i.e., the first intermediate position). Gas and/or fluid also continues to flow into and/or out of the second pneumatic cylinder 530 in the same manner described above with respect to FIG. 5B.

Furthermore, the first and second working hydraulic pistons 551, 561 are shown in FIG. 5C in a third position (i.e., a second intermediate position), closer to the opposing end of the first and second hydraulic cylinders 550, 560, respectively, than they previously were in the second position (i.e., the first intermediate position). The first and second working hydraulic pistons 551, 561 continue to be moved in the first direction by the third hydraulic actuator 576. In some embodiments, the amount of force that the third hydraulic actuator 576 exerts on the first and second working hydraulic pistons 551, 561 to move the first and second working hydraulic pistons 551, 561 is minimal (or nominal). For example, in some embodiments, the third hydraulic actuator 576 only exerts a force sufficient to overcome hydraulic head and frictional losses from fluid flows in the piping. Similarly, valves 586, 595, 597 are all open so the pressures in hydraulic chambers 554 and 562 and pneumatic chambers 514 and 534 are all equal (ignoring head pressure and frictional losses). Thus, with respect to the lock pump 590, the pressure in the second hydraulic chamber 554 is greater than the pressure in the first hydraulic chamber 552 and trying to force the first working hydraulic piston 551 to the left, and the pressure in the third hydraulic chamber 562 is greater than the pressure in the fourth hydraulic chamber 564 and trying to force the second working hydraulic piston 561 to the right. Therefore, the lock pump 590 is balanced and the third hydraulic actuator 576 can be sized such that it only needs to overcome the frictional losses and/or hydraulic head in order to move the volumes of liquid around.

In some embodiments, the fluid pressure within one or more of the hydraulic chambers 552, 554, 562, 564 is sufficient to move the first and second hydraulic pistons 551, 561 in the first direction in lieu of or in conjunction with the third hydraulic actuator 576. More specifically, the fluid pressure that is produced when liquid is introduced into one or more of the chambers 552, 554, 562, 564 can exert a hydraulic force on the first and/or second hydraulic pistons 551, 561 sufficient to move the hydraulic pistons 551, 561. For example, as shown in FIGS. 5B and 5C, the valve 591 between the first hydraulic chamber 552 and the liquid storage structure 575, and the valve 599 between the fourth hydraulic chamber 564 and the liquid storage structure 575 are both in the open position. In an embodiment where the liquid storage structure 575 is a containment pond opened to the atmosphere, the pressure in the first and fourth hydraulic chambers 552, 564 will be equal (e.g., 1 bar). Similarly, valves 586, 595, 597 are all open so the pressure in the second hydraulic chamber 554, the third hydraulic chamber 562, the second pneumatic chamber 514, and the fourth pneumatic chamber 534 are all substantially equal provided hydraulic head differentials and frictional pressure losses are minimal. Thus, as the pressure increases in the second and fourth pneumatic chambers 514, 534, the pressure increases in the second and third hydraulic chambers 554, 562. The increased pressure in the second hydraulic chamber 554 exerts a force on the first hydraulic working piston 551 in a fourth direction (opposite the first direction) and the increased pressure in the third hydraulic chamber 562 exerts a substantially equal and opposite force on the second hydraulic working piston 561 in the first direction. In some embodiments, this fluid pressure is the primary force acting on the first and second working hydraulic pistons 551, 561 to move the hydraulic pistons 551, 561 and the hydraulic force exerted by the third hydraulic actuator 576 can be a secondary force. In this matter, the lock pump 590 can be considered to be balanced during operation of the liquid management system 592 and the actuator 576 can be sized such that it only needs to overcome any hydraulic head and/or frictional losses in the system in order to move volumes of liquid between the liquid storage structure 575 and the compression/expander device 500. In some embodiments, the hydraulic force exerted by the third hydraulic actuator 576 can be a primary force and the hydraulic fluid pressure exerted by the liquid returning from the compressor/expander device 500 is the secondary force acting on the first and second working hydraulic pistons 551, 561.

Figure 5D:
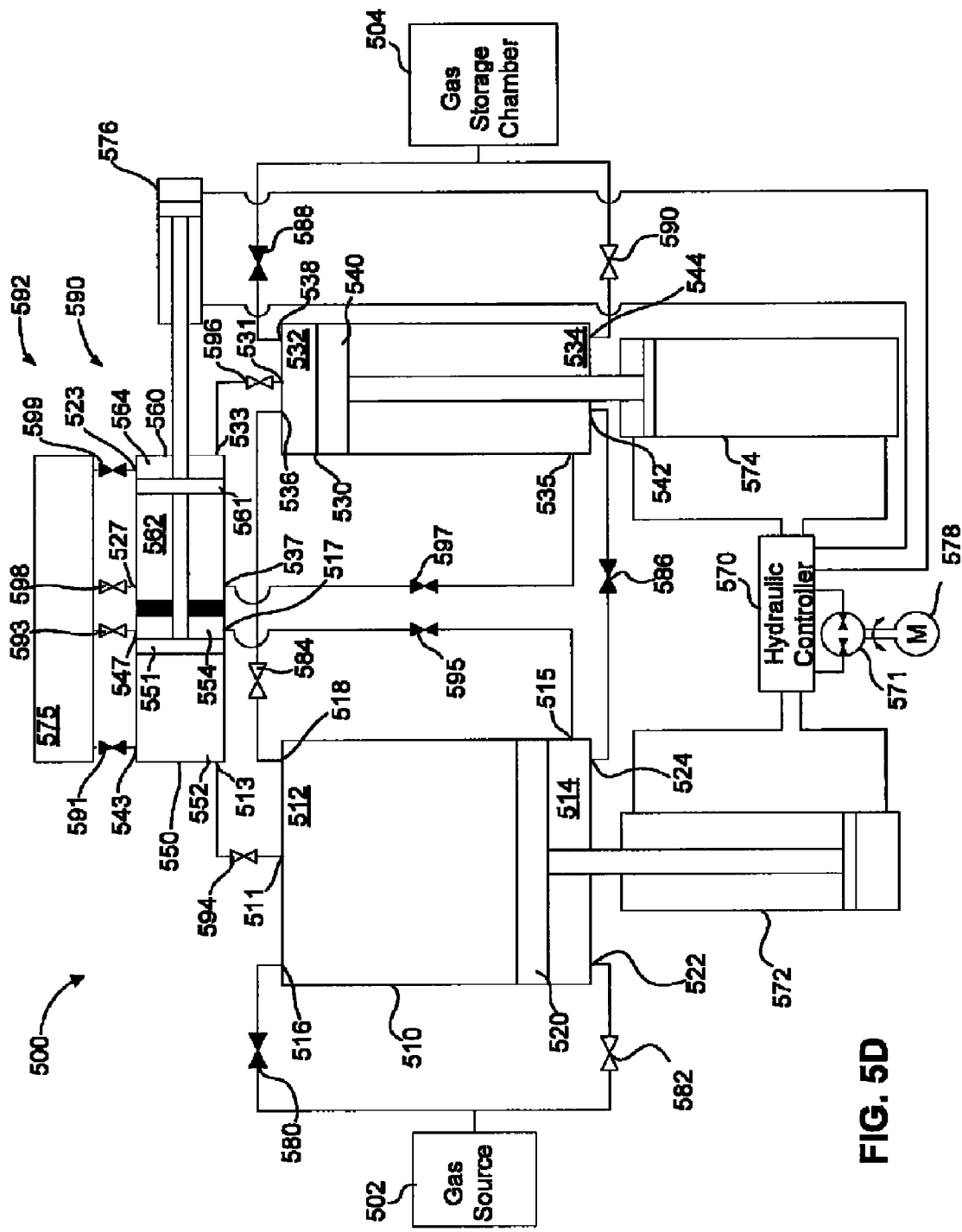

Referring now to FIG. 5D, the previously-opened valves 580, 586, 588, 591, 595, 597, 599 are closed and valves 582, 584, 590, 593, 594, 596, 598 are opened. The first working hydraulic piston 551 has completed its first stroke and is in its fourth position, at or proximate to the opposing end of the first hydraulic cylinder 550. As such, the first working hydraulic piston 551 is in position to begin its second stroke, in which the first working hydraulic piston 551 is moved the distance from its fourth position to its first position. In some embodiments, when the first working hydraulic piston 551 is in its fourth position, the first working hydraulic piston 551 is disposed within the first hydraulic cylinder 550 such that the volume of the second hydraulic chamber 554 is at or near zero. In other embodiments, the second hydraulic chamber 554 is configured to have a different minimum volume.

The second working hydraulic piston 561 has also completed its first stroke and is in its fourth position, at or proximate to the opposing end of the second hydraulic cylinder 560. As such, the second working hydraulic piston 561 is in position to begin its second stroke, in which the second working hydraulic piston 561 is moved the distance from its fourth position to its first position. Here, the first and second working hydraulic pistons 551, 561 move the same distance to complete a stroke. In some embodiments, when the second working hydraulic piston 561 is in its fourth position, the second working hydraulic piston 561 is disposed within the second hydraulic cylinder 560 such that the volume of the fourth hydraulic chamber 564 is at or near zero. In other embodiments, the fourth hydraulic chamber 564 is configured to have a different minimum volume.

In FIG. 5D, the first working pneumatic piston 520 has completed its first stroke and is in its fourth position, at or proximate to the opposing end of the first pneumatic cylinder 510. As such, the first working pneumatic piston 520 is in position to begin its second stroke, in which the first working pneumatic piston 520 is moved the distance from its fourth position to its first position. In some embodiments, when the first working pneumatic piston 520 is in its fourth position, the first working pneumatic piston 520 is disposed within the first pneumatic cylinder 510 such that the volume of the second pneumatic chamber 514 is at or near zero. In other embodiments, the second pneumatic chamber 514 is configured to have a different minimum volume.

The second working pneumatic piston 540 has completed its first stroke and is in its fourth position, at or proximate to the opposing end of the second pneumatic cylinder 530. As such, the second working pneumatic piston 540 is in position to begin its second stroke, in which the second working pneumatic piston 540 is moved the distance from its fourth position to its first position. In some embodiments, when the second working pneumatic piston 540 is in its fourth position, the second working pneumatic piston 540 is disposed within the second pneumatic cylinder 530 such that the volume of the third pneumatic chamber 532 is at or near zero. In other embodiments, the third pneumatic chamber 532 is configured to have a different minimum volume.

Figure 5E:
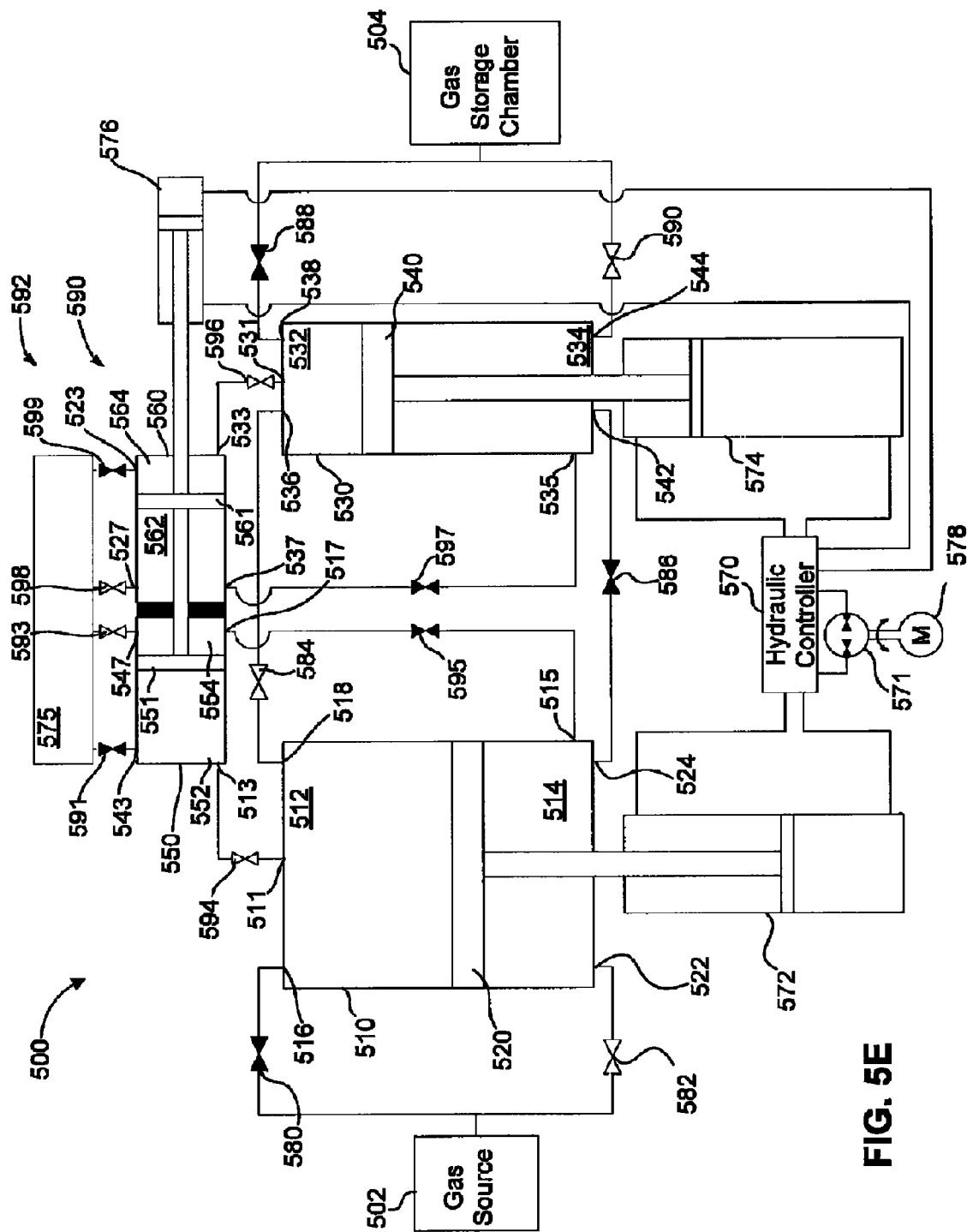

As shown in FIG. 5E, the valves 582, 584, 590, 593, 594, 596, 598 remain open. At valve 593, the liquid storage structure 575 is fluidically coupled to the second hydraulic chamber 554 such that a fifth volume of liquid can flow from the liquid storage structure 575 into the second hydraulic chamber 554 via the first fluid port 547. The first working hydraulic piston 551 is moved by the third hydraulic actuator 576 in a fourth direction, opposite the first direction, towards the opposing end of the first hydraulic cylinder 550, thereby increasing the volume of the second hydraulic chamber 554 and reducing the volume of the first hydraulic chamber 552.

As shown in FIG. 5E, the first working hydraulic piston 551 is in the third position between its fourth position and its first position during its second stroke. While moving in the fourth direction from its fourth position back to its third position, the first working hydraulic piston 551 operates to draw a fifth volume of liquid from the liquid storage structure 575 into the second hydraulic chamber 554, and discharge the first volume of liquid from the first hydraulic chamber 552 into the first pneumatic chamber 512 of the first pneumatic cylinder 510. In other words, movement of the first working hydraulic piston 551 in the fourth direction pulls liquid from the liquid storage structure 575 into the second hydraulic chamber 554, and pushes (or forces) liquid out of the first hydraulic chamber 552 and into the first pneumatic chamber 512.

At valve 582, the gas source 502 is fluidically coupled to the second pneumatic chamber 514 such that gas is permitted to flow from the gas source 502 into the second pneumatic chamber via its first fluid port 522. The first working pneumatic piston 520 is moved by the first hydraulic actuator 572 in the third direction, thereby increasing the volume of the second pneumatic chamber 514 and reducing the volume of the first pneumatic chamber 512. The first working pneumatic piston 520 is shown in its third position during its second stroke. While moving in the third direction, the first working pneumatic piston 520 operates to compress the third mass of gas contained in the first pneumatic chamber 512, thereby discharging the third mass of gas from the first pneumatic chamber 512 and into the third pneumatic chamber 532 at a sixth pressure higher than the third pressure. The valve 584 between the first pneumatic chamber 512 and the third pneumatic chamber 532 can be open while the first hydraulic actuator 572 moves the first working pneumatic piston 520 in the third direction and while the second hydraulic actuator 574 moves the second working pneumatic piston 540 in the second direction. In this manner, the total volume of the first pneumatic chamber 512 and the third pneumatic chamber 532 is reduced due, in part, to the difference in size between the first pneumatic cylinder 510 and the second cylinder 530.

Compression of the third mass of gas produces heat energy and, as a result, the temperature of the third mass of gas rises unless that heat energy is removed from the gas during the compression process. In some embodiments, the first volume of liquid is introduced into the first pneumatic chamber 512 as the third mass of gas is being compressed. The temperature of the liquid is relatively cooler than the temperature of the gas and, upon contact with the third mass of gas, cools or lowers the temperature of the gas. Said another way, heat energy produced by the third mass of gas is transferred directly to the first volume of liquid when the liquid contacts the gas. At least a portion of the warmed liquid is then allowed to flow from the first pneumatic chamber 512 to the third pneumatic chamber 532 along with the third mass of gas. In some embodiments, the heat energy is transferred to an intermediate structure disposed in the first pneumatic chamber 512. The intermediate structure can be, for example, a heat transfer element as described in the '679 application, incorporated by reference above. In such embodiments, the heat energy is further transferred from the intermediate structure to the liquid.

The second working pneumatic piston 540 is moved by the second hydraulic actuator 574 in the second direction, thereby increasing the volume of the third pneumatic chamber 532 and reducing the volume of the fourth pneumatic chamber 534. Movement of the second working pneumatic piston 540 in the second direction can occur substantially simultaneously with movement of the first working pneumatic piston 520 in the third direction. In FIG. 5E, the second working pneumatic piston 540 is shown in its third position during its second stroke. While moving in the second direction, the second working pneumatic piston 540 operates to compress the first mass of gas contained in the fourth pneumatic chamber 534, thereby discharging the first mass of gas from the fourth pneumatic chamber 534 to the compressed gas storage chamber 504 a seventh pressure higher than the fourth pressure.

As discussed above, compression of the first mass of gas results in heat energy being produced. The valve 590 between the fourth pneumatic chamber 534 and the compressed gas storage chamber 504 is opened when the second working pneumatic piston 540 is moving in the second direction to allow the first mass of gas to be discharged from the fourth pneumatic chamber 534 to the compressed gas storage chamber 504 as it is being compressed. In some embodiments, the fourth pneumatic chamber 534 contains liquid that can absorb the heat energy produced by the first mass of gas during compression so that the first mass of gas is cooled before being discharged from the fourth pneumatic chamber 534 to the compressed gas storage chamber 504.

As shown in FIG. 5E, the second working hydraulic piston 561 is in the third position during its second stroke. As discussed above, the second working hydraulic piston 561 moves with the first working hydraulic piston 551. Here, the second working hydraulic piston 561 moves in the fourth direction with the first working hydraulic piston 551. While moving in the fourth direction from its fourth position to its third position, the second working hydraulic piston 561 operates to draw a sixth volume of liquid (e.g., including at least a portion of the first volume of liquid) from the third pneumatic chamber 532 into the fourth hydraulic chamber 564, and discharge the third volume of liquid (e.g., including at least a portion of the second volume of liquid) from the third hydraulic chamber 562 into the liquid storage structure 575. In other words, movement of the second working hydraulic piston 561 in the fourth direction pulls liquid from the third pneumatic chamber 532 into the fourth hydraulic chamber 564, and pushes (or forces) liquid out of the third hydraulic chamber 562 and into the liquid storage structure 575. In some embodiments, at least a portion of the first volume of liquid can remain within the third pneumatic chamber 532 after the second working hydraulic piston 561 has completed its second stroke in the fourth direction. In this manner, the remaining portion of the first volume of liquid can be used to cool gas that enters the third pneumatic chamber 532 during the next compression cycle. In other embodiments, the first volume of liquid is removed from the third pneumatic chamber 532 completely, and transferred to the fourth hydraulic chamber 564. In such embodiments, the first volume of liquid can be substantially equal to the sixth volume of liquid.

In some embodiments, the third pneumatic chamber 532 can retain heat energy produced by another previously compressed mass of gas in addition to the heat energy produced by the third mass of gas. The first volume of liquid can be configured to absorb the heat energy produced by compression of a previous mass of gas and the heat energy produced by compression of the third mass of gas before any portion of the first volume of liquid is discharged from the third pneumatic chamber 532. As will be discussed in more detail below, this warmed liquid can be re-used during the expansion cycle to warm gas as it expands.

Figure 5F:
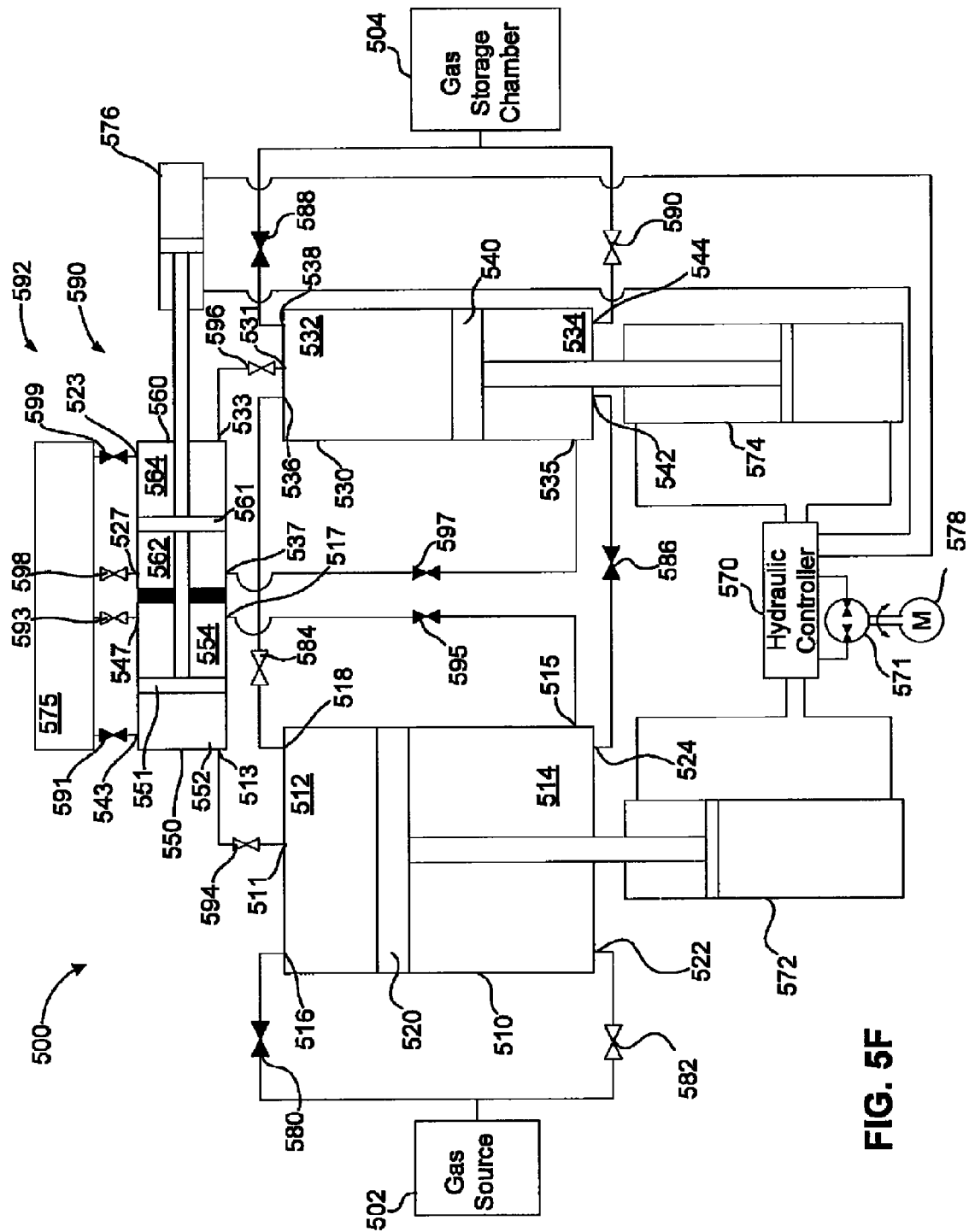

As shown in FIG. 5F, the valves 582, 584, 590, 593, 594, 596, 598 remain open as the pneumatic pistons 520, 540 and the hydraulic pistons 551, 561 continue moving in their respective directions. The first working pneumatic piston 520 is shown in FIG. 5F in its second position during its second stroke. Fluids continues to flow into and/or out of the first pneumatic cylinder 510 in the same manner described above with respect to FIG. 5E. The second working pneumatic piston 540 is also shown in FIG. 5F in its second position during its second stroke. Fluids also continues to flow into and/or out of the second pneumatic cylinder 530 in the same manner described above with respect to FIG. 5E.

Furthermore, the first and second working hydraulic pistons 551, 561 are shown in FIG. 5F in their second position during their second stroke. The first and second working hydraulic pistons 551, 561 continue to be moved in the second direction by the third hydraulic actuator 576. As discussed above, in some embodiments, the amount of force that the third hydraulic actuator 576 exerts on the first and second working hydraulic pistons 551, 561 to move the first and second working hydraulic pistons 551, 561 is minimal (or nominal). The force exerted by the third hydraulic actuator 576 can be sufficient to overcome hydraulic head and/or frictional losses, as previously discussed.

Figure 5G:
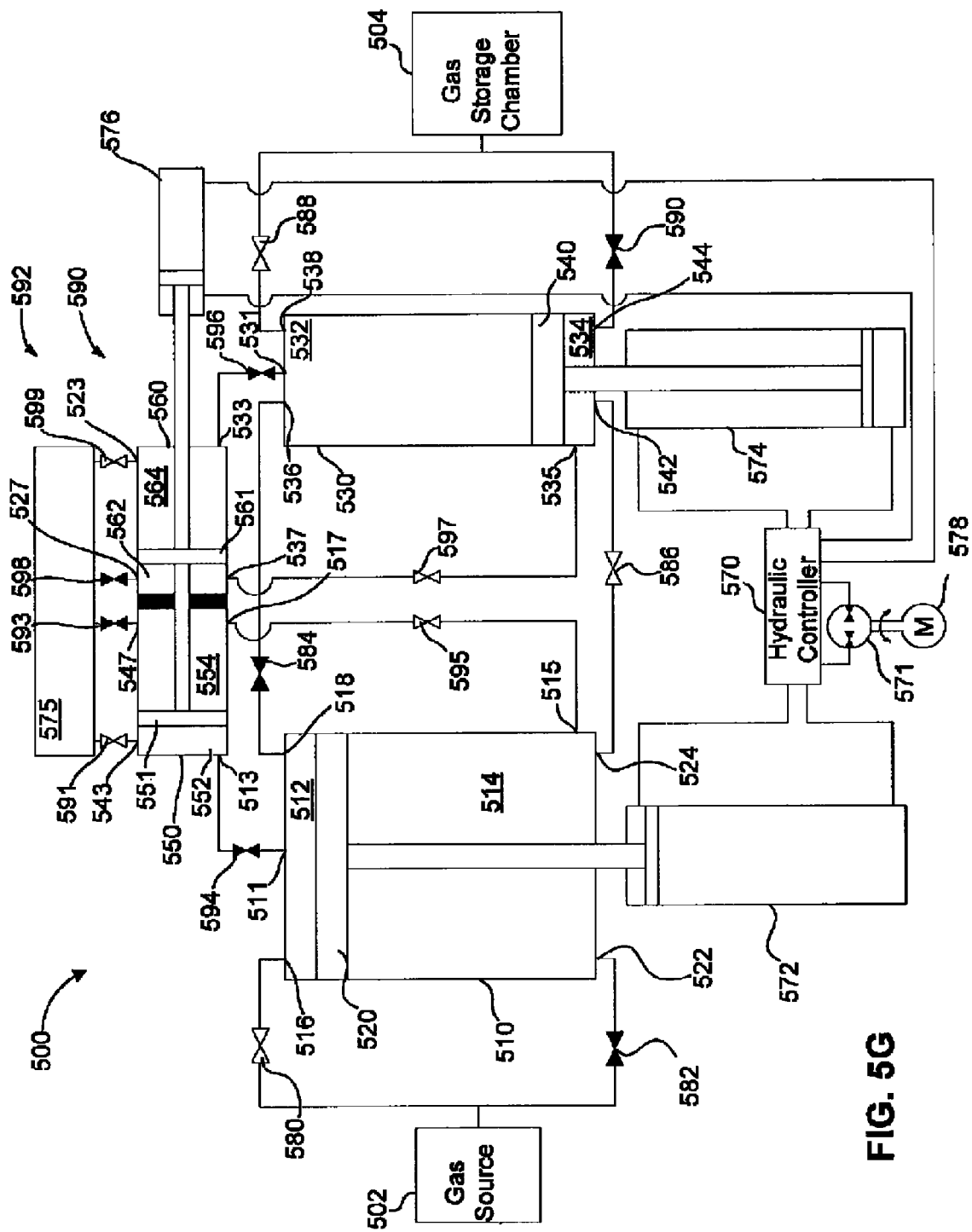

Referring to FIG. 5G, the valves 582, 584, 590, 593, 594, 596, 598, which were previously open, are now closed and the valves 580, 586, 588, 591, 595, 597, 599 are reopened. More particularly, the valve 582 is closed to stop the flow of gas from the gas source 502 to the third pneumatic chamber 514. The third mass of gas has been discharged from the first pneumatic chamber 512 to the third pneumatic chamber 532 at the sixth pressure higher than the second pressure, and is contained in the third pneumatic chamber 532. The valve 584 between the first pneumatic chamber 512 and the third pneumatic chamber 532 is closed to prevent the third mass of gas from flowing back into the first pneumatic chamber 512 from the third pneumatic chamber 532. The first mass of gas has been discharged from the fourth pneumatic chamber 534 to the compressed gas storage chamber 504 at the seventh pressure higher than the fourth pressure. The valve 590 between the fourth pneumatic chamber 534 and the compressed gas storage chamber 504 is closed to prevent the first mass of gas from flowing back into the fourth pneumatic chamber 534 from the storage chamber 504. Valves 580, 586, 588, 591, 595, 597, 599 are opened to permit the compression cycle to be continued or repeated.

As noted above, when a mass of gas is transferred into a pneumatic chamber (e.g., first, second, third, or fourth pneumatic chambers 512, 514, 532, 534, respectively), the valve (e.g., valve 580, 582, 584, 586, respectively) associated with the inlet port (e.g., port 516, 522, 536, 542, respectively) is closed to prevent backwards flow of the gas during compression. Additionally, the valve (e.g., valve 584, 586, 588, 590, respectively) associated with the outlet port (e.g., port 518, 524, 538, 545, respectively) of the respective pneumatic chamber is opened to permit the gas to be transferred to the next downstream chamber as the gas is being compressed.

As shown in FIG. 5G, the pneumatic pistons 520, 540 and the hydraulic pistons 551, 561 have completed their second stroke and each piston 520, 540, 551, 561 is now back in their first position (see, for example, FIG. 5A). In some embodiments, the pistons 520, 540, 551, 561 move concurrently with each other and can have the same stroke time. In other words, in some embodiments, the pistons 520, 540, 551, 561 can begin and/or end their respective strokes at the same time. In some embodiments, the pistons 520, 540, 551, 561 can have the same stroke time (e.g., three (3) seconds per stroke) but one or more of the pistons 520, 540, 551, 561 start their stroke at different times. In other embodiments, the timing of one or more of the pistons 520, 540, 551, 561 can vary. For example, in some embodiments, the first working pneumatic piston 520 can have a stroke time (i.e., the time it takes for piston 520 to move from its first position to its fourth position) of approximately five (5) seconds, the second working pneumatic piston 540 can have a stroke time of approximately four (4) seconds, and the first and second working hydraulic pistons 551, 561 can have a stroke time of approximately three (3) seconds. Stroke times can vary, for example, based on the size and/or operation of the cylinders and/or pistons.

Figure 6A:
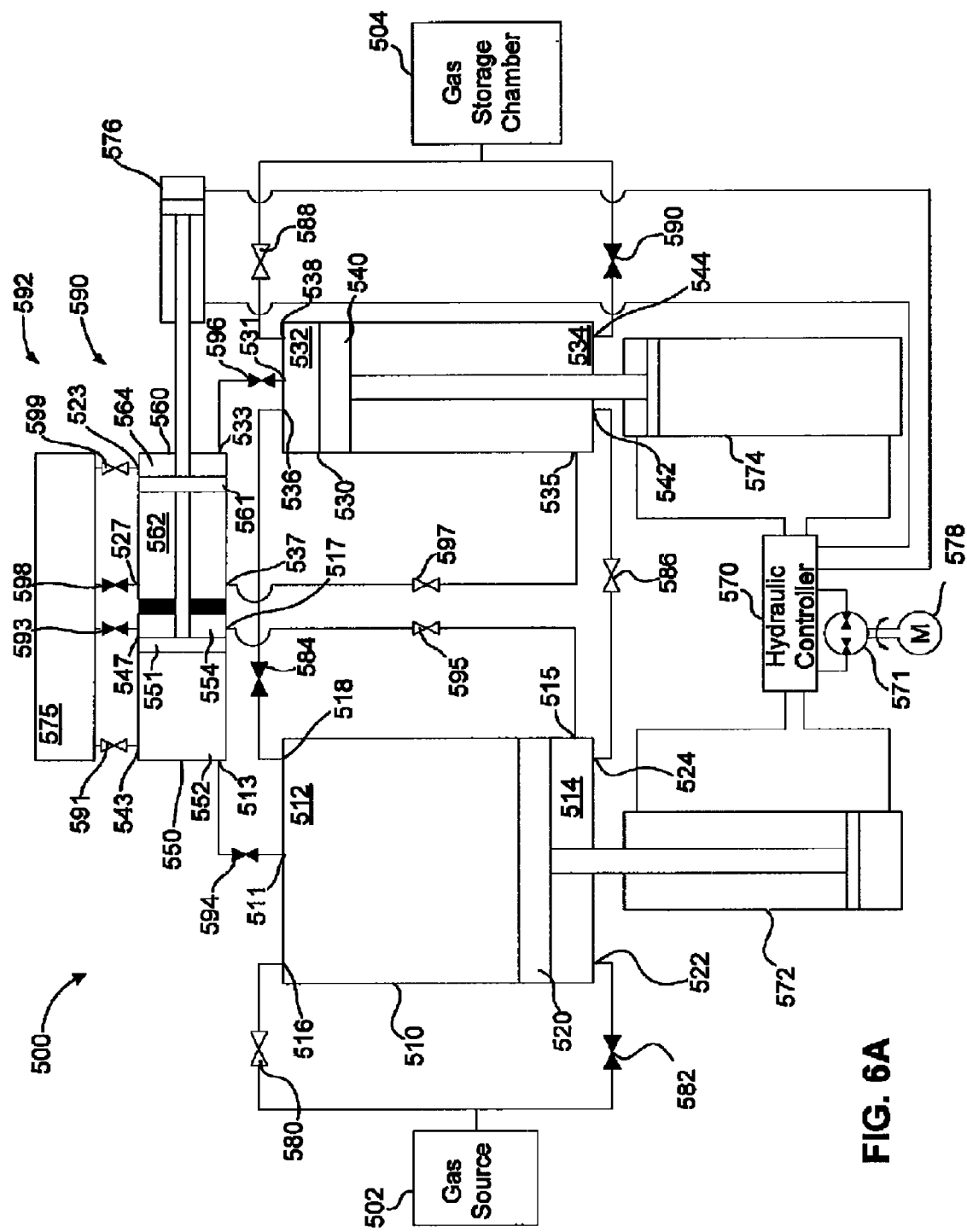
FIGS. 6A-6G are schematic illustrations of the compressed gas-based energy storage and recovery system of FIGS. 5A-5G shown in a first, second, third, fourth, fifth, sixth and seventh configuration, respectively, illustrating an expansion cycle according to an embodiment.

Referring to FIGS. 6A-6G, the compression/expansion device 500 is illustrated in first, second, third, fourth, fifth, sixth and seventh configurations, respectively, of an expansion mode or cycle. As shown in FIG. 6A, in the first configuration of the expansion mode, the valves 580, 586, 588, 591, 595, 597, 599 are opened. The first and second working hydraulic pistons 551, 561 are in their fourth position within their respective hydraulic cylinders 550, 560 such that the volume of the first hydraulic chamber 552 is greater than the volume of the second hydraulic chamber 562, and the third hydraulic chamber 562 is greater than the volume of the fourth hydraulic chamber 564. The valve 599 between the fourth hydraulic chamber 564 and the liquid storage structure 575 is opened. In this manner, the fourth hydraulic chamber 564 is fluidically coupled to the liquid storage structure 575 such that a first volume of fluid can flow from the liquid storage structure 575 to the fourth hydraulic chamber 564 via the first fluid port 523. The valve 591 between the first hydraulic chamber 553 and the liquid storage structure 575 is also opened, and the first hydraulic chamber 553 is fluidically coupled the liquid storage structure 575 such that fluid from the first hydraulic chamber 553 can flow from the first hydraulic chamber 553 to the liquid storage structure 575. The valve 597 between the third hydraulic chamber 562 and the fourth pneumatic chamber 534 is opened such that the third hydraulic chamber 562 is fluidically coupled to the fourth pneumatic chamber 534, and a second volume of liquid can flow from the third hydraulic chamber 562 to the fourth pneumatic chamber 534.

The second working pneumatic piston 540 is in its fourth position within the second pneumatic cylinder 530 such that the volume of the third pneumatic chamber 532 is less than the volume of the fourth pneumatic chamber 534. The valve 588 between the compressed gas storage chamber 504 and the third pneumatic chamber 532 is opened. In this manner, the compressed gas storage chamber 504 is fluidically coupled to the third pneumatic chamber 532 such that a first mass of compressed gas at a first pressure can flow from the compressed gas storage chamber 504 into the third pneumatic chamber 532 via the third fluid port 538. In some embodiments, a second mass of compressed gas at a second pressure is contained in the fourth pneumatic chamber 534. The valve 586 between the fourth pneumatic chamber 534 and the second pneumatic chamber 514 is opened. In this manner, the fourth pneumatic chamber 534 is fluidically coupled to the second pneumatic chamber 512 such that the second mass of compressed gas and/or the second volume of liquid can flow from the fourth pneumatic chamber (via its first fluid port 542) to the second pneumatic chamber (via its second fluid port 524) at the second pressure.

The first working pneumatic piston 520 is in its fourth position within the first pneumatic cylinder 510 such that the volume of the first pneumatic chamber 512 is greater than the volume of the second pneumatic chamber 514. The valve 695 between the second pneumatic chamber 514 and the second hydraulic chamber 554 is opened. In this manner, the second pneumatic chamber 514 is fluidically coupled to the second hydraulic chamber 554 such that a third volume of fluid (e.g., including the second volume of liquid or at least a portion thereof) can flow from the second pneumatic chamber 514 to the second hydraulic chamber 554. A third mass of compressed gas at a third pressure can be contained in the first pneumatic chamber 512. The valve 580 between the first pneumatic chamber 512 and the gas source 502 is opened, and thus the first pneumatic chamber 512 is fluidically coupled to the gas source 502 such that the third mass of compressed gas can flow from the first pneumatic chamber 512 via the first fluid port 516 to the gas source 502 at the third pressure.

Figure 6B:
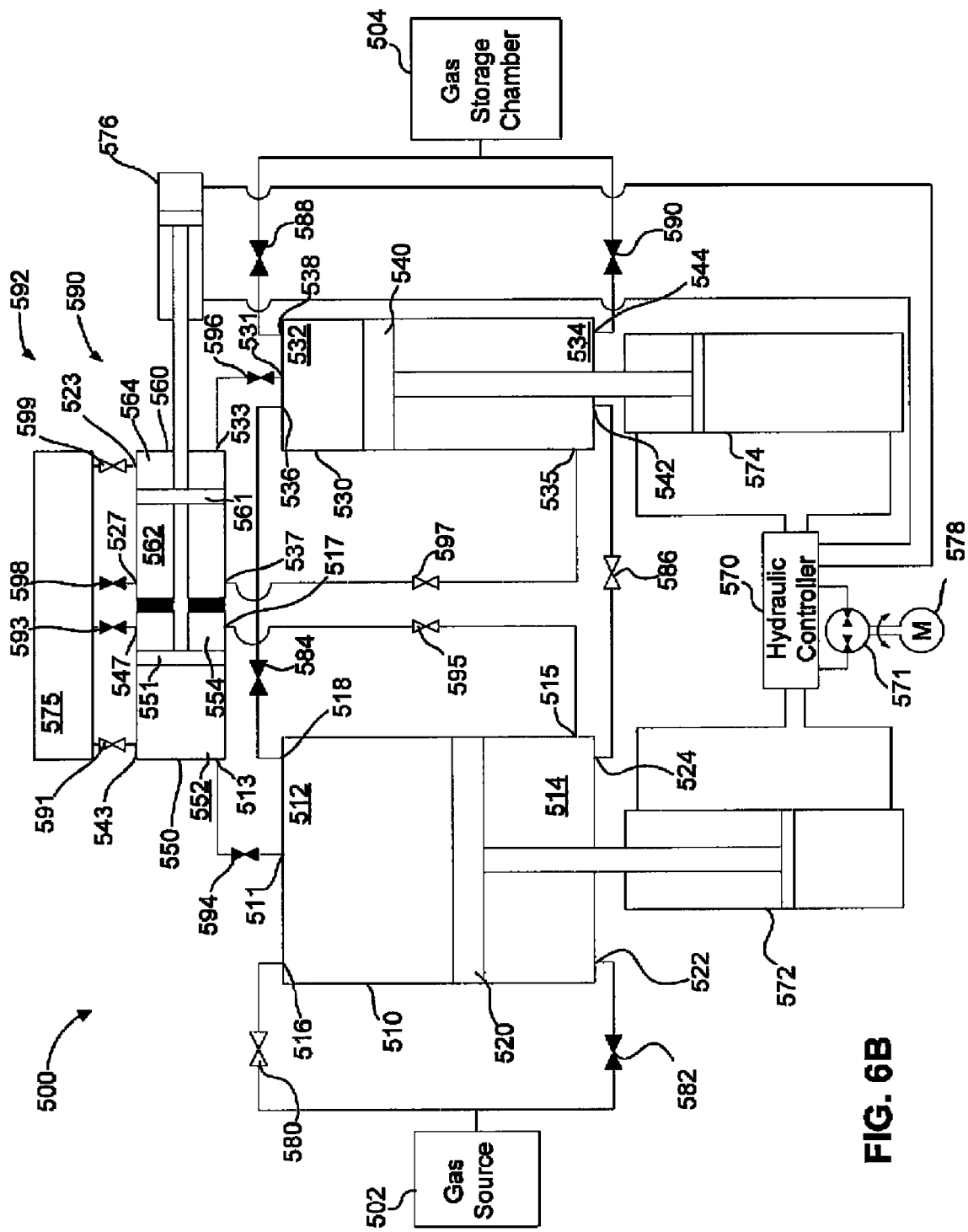

Referring now to FIG. 6B, the second working hydraulic piston 561 is in its third position. The valves 599 and 597 remain open so that the third and fourth hydraulic chambers 562, 564 are fluidically coupled to the fourth pneumatic chamber 534 and the liquid storage structure 575, respectively. The second working hydraulic piston 561 is moved by the third hydraulic actuator 576 in the fourth direction to its second position (see, e.g., FIG. 6C), and to its first position (see, e.g., FIG. 6D), thus completing a first stroke in the expansion mode. Movement of the second working hydraulic piston 561 in the fourth direction causes the first volume of liquid to be drawn into the fourth hydraulic chamber 564, and the second volume of liquid to be discharged from the third hydraulic chamber 562 into the fourth pneumatic chamber 534. In some embodiments, the liquid flowing into and out of the third and fourth hydraulic chambers 562, 564 is relatively warmer than the fluid flowing into and out of the first and second hydraulic chambers 552, 554. The warmed liquid can be, for example, the liquid warmed during the compression mode and stored (or harvested) in the liquid storage structure 575. By reintroducing this warmed liquid into the device 500, the system is, in essence, recycling the energy it previously produced during the compression. In this manner, it may not be necessary for the system to exert more energy during the expansion mode to warm the gas as it expands. For example, in some embodiments, no external heating devices or mechanisms (e.g., burning fuels) are needed to heat the gas—the system can use the previously-produced heat that was absorbed by the liquid. In other embodiments, however, at least a portion of the warmed liquid is liquid injected back into the system after being warmed by an external heating device(s) or mechanism(s).

As shown in FIG. 6B, when the first mass of compressed gas is introduced into the third pneumatic chamber 532, the first mass of compressed gas is permitted to expand within the third pneumatic chamber 532. The valve 588 between the compressed gas storage chamber 504 and the third pneumatic chamber 532, which was previously open in FIG. 6A, is closed in the second configuration shown in FIG. 6B to prevent an additional amount of compressed gas from flowing into the third pneumatic chamber 532 and to prevent flow of the first mass of compressed gas back into the compressed gas storage chamber 504. The expanding first mass of compressed gas exerts a force on the second working pneumatic piston 540 sufficient to move the second working piston in the second direction to its third position (shown here in FIG. 6B), to its second position (see, e.g., FIG. 6C), and to its first position (see, e.g., FIG. 6D), thus completing a first stroke in the expansion mode. After being permitted to expand in the third pneumatic chamber 532, the first mass of compressed gas has a fourth pressure lower than the first pressure. Movement of the second working pneumatic piston 540 in the second direction causes the second hydraulic actuator 574 to displace a first volume of hydraulic fluid.

Movement of the second working pneumatic piston 540 in the second direction also helps transfer the second mass of compressed gas at the second pressure from the fourth pneumatic chamber 534 to the second pneumatic chamber 514. In some embodiments, however, before the second mass of compressed gas is transferred, the second volume of liquid is introduced into the fourth pneumatic chamber 534 to warm up the second mass of compressed gas. In general, as gas expands and its pressure decreases, the temperature of the gas decreases. This can lower the gas's ability to produce energy (i.e., to move the piston 540 to generate electricity). Energy production can be increased, however, by warming the gas prior to or during its expansion. Thus, the second volume of liquid is introduced into the fourth pneumatic chamber 534 to warm the second mass of compressed gas, which was expanded once in the fourth pneumatic chamber 534 and will be expanded again in the second pneumatic chamber 514, to increase the energy production of the gas. As previously discussed, in some embodiments, the second volume of liquid was previously warmed during the compression process and stored within the liquid storage structure 575, and is now being re-introduced into the device 500.

The second volume of liquid can be transferred from the fourth pneumatic chamber 534 to the second pneumatic chamber 514 along with the second mass of compressed gas. The second mass of compressed gas is allowed to expand further within the second pneumatic chamber. In some embodiments, the second volume of liquid continues to release heat in the second pneumatic chamber 514 to warm the second mass of compressed gas as it continues to expand in the second pneumatic chamber 514. The expanding second mass of compressed gas exerts a force on the first working pneumatic piston 520 to move the first working piston in the third direction from its third position (shown here in FIG. 6B), to its second position (see, e.g., FIG. 5C) and to its first position (see, e.g., FIG. 5D), thus completing a first stroke in the expansion mode. After being permitted to expand in the second pneumatic chamber 514, the second mass of compressed gas has a fifth pressure lower than the second pressure.

Movement of the first working pneumatic piston 520 in the third direction causes the first hydraulic actuator 572 to displace a second volume of hydraulic fluid. Movement of the first working pneumatic piston 520 in the third direction also reduces the volume of the first pneumatic chamber 512 and helps to transfer the third mass of compressed gas at the third pressure from the first pneumatic chamber 612 to the gas source 502. In some embodiments, the third pressure is substantially equal to the atmospheric pressure outside the gas source 502 (e.g., 1 bar).

As shown in FIG. 6B, the first working hydraulic piston 551 is in its third position. The valves 591 and 595 remain open so that the first and second hydraulic chambers 552, 554 are fluidically coupled to the liquid storage structure 575 and the second pneumatic chamber 524, respectively. The first working hydraulic piston 551 is moved with the second working hydraulic piston 561 in the fourth direction from its third position to its second position (see, e.g., FIG. 6C), and to its first position (see, e.g., FIG. 6D), thus completing a first stroke in the expansion mode. Movement of the first working hydraulic piston 551 in the fourth direction causes a third volume of liquid (e.g., including at least a portion of the second volume of liquid) to be drawn into the second hydraulic chamber 554 from the second pneumatic chamber 514, and a fourth volume of liquid to be discharged from the first hydraulic chamber 562 into the liquid storage structure 575.

By the time the third volume of liquid exits the device 500 and is received in the second hydraulic chamber, it is cooler than the second volume of liquid when it entered the device 500. In some embodiments, the liquid storage structure 575 is configured to store the warm liquid dispensed to the second hydraulic cylinder 560 and the cool liquid received from the first hydraulic cylinder 550 without one liquid substantial affecting the temperature of the other liquid. For example, in some embodiments, the liquid storage structure 575 can be divided into two portions that are fluidically and/or thermally isolated from one another. One portion of the structure 575 can hold the cooler liquid and the other portion can hold the warmer liquid. In other embodiments, the liquid storage structure 575 can include a first tank that contains the cooler liquid and a second, separate, tank that contains the warmer liquid.

In some embodiments, the force of the third volume of liquid entering the second hydraulic chamber 554 is sufficient to move the first and second working hydraulic pistons 551, 561 in the fourth direction. As discussed above, in such embodiments, the third hydraulic actuator 576 only exerts a force on the hydraulic pistons 551, 561 sufficient to overcome the hydraulic head and/or frictional losses in order to move the hydraulic pistons 551, 561 in the fourth direction. In some embodiments, as discussed above, the fluid pressure produced by the third volume of liquid entering the second hydraulic chamber 554 is the primary force acting on the hydraulic pistons 551, 561, and the hydraulic force exerted by the third hydraulic actuator 576 can be a secondary force. In other embodiments, as discussed above, the hydraulic force exerted by the third hydraulic actuator 576 is the primary force and the fluid pressure exerted by the liquid entering the second hydraulic chamber 554 is the secondary force acting on the first and second working hydraulic pistons 551, 561.

Figure 6C:
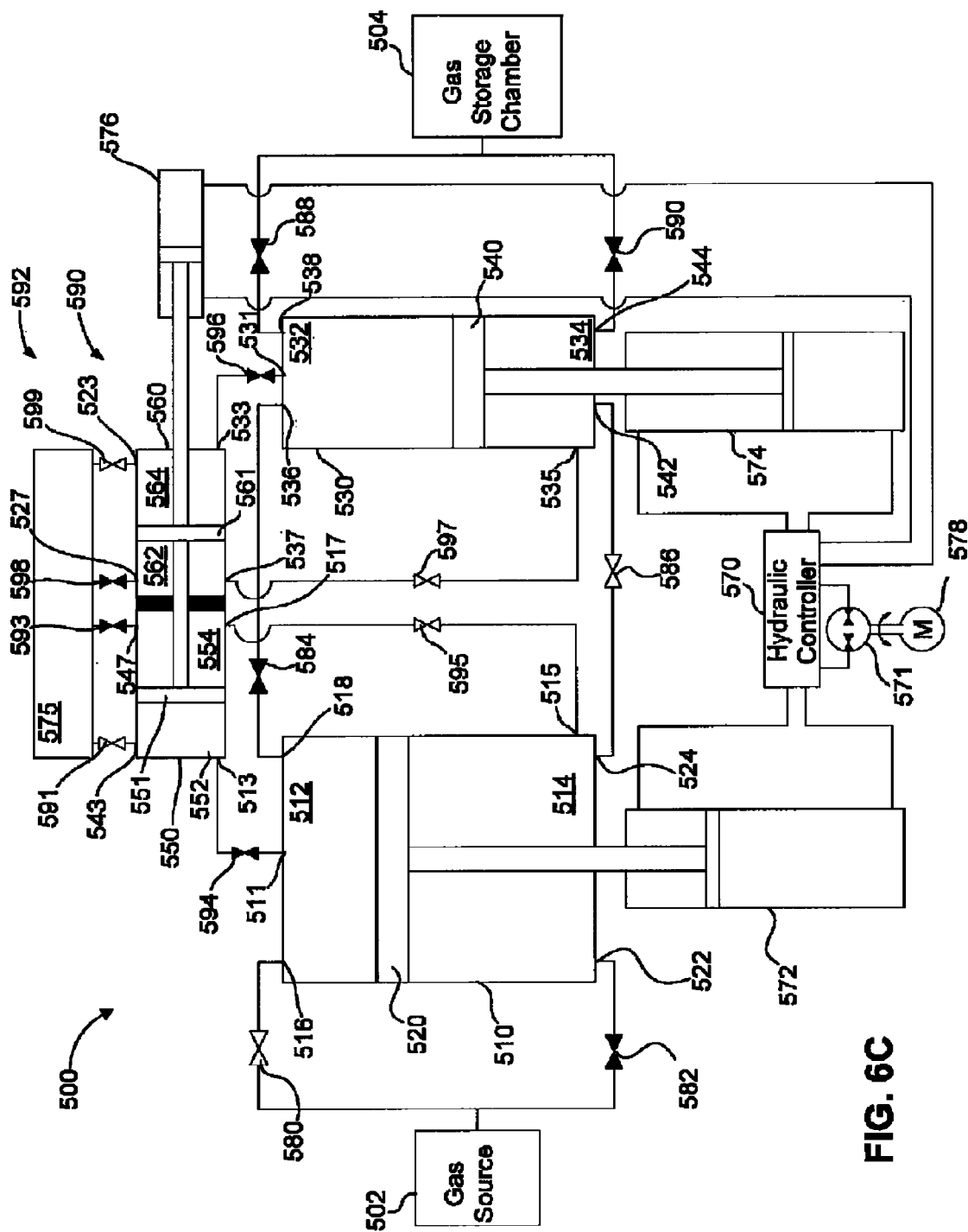

Referring now to FIG. 6C, the valves 580, 586, 591, 595, 597 and 599 remain open while valve 588 remains closed to prevent any gas in the third pneumatic chamber 632 from flowing back into the gas storage chamber 504. The first mass of compressed gas continues to expand in the third pneumatic chamber 632 and move the second working pneumatic piston 540 in the second direction. Likewise, the second mass of compressed gas continues to flow from the fourth pneumatic chamber 634 to the second pneumatic chamber 614 where it continues to expand and move the first working pneumatic piston 520 in the third direction. The first and second working pneumatic pistons 520, 540 are shown in their respective second positions. The first and second hydraulic pistons 551, 561 are also shown in their second positions. The first and second hydraulic pistons 551, 561 continue to move in the fourth direction and operate in the same manner described above with respect to FIG. 6B.

Figure 6D:
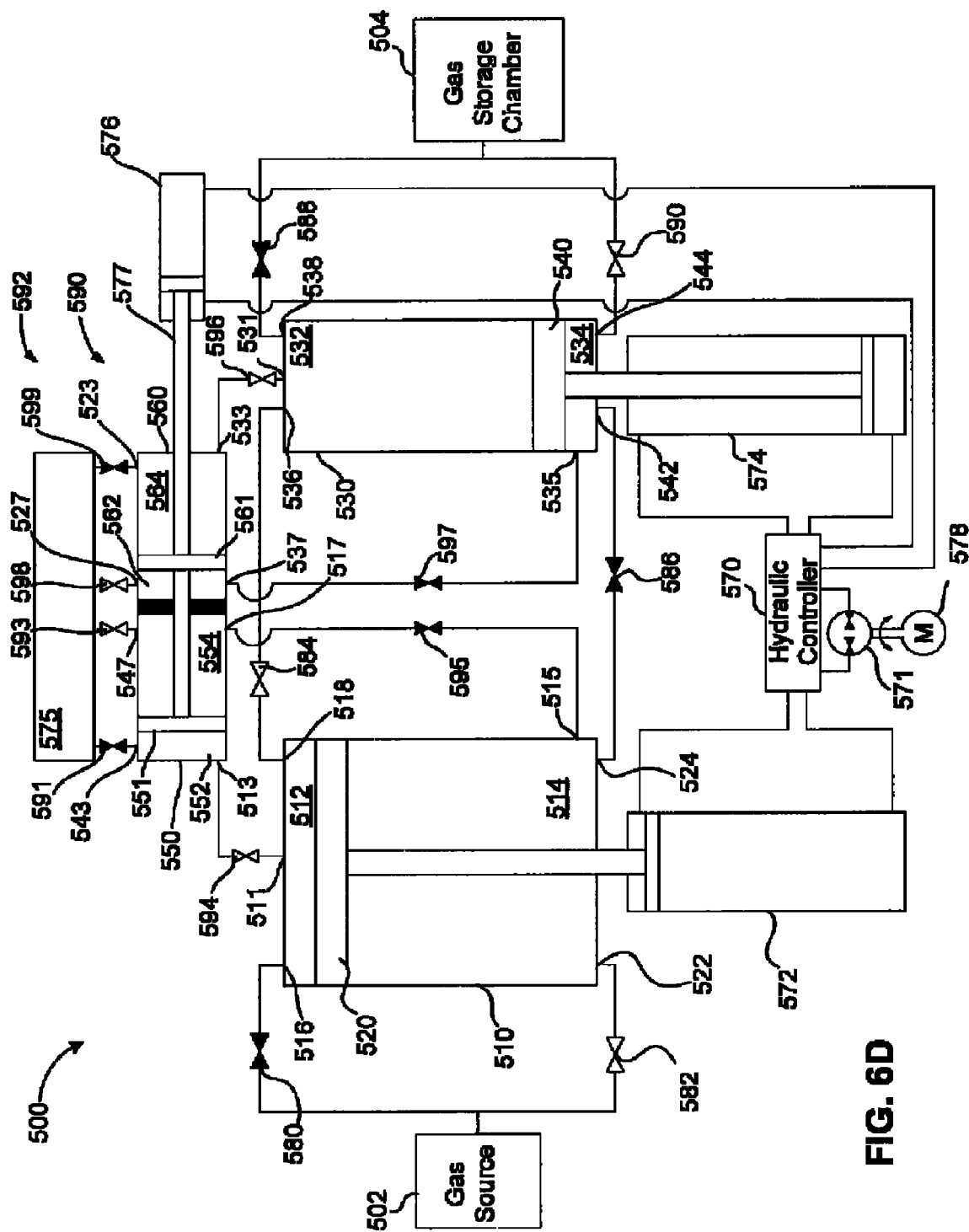

Turning now to FIG. 6D, the previously-opened valves 580, 586, 591, 595, 597, 599 are closed and valves 582, 584, 590, 593, 594, 596, 598 are opened. The first and second working hydraulic pistons 551, 561 have completed their first stroke of the expansion mode and are in their first position. As such, the first and second working hydraulic pistons 551, 561 are in position to begin their second stroke of the expansion mode. At this point during the cycle, the fourth volume of fluid has been at least partially or fully discharged from the first hydraulic chamber 552. At valve 596, the fourth hydraulic chamber 562 is fluidically coupled to the third pneumatic chamber 532 such that the warmed first volume of liquid (or at least a portion thereof) can flow from the fourth hydraulic chamber 562 to the third pneumatic chamber 532. At valve 597, the third hydraulic chamber 564 is fluidically coupled to the liquid storage structure 575 such that a fifth volume of liquid, which is warm, can flow from the liquid storage structure 575 to the third hydraulic chamber 564. At valve 593, the second hydraulic chamber 554 is coupled to the liquid storage structure 575 such that the third volume of liquid (or at least a portion thereof), which is relatively cooler than the warm first volume of liquid, can flow from the second hydraulic chamber 554 to the liquid storage structure 575. At valve 594, the first hydraulic chamber 552 is fluidically coupled to the first pneumatic chamber 512 such that liquid, which is also relatively cooler than the warm first volume of liquid, can flow from the first pneumatic chamber 512 to the first hydraulic chamber 552.

The second working pneumatic piston 540, having completed its first stroke, is in its first position. At this point in the cycle, the second mass of compressed gas has been at least partially or fully discharged from the fourth pneumatic chamber 534 into the second pneumatic chamber 514. As shown in FIG. 6D, the third pneumatic chamber 532 is fluidically coupled to the first pneumatic chamber 512 such that the first mass of compressed gas can be discharged from the third pneumatic chamber 532 to the first pneumatic chamber 512 at the fourth pressure. The first working pneumatic piston 520, having also completed its first stroke, is in its first position. The valve 580 between the first pneumatic chamber 512 and the gas source 502 is closed to fluidically isolate the first pneumatic chamber from the gas source 502. The valve 582 between the second pneumatic chamber 514 and the gas source 502 is opened, and thus the second pneumatic chamber 514 is fluidically coupled to the gas source 502 such that the second mass of gas can be discharged from the second pneumatic chamber 514 to the gas source at the fifth pressure.

Because valve 590 is opened, the compressed gas storage chamber 504 is fluidically coupled to the fourth pneumatic chamber 534 such that a fourth mass of compressed gas can flow from the storage chamber 504 to the fourth pneumatic chamber 534. The fourth mass of compressed gas is discharged from the compressed gas storage chamber 504 to the fourth pneumatic chamber 534 at a sixth pressure. As the fourth mass of gas enters and expands in the fourth pneumatic chamber 534, it exerts a force on the second working pneumatic piston 540 thereby moving the second working piston 540 in the third direction from its first position (shown here in FIG. 6D) to its second, third and fourth positions, respectively.

As the second working piston 540 is moved in its third direction, the first mass of compressed gas is discharged from the third pneumatic chamber 532 to the first pneumatic chamber 512 at the fourth pressure. In some embodiments, however, before being discharged to the first pneumatic chamber 512, a first volume of liquid (which, for example, was previously warmed during the compression process) is introduced into the third pneumatic chamber 532 to warm the first mass of compressed gas. The first volume of liquid can be transferred into the first pneumatic chamber 512 along with the first mass of compressed gas.

In the first pneumatic chamber 512, the first mass of compressed gas is allowed to expand and thereby exert a force on the first working pneumatic piston 520 to move the first working piston 520 in the second direction to its first position (shown here in FIG. 6D). As the first working pneumatic piston 520 is moved in the second direction, the second mass of gas is discharged from the second pneumatic chamber 514 to the gas source 502 at the fifth pressure. In some embodiments, the fifth pressure is substantially equal to the atmospheric pressure outside the gas source 502. A sixth volume of liquid (e.g., including at least a portion of the first volume of liquid) can also be discharged from the first pneumatic chamber 512 to the first hydraulic chamber 552 as the first working pneumatic piston 520 moves in the second direction.

The first hydraulic piston 551, which is shown in its first position, is moved in the first direction with the second hydraulic piston 561. As the first working hydraulic piston 551 moves in the first direction, the sixth volume of liquid is drawn into the first hydraulic chamber 552 from the first pneumatic chamber 512, and the third volume of fluid (or at least a portion thereof) is discharged from the second hydraulic chamber 554 into the liquid storage structure 575. As discussed above, the force of the sixth volume of liquid entering the first hydraulic chamber 552 can be sufficient to move the first hydraulic piston 551 in the first direction with limited assistance from the third hydraulic actuator 576. In some embodiments, the fluid force produced by the sixth volume of liquid entering the first hydraulic chamber 552 is the primary force acting on the first hydraulic piston 551, and the and hydraulic force exerted by the third hydraulic actuator 576 is the secondary force. In other embodiments, the hydraulic force is the primary force and the fluid force is the secondary force.

Figure 6E:
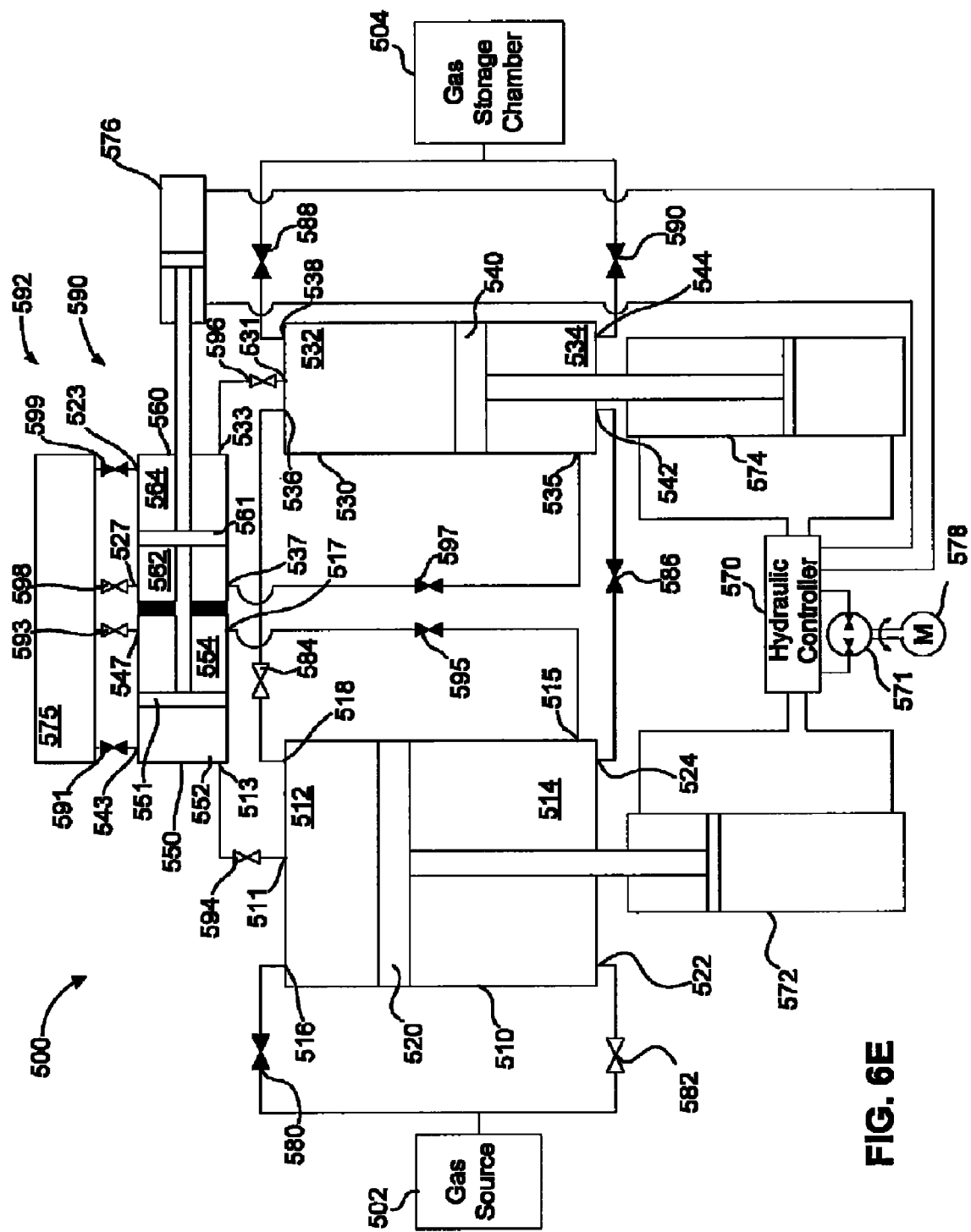

Referring now to FIG. 6E, the second working hydraulic piston 561 is in its second position. The valves 598 and 596 remain open so that the third and fourth hydraulic chambers 562, 564 continue to be fluidically coupled to the liquid storage structure 575 and the third pneumatic chamber 532, respectively. The second working hydraulic piston 561 continues to move in the first direction with the first working hydraulic piston 551, and each hydraulic piston 551, 561 operates in the same manner discussed above.

The valve 588 between the compressed gas storage chamber 504 and the third pneumatic chamber 532, which was previously open in FIG. 6D, is closed to prevent an additional amount of compressed gas from flowing into the chamber 504 and to prevent flow of the fourth mass of compressed gas back into the compressed gas storage chamber 504. The fourth mass of compressed gas continues to expand within the fourth pneumatic chamber 534 in the manner described above.

As previously discussed, the expanding fourth mass of compressed gas exerts a force on the second working pneumatic piston 540 sufficient to move the second working piston in the third direction to its third and fourth positions, thus completing a second stroke in the expansion mode. After being permitted to expand in the fourth pneumatic chamber 534, the fourth mass of compressed gas has a seventh pressure lower than the sixth pressure. Movement of the second working pneumatic piston 540 in the third direction causes the second hydraulic actuator 574 to displace a third volume of hydraulic fluid.

Movement of the second working pneumatic piston 540 in the third direction also helps transfer the first mass of compressed gas at the fourth pressure from the third pneumatic chamber 532 to the first pneumatic chamber 514. Before the first mass of compressed gas is transferred, however, the first volume of liquid is introduced into the third pneumatic chamber 532 from the fourth hydraulic chamber 564 to warm the first mass of compressed gas. The second volume of liquid can be transferred from the third pneumatic chamber 532 to the first pneumatic chamber 512 with the first mass of compressed gas. The first mass of compressed gas is permitted to expand further within the first pneumatic chamber 512 and, in some embodiments, the first volume of liquid can continue to release and transfer heat to the gas during this time. The expanding first mass of gas exerts a force on the first working pneumatic piston 520 to move the first working piston in the second direction to its third and fourth positions, thus completing a second stroke in the expansion mode. After being permitted to expand in the second pneumatic chamber 514, the first mass of compressed gas has an eighth pressure lower than the fourth pressure. Movement of the first working pneumatic piston 520 in the second direction causes the first hydraulic actuator 572 to displace a fourth volume of hydraulic fluid. Movement of the first working pneumatic piston 520 in the second direction also reduces the volume of the second pneumatic chamber 514 and helps to transfer the second mass of compressed gas at the fifth pressure from the second pneumatic chamber 514 to the gas source 502.

As shown in FIG. 6E, the first working hydraulic piston 551 is in its second position. The valves 593 and 594 remain open so that the first and second hydraulic chambers 552, 554 are fluidically coupled to the first pneumatic chamber 512 and the liquid storage structure 575, respectively. Movement of the first working hydraulic piston 551 in the first direction causes the sixth volume of liquid (e.g., including at least a portion of the first volume of liquid) to be drawn into the first hydraulic chamber 552 from the first hydraulic chamber 512, and the third volume of liquid (or at least a portion thereof) to be discharged from the second hydraulic chamber 554 into the liquid storage structure 575. The first working hydraulic piston 551 is moved with the second working hydraulic piston 561 in the first direction to its third and fourth positions, thus completing a second stroke in the expansion mode.

Figure 6F:
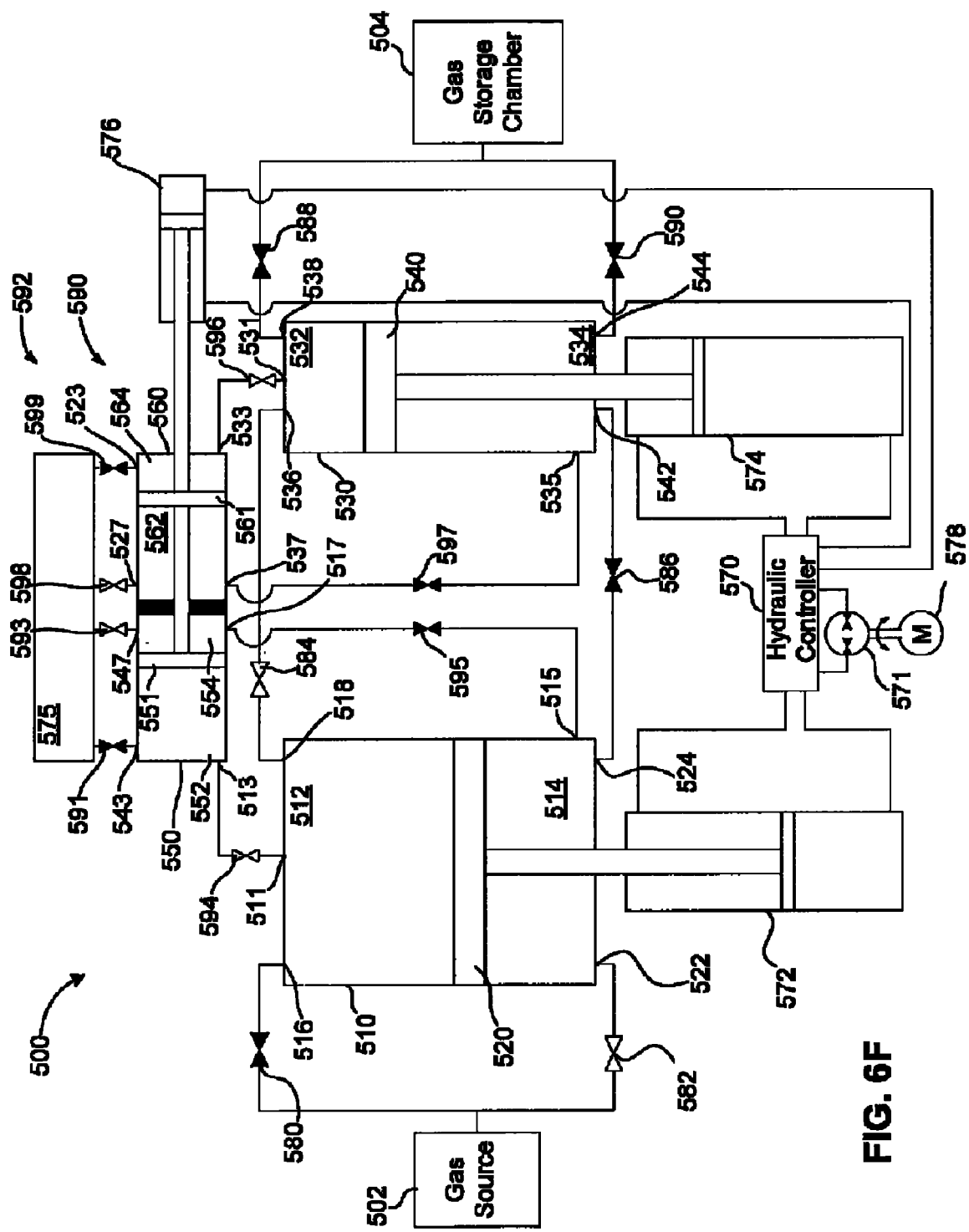

Referring now to FIG. 6F, the valves 582, 584, 593, 594, 596 and 598 continue remain open while valve 590 continues remains closed to prevent any gas in the fourth pneumatic chamber 634 from flowing back into the gas storage chamber 504. The fourth mass of compressed gas continues to expand in the fourth pneumatic chamber 634 and move the second working pneumatic piston 540 in the third direction to its third position, shown here. Likewise, the first mass of compressed gas continues to flow from the third pneumatic chamber 532 to the first pneumatic chamber 512 where it is further permitted to expand. This expansion forces the first pneumatic piston 520 to move in the second direction to its third position, shown here. The first and second hydraulic pistons 551, 561 are also in their third positions. Movement of the first and second hydraulic pistons 551, 561 in the first direction continues to displace liquid in the manner discussed above.

Figure 6G:
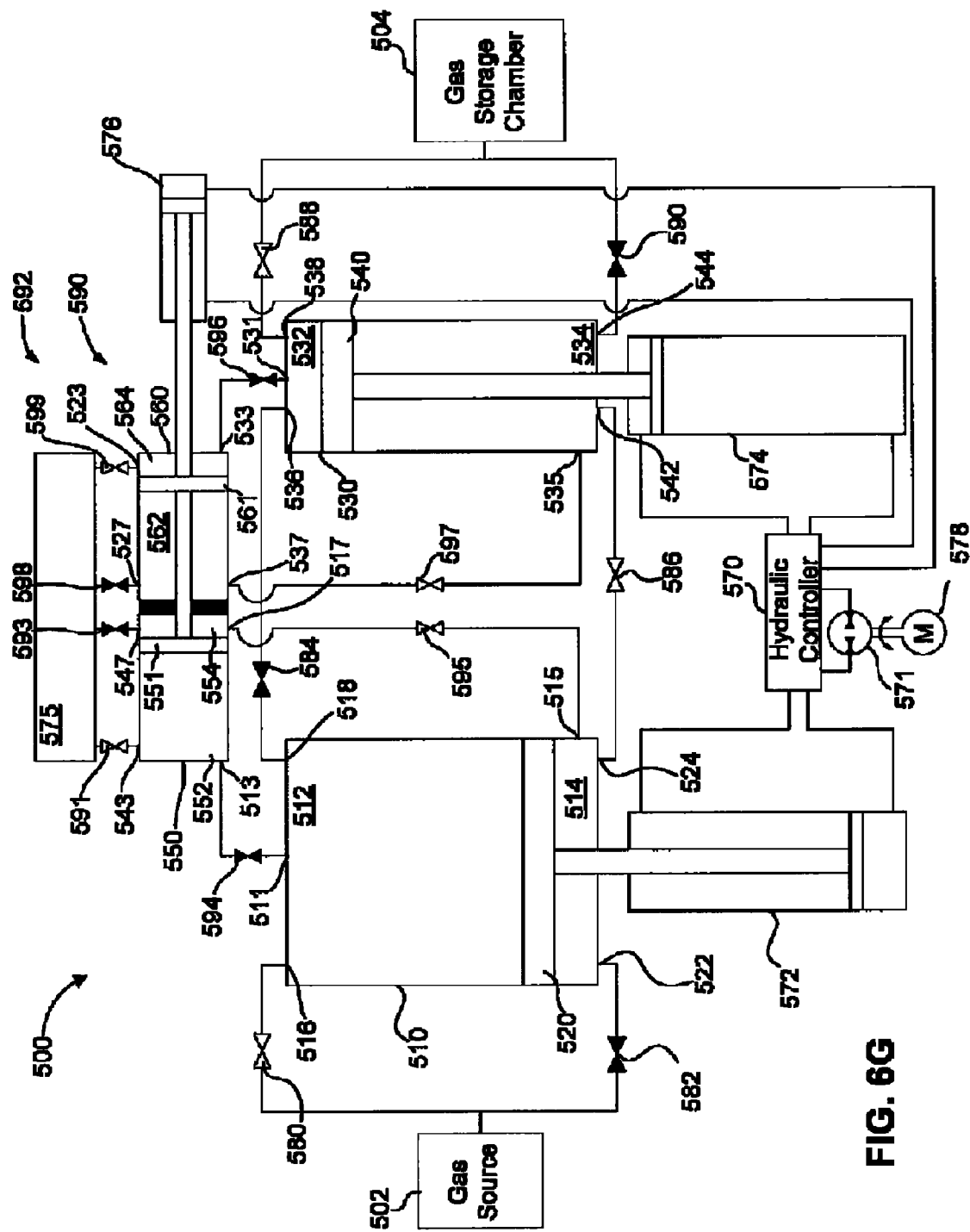

Referring now to FIG. 6G, the hydraulic pistons 551, 561 and the pneumatic pistons 520, 540 are each in their respective fourth positions, having completed a second stroke in the expansion mode. In this position, the first volume of liquid has been at least partially or fully discharged from the fourth hydraulic chamber 564 and into the device 500, and the third volume of liquid has been at least partially or fully discharged from the second hydraulic chamber 552 and into the liquid storage structure 575.

The fourth mass of gas has expanded within the fourth pneumatic chamber 534, thereby moving the second working pneumatic piston 540 in the third direction to its fourth position. In completing its second stroke, the second working pneumatic piston 540 moved in the third direction to increase the volume of the fourth pneumatic chamber 534 and decrease the volume of the third pneumatic chamber 532. Additionally, the second working pneumatic piston 540, having moved in the third direction from its first position to its fourth position (i.e., its second stroke in the expansion mode), caused the second hydraulic actuator 574 to displace a third volume of hydraulic fluid.

The first mass of compressed gas and the first volume of fluid have been discharged to the first pneumatic chamber 512 from the third pneumatic chamber 532 and the valve 584 therebetween is closed. The first mass of compressed gas has expanded within the first pneumatic chamber 512, and now has an eighth pressure lower than the fourth pressure. The expanding first mass of gas moved the first working pneumatic piston 520 in the second direction to its fourth position. In completing its second stroke, the first working pneumatic piston 520 moved in the second direction to increase the volume of the first pneumatic chamber 512 and decrease the volume of the second pneumatic chamber 514. Additionally, the first working pneumatic piston 520, having moved in the second direction from its fourth position to its first position (i.e., its second stroke), caused the first hydraulic actuator 572 to displace a fourth volume of hydraulic fluid. The second stroke of the first working pneumatic piston 520 can be concurrent with, or substantially simultaneous with, the second stroke of the second working pneumatic piston 540. As shown in FIG. 6G, the second mass of compressed gas has been discharged from the second pneumatic chamber 514 to the gas source 502 at the fifth pressure.

The displacement of each volume of fluid (e.g., the first, second, third, or fourth volumes of fluid) by the first and second hydraulic actuators 572, 574 generates hydraulic power. In embodiments where the first and second hydraulic pistons 551, 561 are moved using hydraulic force (as described above), the third hydraulic actuator 576 can also displace a volume of fluid to generate hydraulic power. The hydraulic controller 570 controls distribution of the hydraulic power using, for example, software programmed to control a system of valves (not shown) within the hydraulic controller. The hydraulic controller 570 can control distribution of the hydraulic power to a pump/motor 571, which is configured to convert the hydraulic power into mechanical power. The pump/motor 571 is configured to transmit the mechanical power to a motor/generator 578. The motor/generator 578 is configured to convert the mechanical power to electrical power, which can then be transmitted to a power grid. The expansion mode, or cycle, can be continued or repeated as desired to convert energy stored in the form of compressed gas into electrical energy.

Although the compression/expansion devices (e.g., devices 100, 200, 300, 500) have been illustrated and described herein as including two pneumatic cylinders (e.g., cylinders 110 and 130, 210 and 230, 310 and 330, 510 and 530, respectively), in some embodiments, a compression/expansion device includes more than two pneumatic cylinders. Similarly, although the lock pumps (e.g., lock pumps 490, 590) have been illustrated and described herein as including two hydraulic cylinders (e.g., cylinders 450 and 460, 550 and 560, respectively), in some embodiments, a lock pump includes more than two hydraulic cylinders.

Although the lock pumps (e.g., lock pumps 490, 590) have been illustrated and described as including a first hydraulic cylinder (e.g., first hydraulic cylinders 450, 550) and a second hydraulic cylinder (e.g., second hydraulic cylinders 460, 560), in some embodiments, a lock pump includes hydraulic chambers differently configured. For example, in some embodiments a lock pump can include a single vessel divided into a first hydraulic portion and a second hydraulic portion, with the first and second hydraulic portions each being divided by working pistons into two hydraulic chambers. Operation of such a system can be similar in many respects to operation of lock pump 590.

A system for compression and/or expansion of gas can include any suitable combination of systems (e.g., system 100, 200, 300, 500), or portions thereof, described herein. For example, in some embodiments, such a system can include any combination of system 300 (described with reference to FIG. 3), and system 500 (described with reference to FIGS. 5 and 6). For example, a system can include two or more pneumatic cylinders in an in-line configuration and two or more pneumatic cylinders in a stacked configuration. Additionally, a system can include one, two, three, four, or more cylinders per stage of compression/expansion. A liquid management system can include any suitable combination of systems (192, 392, 592), or portions thereof (e.g., lock pump 490), described herein. In some embodiments, a liquid management system can include two or more hydraulic cylinders in an in-line configuration and two or more hydraulic cylinders in a stacked configuration. Additionally, a liquid management system can include one, two, three, four, or more hydraulic cylinders per stage of compression/expansion. The number of hydraulic cylinders can correspond, for example, to the number of pneumatic cylinders in the compression and/or expansion system. The liquid management system can operate with any compression and/or expansion system (e.g., system 100, 200, 300, 500) described herein.

Although the liquid management system 592 is illustrated and described herein as including the hydraulic actuator 576, in other embodiments, the liquid management system 592 does not include this actuator. Rather, the fluid pressure discussed above is the only force acting on the pistons 551, 561 to move the pistons 551, 561. As such, the timing and movement of the pistons 551, 561 will be dependent, in part, on the pneumatic pistons 520, 540. In some such embodiments, it is not necessary that the first and second hydraulic pistons 551, 561 be coupled together, for example, via a piston rod or other like connecting rod. Rather, the hydraulic pistons 551, 561 can move in their respective cylinders 550, 560 independently of each other. The hydraulic pistons 551, 561 in this embodiment can, for example, function as dividers (or other moveable barrier/separator) within their respective cylinders 550, 560 as opposed to pistons.

The devices and systems described herein can be implemented in a wide range of sizes and operating configurations. Said another way, the physics and fluid mechanics of the system do not depend on a particular system size. For example, systems in the power range of 2 to 8 MW are technically and economically achievable. This estimated power range results from a system design constrained to use current commercially available components, manufacturing processes, and transportation processes. Larger and/or smaller system power may be preferred if the design uses a greater fraction of custom, purpose-designed components. Moreover, system power also depends on the end-use of the system. Said another way, the size of the system may be affected by whether the system is implemented as a compressor/expander, as may be the case in a CAES application, or whether the system is implemented as an expander, as may be the case in a natural gas distribution system component, or as a compressor, as may be the case in a carbon dioxide sequestration application.

As noted above, devices and systems for the compression/expansion of gas, according to embodiments, are configured for grid scale energy storage. As such, a pneumatic cylinder (or pneumatic portion of a vessel) can be any suitable size for achieving gas compression for grid scale energy storage and/ or gas expansion for grid scale energy usage. For example, in some embodiments, a pneumatic cylinder for the first stage of compression (and/or a second or later stage of expansion) can be about 10.3 meters in height and about 3.5 meters in diameter. In another example, a pneumatic cylinder for the second stage of compression (and/or a first or non-late stage of expansion) can be about 10 meters in height and about 1.6 meters in diameter. In some embodiments, a system includes a cylinder (or vessel) up to about 1.6 meters, which is within current technology capabilities for precision machining (e.g., honing and chroming) an inner surface of the cylinder to produce a good seal between a working piston and the inner surface of the cylinder. In some embodiments, a system includes a cylinder (or vessel) larger than about 1.6 meters, which exceeds current technology capabilities for precision machining. Accordingly, such a larger cylinder can include a rolling piston seal, such as that described in U.S. Patent App. No. 61/420,505, to Ingersoll et al., filed Dec. 7, 2010, entitled "Compressor and/or Expander Device with Rolling Piston Seal," ("the '505 application") the disclosure of which is incorporated herein by reference in its entirety.

Additionally, a compression/expansion device according to an embodiment can be configured to compress a volume of gas from a first pressure to a second higher pressure which will occupy a lower volume. For example, in some embodiments, a compression/expansion device can be configured to receive about 15,000 liters to about 20,000 liters of gas at a first pressure (i.e., the inhale volume of the first-stage cylinder at standard atmospheric pressure) at the first stage of compression. For example, the compression/expansion device can be configured to compress about 16,000 liters of gas at the first stage of compression. In some embodiments, the compressor/expander device can be configured to compress the inhale volume of the first-stage cylinder to a pressure about 6 to 10 times its original pressure, thus reducing the volume occupied by that mass of gas to about 2,000-2,500 liters (i.e., the inhale volume of the second-stage cylinder). In some embodiments, the compressor/expander device can be configured to receive about 2,350 liters of gas at a second pressure, higher than the first pressure, at the second stage of compression. In other words, a first pneumatic cylinder of the compression/expansion device can be configured to receive an inhale volume of about 16,000 liters of gas at a first pressure for the first stage of compression and compress the gas during the first stage to about 2,350 liters of gas at a second pressure. A second pneumatic cylinder of the compression/expansion device can be configured to receive an inhale volume of the 2,350 liters of gas at the second pressure from the first pneumatic cylinder and compress the gas to a third pressure, higher than the second pressure. As such, in this example, the first stage of the compressor/expander device can be characterized as being configured to achieve about a 1:6.8 compression ratio.

The compression ratio of the second stage of the compressor/expander device can be characterized as the volume available to contain a mass of gas when the piston is at bottom dead center and the volume available to contain the mass of gas when the piston is at top dead center. In the example described above where the second pneumatic cylinder is configured to receive an inhale volume of the 2,350 liters of gas at the second pressure, the volume available to contain a mass of gas when the piston is at bottom dead center is 2,350. In some embodiments the volume available to contain the mass of gas when the piston is at top dead center is about 178 liters. As such, in this example, the second stage of the compressor/expander device can be characterized as being configured to achieve about a 6.8:90 compression ratio. The second stage of the compressor/expander device can be configured to operate at different pressure ratios to discharged compressed gas to a third stage and/or a compressed gas storage structures by changing the stroke of the piston (i.e., changing the volumetric ratio between bottom dead center and top dead center to define the pressure ratio in the second stage).

Devices and systems used to compress and/or expand a gas can be configured to operate in a compression mode to compress a gas in excess of 700 bar. In some embodiments, a compression/expansion device is configured to compress a gas through two or three stages of compression. For example, the device can be configured to achieve a gas pressure ratio of 1:10 at a first stage of compression, and 10:250 at a second stage of compression. In another example, the device can be configured to achieve a gas pressure ratio of 1:6 at the first stage of compression, 6:90 at the second stage of compression, and, optionally, 90:250 at a third stage of compression. In yet another example, the device can be configured to compress the gas such that the pressure of the gas following the second stage of compression is 15 times greater than the pressure of the gas following the first stage of compress, thus achieving a pressure ratio of 1:15.

Devices and systems used to compress and/or expand a gas can be configured to operate in an expansion mode to expand a gas such that the compressed gas from the compressed gas storage chamber has a pressure ratio to the expanded gas of 250:1. In some embodiments, a compression/expansion device is configured to expand a gas through two or three stages of expansion. For example, the device can be configured to achieve a gas expansion ratio of 250:10 at a first stage of expansion, and 10:1 at a second stage of expansion. In another example, the device can be configured to achieve a gas pressure ratio of 90:9 at the first stage of expansion, and 9:1 at the second stage of compression. In yet another example, the device can be configured to achieve a gas pressure ratio of 250:90 at a first stage of compression, 90:6 or 90:9 at the second stage of compression, and, optionally 6:1 or 9:1 at the third stage of compression.

Devices and systems used to compress and/or expand a gas, such as air, and/or to pressurize and/or pump a liquid, such as water, can release and/or absorb heat during, for example, a compression or expansion cycle. In some embodiments, one or more pneumatic cylinders can include a heat capacitor for transferring heat to and/or from the gas as it is being compressed/expanded, for example as described in the '679 application, incorporated by reference above. For example, a heat transfer element can be positioned within the interior of a pneumatic cylinder of a compressor/expander device to increase the amount of surface area within the pneumatic cylinder that is in direct or indirect contact with gas, which can improve heat transfer. In some embodiments, the heat transfer element can be a thermal capacitor that absorbs and holds heat released from a gas that is being compressed, and then releases the heat to a gas or a liquid at a later time. In some embodiments, the heat transfer element can be a heat transferring device that absorbs heat from a gas that is being compressed, and then facilitates the transfer of the heat outside of the pneumatic cylinder.

In another example, heat can be transferred from and/or to gas that is compressed and/or expanded by liquid (e.g., water) within a pneumatic cylinder. A gas/liquid or gas/heat element interface may move and/or change shape during a compression and/or expansion process in a pneumatic cylinder. This movement and/or shape change may provide a compressor/expander device with a heat transfer surface that can accommodate the changing shape of the internal areas of a pneumatic cylinder in which compression and/or expansion occurs. In some embodiments, the liquid may allow the volume of gas remaining in a pneumatic cylinder after compression to be nearly eliminated or completely eliminated (i.e., zero clearance volume).

A liquid (such as water) can have a relatively high thermal capacity as compared to a gas (such as air) such that a transfer of an amount of heat energy from the gas to the liquid avoids a significant increase in the temperature of the gas, but only incurs a modest increase in the temperature of the liquid. This allows buffering of the system from substantial temperature changes. Said another way, this relationship creates a system that is resistant to substantial temperature changes. Heat that is transferred between the gas and liquid, or components of the vessel itself, may be moved from or to the pneumatic cylinder through one or more processes. In some embodiments, heat can be moved in or out of the pneumatic cylinder using mass transfer of the compression liquid itself. In other embodiments, heat can be moved in or out of the pneumatic cylinder using heat exchange methods that transfer heat in or out of the compression liquid without removing the compression liquid from the pneumatic cylinder. Such heat exchangers can be in thermal contact with the compression liquid, components of the pneumatic cylinder, a heat transfer element, or any combination thereof. Furthermore, heat exchangers may also use mass transfer to move heat in or out of the pneumatic cylinder. One type of heat exchanger that can be used to accomplish this heat transfer is a heat pipe as described in the Compressor and/or Expander Device applications and the '107 application, incorporated by reference above. Thus, the liquid within a pneumatic cylinder can be used to transfer heat from gas that is compressed (or to gas that is expanded) and can also act in combination with a heat exchanger to transfer heat to an external environment (or from an external environment). Any suitable mechanism for transferring heat out of the device during compression and/or into the device during expansion may be incorporated into the system.

In some embodiments, one or more hydraulic actuators of a compression/expansion device may incorporate "gear change" or "gear shift" features within a single stage of compression or expansion, or during a cycle or stroke of the actuator, to optimize the energy efficiency of the hydraulic actuation. As used herein, the terms "gear change" or "gear shift" are used to described a change in the ratio of the pressure of the hydraulic fluid in the active hydraulic actuator chambers to the pressure of the gas in the working chamber actuated by (or actuating) the hydraulic actuator, which is essentially the ratio of the pressurized surface area of the working piston(s) to the net area of the pressurized surface area(s) of the hydraulic piston(s) actuating the working piston(s). The term "gear" can refer to a state in which a hydraulic actuator has a particular piston area ratio (e.g., the ratio of the net working surface area of the hydraulic actuator to the working surface area of the working piston acting on, or being acted on by, the gas in a working chamber) at a given time period. Examples of suitable hydraulic actuators including "gear changes" or "gear shifts" are described in the '724 application, incorporated by reference above.

The compressor/expander system can be configured for use with any suitable compressed gas storage chamber, including, for example, an underground storage structure (e.g., a pressure compensated salt cavern). Examples of suitable storage structures are described in U.S. Provisional App. No. 61/432,904 to Ingersoll et al., filed Jan. 14, 2011, entitled "Compensated Compressed Gas Storage Systems," the disclosure of which is incorporated herein by reference in its entirety. The compressor/expander system can also be used with other types of storage, including, but not limited to, tanks, underwater storage vessels, and the like.

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. Additionally, certain steps may be partially completed before proceeding to subsequent steps. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. For example, although the device 201 is depicted as having a single pneumatic cylinder for the first stage of compression, in some embodiments, the device can include two, three, or more pneumatic cylinders configured to operate the first stage of compression. In another example, although the devices 200, 300, 400, 500, 600 are depicted as being configured for fluid communication with a single compressed gas storage chamber, in some embodiments, the devices 200, 300, 400, 500, 600 be configured to be fluidically coupleable to any number of compressed gas storage chambers. Similarly, although devices 200, 300, 400, 500, 600 are depicted being fluidically coupleable to a single gas source, in some embodiments, devices 200, 300, 400, 500, 600 can be fluidically coupleable to any number of gas sources. The specific configurations of the various components can also be varied. For example, the size and specific shape of the various components can be different than the embodiments shown, while still providing the functions as described herein.

What is claimed is:

1. A method of controlling the thermal efficiency of a compressed gas-based energy storage and recovery system, the compressed gas-based energy storage and recovery system including a gas compressor/expander device and a liquid management system, the liquid management system including a first hydraulic cylinder having a first working piston disposed therein for reciprocating movement in the first hydraulic cylinder, the first working piston dividing the first hydraulic cylinder into, and defining therewith, a first hydraulic chamber and a second hydraulic chamber, a second hydraulic cylinder having a second working piston disposed therein for reciprocating movement in the second hydraulic cylinder, the second working piston dividing the second hydraulic cylinder into, and defining therewith, a third hydraulic chamber and a fourth hydraulic chamber, the method comprising:

fluidically isolating the first hydraulic chamber from a liquid source;

establishing fluid communication between the first hydraulic chamber and the gas compressor/expander device;

fluidically isolating the second hydraulic chamber from the gas compressor/expander device;

establishing fluid communication between the second hydraulic chamber and the liquid source;

moving the first working piston in a first direction to: a) reduce the volume of the first hydraulic chamber and displace a first volume of liquid contained therein to the gas compressor/expander device, and b) increase the volume of the second hydraulic chamber and receive therein a second volume of liquid from the liquid source;

fluidically isolating the first hydraulic chamber from the gas compressor/expander device;

establishing fluid communication between the first hydraulic chamber and the liquid source;

fluidically isolating the second hydraulic chamber from the liquid source;

establishing fluid communication between the second hydraulic chamber and the gas compressor/expander device;

moving the first working piston in a second direction, opposite to the first direction, to: a) reduce the volume of the second hydraulic chamber and displace the second volume of liquid contained therein to the gas compressor/expander device, and b) increase the volume of the first hydraulic chamber and receive therein a third volume of liquid from the liquid source.

2. The method of claim 1, further comprising:
fluidically isolating the third hydraulic chamber from the gas compressor/expander device;
establishing fluid communication between the third hydraulic chamber and the liquid source;
fluidically isolating the fourth hydraulic chamber from the liquid source;
establishing fluid communication between the fourth hydraulic chamber and the gas compressor/expander device;
moving the second working piston in a third direction to: a) reduce the volume of the third hydraulic chamber and displace a fourth volume of liquid contained therein to the liquid source, and b) increase the volume of the fourth hydraulic chamber and receive therein a fifth volume of liquid from the gas compressor/expander device.

3. The method of claim 2, wherein movement of the first working piston in the first direction is substantially concurrent with movement of the second working piston in the third direction, the third direction being substantially the same as the first direction.

4. The method of claim 2, wherein a temperature of the fifth volume of liquid is greater than a temperature of the first volume of liquid.

5. The method of claim 2, wherein the first hydraulic chamber is in fluid communication with the gas compressor/expander device when the third hydraulic chamber is fluidically isolated from the gas compressor/expander device.

6. The method of claim 2, further comprising:
fluidically isolating the third hydraulic chamber from the liquid source;
establishing fluid communication between the third hydraulic chamber and the gas compressor/expander device;
fluidically isolating the fourth hydraulic chamber from the gas compressor/expander device;
establishing fluid communication between the fourth hydraulic chamber and the liquid source;
moving the second working piston in a fourth direction, opposite to the third direction, to: a) reduce the volume of the fourth hydraulic chamber and displace the fifth volume of liquid contained therein to the liquid source, and b) increase the volume of the third hydraulic chamber and receive therein a sixth volume of liquid from the gas compressor/expander device.

7. The method of claim 6, wherein a hydraulic pressure within the first hydraulic chamber during movement of the first working piston in the second direction is substantially equal to a hydraulic pressure within the fourth hydraulic cylinder during movement of the second working piston in the fourth direction.

8. The method of claim 2, wherein an average hydraulic pressure within the first hydraulic cylinder during movement of the first working piston in the first direction is substantially equal to an average hydraulic pressure within the second hydraulic cylinder during movement of the first working piston in the second direction.

9. A method of controlling the thermal efficiency of a compressed gas-based energy storage and recovery system, the compressed gas-based energy storage and recovery system including a gas compressor/expander device and a liquid management system, the gas compressor/expander device including a first pneumatic cylinder having a first pneumatic working piston disposed therein for reciprocating movement in the first pneumatic cylinder, the first pneumatic working piston dividing the first pneumatic cylinder into, and defining therewith, a first pneumatic chamber and a second pneumatic chamber, and a second pneumatic cylinder having a second pneumatic working piston disposed therein for reciprocating movement in the second pneumatic cylinder, the second pneumatic working piston dividing the second pneumatic cylinder into, and defining therewith, a third pneumatic chamber and a fourth pneumatic chamber, the liquid management system including a first hydraulic cylinder having a first hydraulic working piston disposed therein for reciprocating movement in the first hydraulic cylinder, the first hydraulic working piston dividing the first hydraulic cylinder into, and defining therewith, a first hydraulic chamber and a second hydraulic chamber, a second hydraulic cylinder having a second hydraulic working piston disposed therein for reciprocating movement in the second hydraulic cylinder, the second hydraulic working piston dividing the second hydraulic cylinder into, and defining therewith, a third hydraulic chamber and a fourth hydraulic chamber, the method comprising:
fluidically isolating the first pneumatic chamber from a gas source;
establishing fluid communication between the second pneumatic chamber and the gas source;
fluidically isolating the first hydraulic chamber from a liquid storage structure;
establishing fluid communication between the first hydraulic chamber and the first pneumatic chamber;
fluidically isolating the second hydraulic chamber from the second pneumatic chamber;
establishing fluid communication between the second hydraulic chamber and the liquid storage structure;
moving the first pneumatic working piston in a first direction to: a) reduce the volume of the first pneumatic chamber and compress a first mass of gas contained therein from a first pressure to a second pressure higher than the first pressure, and b) increase the volume of the second pneumatic chamber and receive therein a second mass of gas at a third pressure from the gas source; and
moving the first hydraulic working piston in a second direction to: a) reduce the volume of the first hydraulic chamber and displace a first volume of liquid contained therein to the first pneumatic chamber and contact the first mass of gas to cause heat energy produced by the compression of the first mass of gas to be transferred from the first mass of gas to the first volume of liquid, and b) increase the volume of the second hydraulic chamber and receive therein a second volume of liquid from the liquid storage structure.

10. The method of claim 9, wherein the first pneumatic chamber includes an intermediate structure disposed therein, the method further comprising:
    causing the temperature of the first mass of gas to increase to a temperature above a temperature of the intermediate structure, and
    causing heat energy produced by the compression of the first mass of gas to be transferred from the first mass of gas to the intermediate structure.

11. The method of claim 10, further comprising:
    causing at least a portion of the first volume of liquid to contact a portion of the intermediate structure to which heat energy has been transferred from the gas, and
    causing the heat energy to be transferred from the intermediate structure to the liquid.

12. The method of claim 9, wherein the reducing the volume of the first pneumatic chamber includes at least in part the introducing the first volume of liquid into the first pneumatic chamber.

13. The method of claim 9, wherein the first volume of liquid has: a) a first temperature before the first pneumatic working piston is moved and the first volume of liquid is displaced from the first hydraulic chamber to the first pneumatic chamber, and b) a second temperature greater than the first temperature after the first pneumatic working piston is moved and the heat energy is transferred from the first mass of gas to the first volume of liquid.

14. The method of claim 13, wherein the moving the first pneumatic working piston in the first direction to compress the first mass of gas includes moving the first pneumatic working piston in the first direction a first distance to compress the first mass of gas, the method further comprising:
    fluidically isolating the fourth pneumatic chamber from the second pneumatic chamber;
    establishing fluid communication between the first pneumatic chamber and the third pneumatic chamber, and
    moving the first pneumatic working piston in the first direction a second distance to: a) discharge the first mass of gas contained within the first pneumatic chamber from the first pneumatic chamber to the third pneumatic chamber, and b) displace at least a portion of the first volume of liquid contained within the first pneumatic chamber from the first pneumatic chamber to the third pneumatic chamber.

15. A method of controlling the thermal efficiency of a compressed gas-based energy storage and recovery system, the compressed gas-based energy storage and recovery system including a gas compressor/expander device and a liquid management system,
    the gas compressor/expander device including a first pneumatic cylinder having a first pneumatic working piston disposed therein for reciprocating movement in the first pneumatic cylinder, the first pneumatic working piston dividing the first pneumatic cylinder into, and defining therewith, a first pneumatic chamber and a second pneumatic chamber, and a second pneumatic cylinder having a second pneumatic working piston disposed therein for reciprocating movement in the second pneumatic cylinder, the second pneumatic working piston dividing the second pneumatic cylinder into, and defining therewith, a third pneumatic chamber and a fourth pneumatic chamber,
    the liquid management system including a first hydraulic cylinder having a first hydraulic working piston disposed therein for reciprocating movement in the first hydraulic cylinder, the first hydraulic working piston dividing the first hydraulic cylinder into, and defining therewith, a first hydraulic chamber and a second hydraulic chamber, a second hydraulic cylinder having a second hydraulic working piston disposed therein for reciprocating movement in the second hydraulic cylinder, the second hydraulic working piston dividing the second hydraulic cylinder into, and defining therewith, a third hydraulic chamber and a fourth hydraulic chamber,
    the method comprising:
    fluidically isolating the third pneumatic chamber from a gas storage chamber;
    establishing fluid communication between the fourth pneumatic chamber and the gas storage chamber;
    fluidically isolating the fourth hydraulic chamber from a liquid storage structure;
    establishing fluid communication between the fourth hydraulic chamber and the third pneumatic chamber;
    fluidically isolating the third hydraulic chamber from the fourth pneumatic chamber;
    establishing fluid communication between the third hydraulic chamber and the liquid storage structure;
    moving the second pneumatic working piston in a first direction to: a) increase the volume of the fourth pneumatic chamber and receive therein a first mass of gas at a first pressure from the gas storage chamber and allow the first mass of gas contained therein to expand from the first pressure to a second pressure less than the first pressure, and b) reduce the volume of the third pneumatic chamber, wherein the third pneumatic chamber includes a second mass of gas that has expanded from a third pressure to a fourth pressure less than the third pressure; and
    moving the second hydraulic working piston in a second direction to: a) reduce the volume of the fourth hydraulic chamber and displace a first volume of liquid contained therein to the third pneumatic chamber and contact the second mass of gas contained in the third pneumatic chamber to cause the first volume of liquid to transfer heat energy to the second mass of gas, and b) increase the volume of the third hydraulic chamber and receive therein a second volume of liquid from the liquid storage structure.

16. The method of claim 15, wherein the fourth pneumatic chamber includes an intermediate structure disposed therein, the method further comprising:
    causing the temperature of the first mass of gas to decrease to a temperature below a temperature of the intermediate structure, and
    causing heat energy stored at the intermediate structure to be transferred from the intermediate structure to the first mass of gas.

17. The method of claim 15, wherein the reducing the volume of the third pneumatic chamber includes at least in part the introducing the first volume of liquid into the third pneumatic chamber.

18. The method of claim 15, wherein the first volume of liquid has: a) a first temperature before the first volume of liquid is displaced from the fourth hydraulic chamber to the third pneumatic chamber, and b) a second temperature less than the first temperature after heat energy stored is transferred from the first volume of liquid to the second mass of gas.

19. The method of claim 18, wherein the moving the second pneumatic working piston in the first direction to allow the first mass of gas to expand includes moving the second pneumatic working piston in the first direction a first distance to expand the first mass of gas, the method further comprising:
- fluidically isolating the fourth pneumatic chamber from the gas storage chamber after the second pneumatic working piston moves in the first direction the first distance; and
- moving the second pneumatic working piston in the first direction a second distance when the fourth pneumatic chamber is fluidically isolated from the gas storage chamber such that the first mass of gas is allowed to expand further within the fourth pneumatic chamber.

20. The method of claim 19, further comprising:
moving the first pneumatic working piston in a third direction to increase the volume of the first pneumatic chamber and receive therein the second mass of gas at the fourth pressure and a third volume of liquid, the third volume of liquid being at least a portion of the first volume of liquid.

21. The method of claim 20, further comprising:
causing the third volume of liquid to contact the second mass of gas to cause heat energy to transfer from the third volume of liquid to the second mass of gas.

* * * * *